(12) United States Patent
Wakizaka et al.

(10) Patent No.: US 8,313,201 B2
(45) Date of Patent: *Nov. 20, 2012

(54) OPTICAL FILM, POLARIZING PLATE AND IMAGE DISPLAY APPARATUS

(75) Inventors: Daiki Wakizaka, Minami-Ashigara (JP); Takato Suzuki, Minami-Ashigara (JP); Tetsuya Asakura, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 227 days.

This patent is subject to a terminal disclaimer.

(21) Appl. No.: 12/566,712

(22) Filed: Sep. 25, 2009

(65) Prior Publication Data

US 2010/0079867 A1    Apr. 1, 2010

(30) Foreign Application Priority Data

Sep. 26, 2008   (JP) ............................... P2008-249264

(51) Int. Cl.
*G02B 27/00* (2006.01)
(52) U.S. Cl. ....................................... 359/601; 359/599
(58) Field of Classification Search .................. 359/599, 359/601–614
See application file for complete search history.

(56) References Cited

U.S. PATENT DOCUMENTS

| | | | |
|---|---|---|---|
| 2007/0121211 A1* | 5/2007 | Watanabe et al. ............. | 359/601 |
| 2007/0231507 A1* | 10/2007 | Sugiyama ..................... | 428/1.31 |
| 2007/0268587 A1* | 11/2007 | Ninomiya et al. ............. | 359/601 |
| 2007/0291367 A1* | 12/2007 | Hamamoto et al. ........... | 359/601 |
| 2008/0137206 A1 | 6/2008 | Nakamura et al. | |
| 2009/0080081 A1* | 3/2009 | Inoeu et al. ................... | 359/601 |
| 2010/0027126 A1* | 2/2010 | Chen et al. .................... | 359/601 |

FOREIGN PATENT DOCUMENTS

| | | |
|---|---|---|
| JP | 08-3009910 A | 11/1996 |
| JP | 2006-145587 A | 6/2006 |
| JP | 2006-145737 A | 6/2006 |
| JP | 2006-146027 A | 6/2006 |
| JP | 2007-045142 A | 2/2007 |

* cited by examiner

*Primary Examiner* — Thong Nguyen

(74) *Attorney, Agent, or Firm* — Birch, Stewart, Kolasch & Birch, LLP

(57) ABSTRACT

An optical film, is provided, the optical film including: a support; and at least one antiglare layer having a surface that has asperities, wherein the at least one antiglare layer contains at least one kind of light transmitting particles including first light transmitting particles in an amount of 0.01 to 1 mass % based on a total solid content in the antiglare layer, the first light transmitting particles have an average particle size that is 0.1 to 4.0 µm greater than an average thickness of the antiglare layer, and a region θ(0.5) in which slope angles θ of the asperities of the surface of the antiglare layer lie within a range of 0°<θ<0.5° constitutes 40% to 98% of the surface of the antiglare layer.

11 Claims, 5 Drawing Sheets

FIGS. 3A – 3D
FIG. 3A
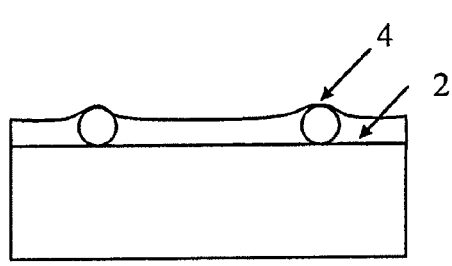
FIG. 3B
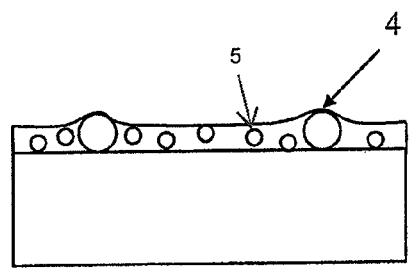
FIG. 3C
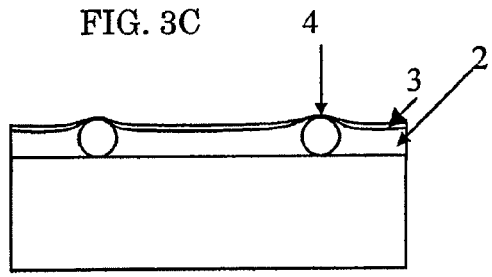
FIG. 3D
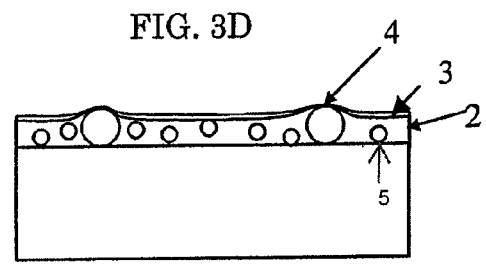

OPTICAL FILM, POLARIZING PLATE AND IMAGE DISPLAY APPARATUS

BACKGROUND OF THE INVENTION

1. Field of the Invention

The present invention relates to an optical film, a polarizing plate using the optical film, and an image display apparatus using the optical film or the polarizing plate.

2. Description of the Related Art

Optical films, notably an antireflective film, are generally placed at the outermost surfaces of displays, such as a cathode-ray tube (CRT) display, a plasma display panel (PDP), an electroluminescent display (ELD) and a liquid crystal display (LCD), for the purpose of preventing a contrast drop from occurring by reflections of outside light from the display surface and ambient-light reflection in image display apparatus. Therefore, the antireflective film is required to have not only high antireflection capabilities but also high transmittance, high physical strength (e.g. high resistance to scratching), chemical resistance and weather resistance (including resistances to moisture, heat and light).

The antireflective film prevents reflections from occurring by utilizing optical interference of a low refractive index layer that is thin film measuring 200 nm or below in thickness and provided at least at the outermost surface. However, in the case of a single-layer thin-film interference type which inhibits reflection by a low-refractive index layer of the simplest structure formed of one layer, any low-refractive-index materials suitable for practical use, which can satisfy a 5° specular reflection factor of 0.5% or below and have neutral color, high scratch resistance, chemical resistance and weather resistance, are not found yet.

On the other hand, antireflective films of multilayer thin-film interference type which can prevent reflections through multilayer optical interference are known as those for ensuring a 5° specular reflection factor of 0.5% or below, and examples of an antireflective film of such a type include an antireflective film of double-layer thin-film interference type wherein a high refractive index layer is formed between a transparent support and a low refractive index layer and an antireflective film of triple-layer thin-film interference type wherein a medium refractive index layer and a high refractive index layer are formed in the order of mention between a transparent support and a low refractive index layer. And the antireflective film of triple-layer thin-film interference type is especially favorable in the case where the prevention of reflection over a wide range of wavelengths and the attainment of a low reflectance while reducing reflection colors are required.

As thin-film layers used in an antireflective film of multilayer interference type (e.g. a high refractive index layer, a medium refractive index layer, a low refractive index layer), a multilayer film formed by lamination of transparent thin-film layers of metal oxides has been widely adopted so far. The transparent thin films of metal oxides are usually formed by a chemical vapor deposition (CVD) method, a physical vapor deposition (PVD) method, a vacuum evaporation method or a sputtering method. However, the methods of forming transparent thin films of metal oxides by vapor deposition or sputtering are low in productivity and unsuitable for mass production. Therefore, there are propositions to adopt wet film-forming methods high in productivity, notably a method of forming film by a coating process.

On the other hand, in order to reduce a viewability drop caused by reflections of extraneous light from a display surface and the reflection of a fluorescent lamp or the like in a display, an antiglare layer having an uneven surface shape is used. The antiglare layer having an uneven surface shape is formed e.g. by coating the surface of a transparent support with a resin containing fine particles of an inorganic oxide like silica or organic resin beads. When a display is viewed in a lighted room, the ambient-light reflection in the display can be reduced by the use of an antiglare layer, but there occurs a phenomenon that the screen to be essentially black in black-display mode looks whitish because of surface scattering of extraneous light and suffers from a drop in contrast (hereafter referred to as deterioration in denseness of black). Therefore, simultaneous achievement of both reduction in reflection and retention of high denseness of black is aimed at by providing one antireflective layer on the antiglare layer.

For further improvements in the reflection and the denseness of black, it is favorable to form an antireflective layer of double-layer or triple-layer thin-film interference type on an antiglare layer. However, when it is tried to coat an uneven surface of an antiglare layer with an antireflective layer on a nanometer scale, there may be cases where the uneven surface of the antiglare layer results in uneven coating and cissing of the antireflective layer, and thereby the thickness of the antireflective layer comes to fluctuate with positions on the antiglare layer and occurrence of optimum optical interference becomes impossible; as a consequence, a sufficient drop in reflectance does not occur. Accordingly, it is difficult to achieve both low reflection and high antiglare properties at the same time.

For the purpose of improving uneven coating and cissing produced on the uneven surface of an antiglare layer, disclosures of the aging treatment subsequent to the surface treatment of an antiglare layer (JP-A-2006-145737) and the provision of an interlayer between an antiglare layer and an antireflective layer (JP-A-2006-145587) are made. In addition, it is tried to make fine particles of hollow spherical silica in a low refractive index layer be present in greater amounts in concave portions than in convex portions of the uneven surface of an antiglare layer (JP-A-2006-146027).

However, these optical films heretofore proposed are insufficient to lower the reflectance. Moreover, since antiglare films currently in use have microscopic asperities on their surfaces, they have a problem that light scattering from their surfaces worsens denseness of black as compared with clear films having even surfaces.

SUMMARY OF THE INVENTION

An object of the invention is to provide an optical film in which ambient-light reflection is reduced, and besides, which ensures high denseness of black. Another object of the invention is to provide an optical film which can have highly uniform thickness, very low reflectance and high denseness of black when its interference layer is formed from a coating composition. A further object of the invention is to provide a polarizing plate and an image forming apparatus which each utilize such an optical film as mentioned above.

As a result of our intensive studies to resolve the problems, it has been found that the aspects (1) to (11) defined below can solve the problems and achieve the objects, thereby bringing the invention to perfection. More specifically, the objects of the invention are attained by the following aspects.

(1) An optical film, including:
a support; and
at least one antiglare layer having a surface that has asperities,
wherein the at least one antiglare layer contains at least one kind of light transmitting particles including first light transmitting particles in an amount of 0.01 to 1 mass % based on a total solid content in the antiglare layer, the first light transmitting particles have an average particle size that is 0.1 to 4.0 μm greater than an average thickness of the antiglare layer, and a region θ(0.5) in which slope angles θ of the asperities of the surface of the antiglare layer lie within a range of 0°<θ0.5° constitutes 40% to 98% of the surface of the antiglare layer.

(2) The optical film as described in item (1) above,
wherein the number of the first light transmitting particles per unit area mm² of the antiglare layer is 10 to 1,500.

(3) The optical film as described in item (1) or (2) above,
wherein the average particle size of the first light transmitting particles is from 3 μm to 15 μm.

(4) The optical film as described in any of items (1) to (3) above,
wherein an arithmetical average roughness Ra of the surface of the antiglare layer lies within a range of 0.03μm<Ra<0.4 μm, and an average interval Sm of the asperities lies within a range of 80 μm<Sm<700 μm.

(5) The optical film as described in any of items (1) to (4) above,
wherein the first light transmitting particles are resin particles, and a polymethyl methacrylate content in the resin particles is from 40% by mass to 100% by mass.

(6) The optical film as described in any of items (1) to (5) above,
wherein the antiglare layer further contains second light transmitting particles which includes polymethyl methacrylate and have an average particle size smaller than the average thickness of the antiglare layer.

(7) The optical film as described in any of items (1) to (6) above, further including:

at least one low refractive index layer lower in refractive index than the antiglare layer directly on the antiglare layer or via another layer.

(8) The optical film as described in item (7) above,
wherein inorganic fine particles are contained in an amount of 20 to 70% by mass based on a total solid content in the low refractive index layer.

(9) The optical film as described in item (7) or (8) above,
wherein a difference in refractive index between the antiglare layer and the low refractive index layer is 0.05 or greater.

(10) A polarizing plate, including:
protective films; and
a polarizing film provided between the protective films,
wherein at least one of the protective films is the optical film as described in any of items (1) to (9) above.

(11) An image display apparatus, including:
a display having the optical film as described in any of items (1) to (9) or the polarizing plate as described in item (10) above.

BRIEF DESCRIPTION OF THE DRAWINGS

FIGS. 3A to 3D illustrate the layers and light transmitting particles in the layers.

DETAILED DESCRIPTION OF THE INVENTION

Figure 1A:
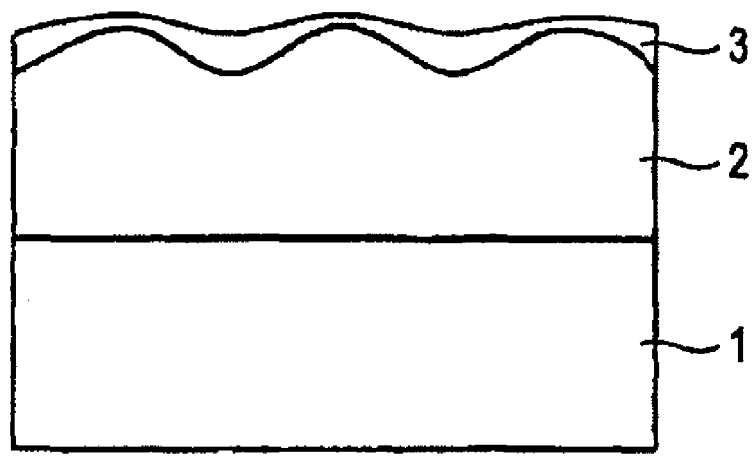
FIG. 1A is a schematic diagram of an optical film having an antiglare layer currently in use and a low refractive index layer.

Optical films according to the invention are described below in detail. Additionally, when physicality values, characteristic values or so on are represented by numerical values in the specification, the expression of "a numerical value 1 to a numerical value 2" refers to values ranging from at least the numerical value 1 to at most the numerical value 2. In addition, the expression of "(meth)acrylate" as used in the specification means "at least either acrylate or methacrylate". And the expression of "(meth)acrylic acid" or the like has similar meaning to the above.

(Structure of Optical Film)

An optical film (an antireflective film) according to the invention has at least one antireflective layer stacked on a transparent support (hereafter abbreviated as "substrate") with consideration for refractive index, film thickness, number of constituent layers, arranging order of constituent layers and so on.

The antireflective layer of an optical film according to the invention is made up by combining a medium refractive index layer or/and a high refractive index layer higher in refractive index than a support with a low refractive index layer lower in refractive index than the support. Examples of a structure of the antireflective layer include a two-layer structure made up of a high refractive index layer and a low refractive index layer which are arranged in order of mention as viewed from the support side and a three-layer structure made up of three layers different in refractive index, such as a structure made up of a medium refractive index layer (higher in refractive index than a support and a hard-coat layer and lower in refractive index than a high refractive index layer), a high refractive index layer and a low refractive index layer which are stacked in order of mention as viewed from the support side. In addition, there are proposals of optical films each having a stack of many antireflective layers. Of these proposals, the proposal of coating a support having a hard-coat layer with an antiglare layer, a medium refractive index layer, a high refractive index layer and a low refractive index layer in order of mention is preferred over the others in terms of durability, optical characteristics, cost, productivity and so on. Alternatively, it is also advantageous to impart hard-coat properties to an antiglare layer and convert the antiglare layer into an antiglare hard-coat layer.

Examples of a layer structure which are suitable for the present optical films are described below. In each of the following structures, base film functions as the support. Further, the expression of "(antistatic layer)" in the following structures means that the layer concerned also has a function as an antistatic layer in addition to its own function. By imparting a function other than the antistatic function to the antistatic layer, the number of layers to be formed can be reduced and the resulting layer structure is favorable to productivity improvement.

Layer Structure (1) Support/antiglare layer/high refractive index layer/low refractive index layer (2) Support/antiglare layer/medium refractive index layer/high refractive index layer/low refractive index layer (3) Support/antiglare layer/high refractive index layer/low refractive index layer/high refractive index layer/low refractive index layer (4) Support/hard-coat layer/antiglare layer/high refractive index layer/low refractive index layer (5) Support/hard-coat layer/antiglare layer/medium refractive index layer/high refractive index layer/low refractive index layer (6) Support/antiglare layer/high refractive index layer (antistatic layer)/low refractive index layer (7) Support/antiglare layer/medium refractive index layer (antistatic layer)/high refractive index layer/low refractive index layer (8) Support/antistatic layer/antiglare layer/medium refractive index layer/high refractive index layer/low refractive index layer (9) Antistatic layer/support/antiglare layer/medium refractive index layer/high refractive index layer/low refractive index layer Any layer structures can be applied to the invention without particularly limited to the foregoing ones so long as they can ensure reflectance reductions by optical interference.

The present optical film is an optical film having on a support at least one antiglare layer which has asperities on the surface, wherein the antiglare layer contains at least one kind of light transmitting particles in an amount of 0.01 to 1 mass % based on the total solid content in the antiglare layer, the light transmitting particles have an average particle size greater than an average thickness of the antiglare layer by 0.1 to 4.0 μm, and a region ($\theta(0.5)$) in which slope angles θ of the asperities on the antiglare layer surface lie within a range of 0°<θ<0.5° constitutes 40% to 98% of the antiglare layer surface.

Figure 1B:
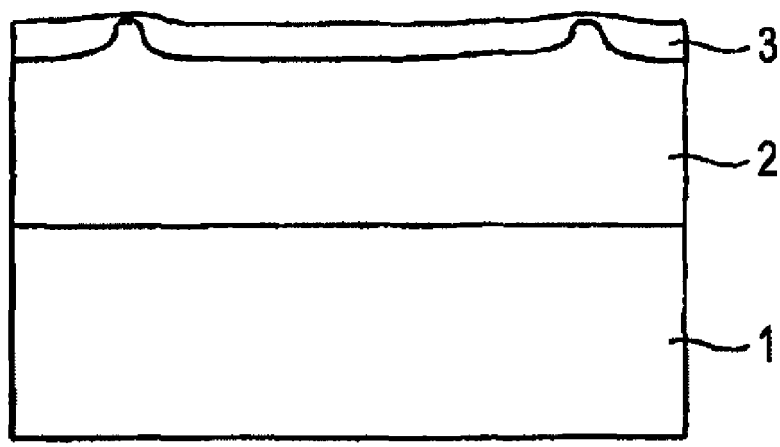
FIG. 1B is a schematic diagram of an optical film according to an embodiment of the invention wherein the antiglare layer satisfying the requirements of the invention and a low refractive index layer are provided.

The present optical film is illustrated with the aid of FIGS. 1A and 1B, FIGS. 3A-3D, FIG. 4, FIG. 5, and FIGS. 6A-6C, but the aspect thereof should not be construed as being limited to that shown in FIGS. 1A and 1B, FIGS. 3A-3D, FIG. 4, FIG. 5, and FIGS. 6A-6C. As one example of the present optical film, FIGS. 1A and 1B show an aspect that an antiglare layer 2 and a low refractive index layer 3 are provided on a support 1. FIG. 1A shows an optical film having an antiglare layer conventionally used. In the optical film shown in FIG. 1A, the interference layer (low refractive index layer 3) is formed along the uneven surface of the antiglare layer, so it suffers uneven coating and cissing to result in having nonuniform thickness. In other words, thick portions and thin portions are both produced in the interference layer. As a consequence, the interference layer cannot have a uniform thickness, and the optimum optical interference is difficult to cause in such an interference layer.

However, in the optical film having an antiglare layer characteristic of the invention, as shown in FIG. 1B, a relatively flat surface region of the antiglare layer constitutes 40% to 98% of the measured area of the antiglare layer. Accordingly, a great many portions having a uniform thickness are present in the interference layer to result in occurrence of optimum optical interference. Thus, the ambient-light reflection in the optical film is reduced, and high denseness of black is ensured.

FIGS. 3A-3D illustrate the variation of different light transmitting particles 4, 5 in the antiglare layer 2.

<Antiglare Layer>

The antiglare layer for use in the invention is adjusted to have the $\theta(0.5)$ region (which is a region wherein slope angles θ of asperities on the antiglare layer lie within a range of 0°<θ<0.5° and the coating surface is relatively flat) in the proportion of 40% to 98%. By making such an adjustment, it becomes possible to obtain surface-coated film that can reduce scattering of excess extraneous light from the film surface to result in reduction of a veiling phenomenon and can ensure high denseness of black, which are thought to be difficult to attain by antiglare layers hitherto known. In addition, when the antireflective layer is provided, unevenness in layer thickness can be reduced, and it becomes possible to achieve both sufficient antiglare properties and low refractive index at the same time. In other words, owing to the structure rich in flat portions the antiglare layer has in the invention, (1) scattering of excess extraneous light is reduced and high denseness of black is ensured, and (2) the thickness of an antireflective layer provided on the antiglare layer becomes uniform, and thereby a reflectance drop is brought about.

In the invention, the proportion of the region ($\theta(0.5)$) in which slope angles θ of asperities lie within a range of 0°<θ<0.5° is required to be from 40% to 98%, but it is preferably from 50% to 98%, more preferably from 60% to 98%, especially preferably from 70% to 98%.

When the proportion of the $\theta(0.5)$ region is not lower than 40%, reduction of interference capability and a veiling phenomenon are not caused by nonuniformity of a thin-film layer thickness according to asperities; and, when the proportion is not higher than 98%, antiglare capabilities become sufficient and there are less cases where viewers are dazzled by the reflection of a fluorescent lamp or like objects in the resultant film (Slope Angle θ)

In the invention, the distribution of slope angles θ is determined by the following method. Specifically, assuming the apexes of a triangle having an area of 0.5 to 2 μm² on the plane of a transparent film support, a slope angle θ of a film surface is defined as an angle which the normal line of a triangle plane formed by three intersection points of three perpendicular lines extended upwardly and vertically from the apexes forms with the perpendicular line extended upwardly and vertically from the support. The area of 250,000 μm² (0.25 mm²) on the support is divided into the assumed triangles, and slope angle measurements are made on all of the divided triangles and thereby the slope angle distribution at all the measuring points is determined.

Figure 2A:
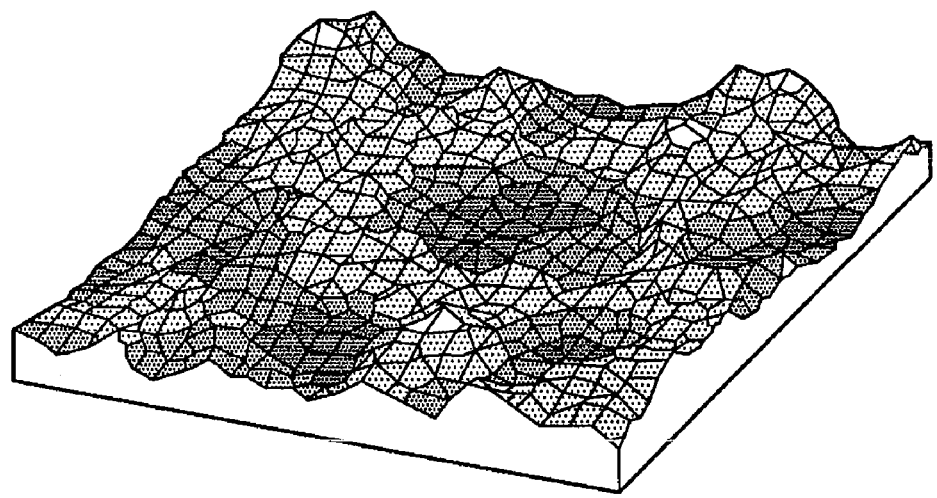
FIGS. 2A to 2C are schematic diagrams illustrating general outlines of a method for measuring a slope angle.
Figure 2B:
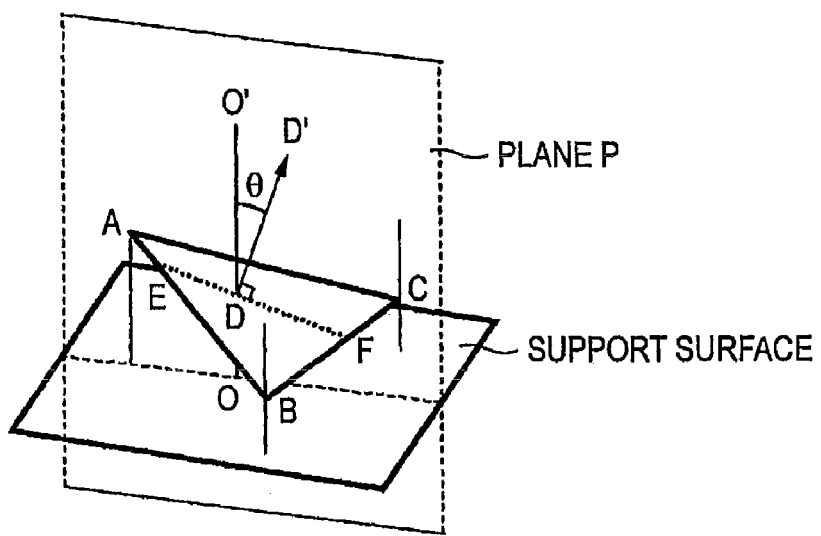
Figure 2C:
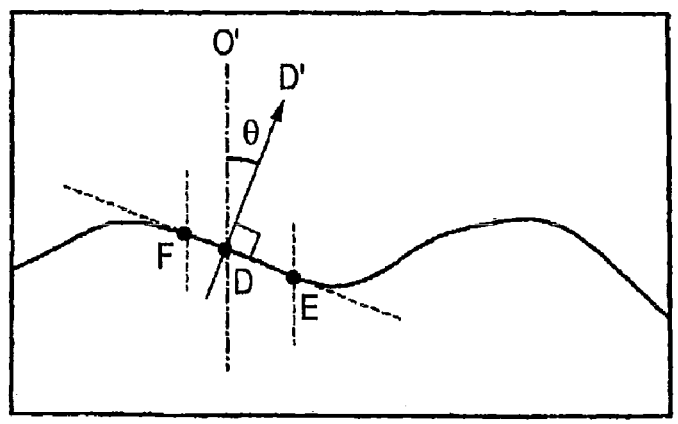

The method for measuring a slope angle is described in detail by reference to FIGS. 2A to 2C. As shown in FIG. 2A, the film is divided into meshes measuring 0.5 to 2 μm² in area. FIG. 2B is a diagram for illustrating three points taken from a divided mesh. Perpendicular lines are extended upwardly and vertically from three points on this support, and the intersection points of these three perpendicular lines and the film surface are symbolized by A, B and C. The angle θ that the normal line DD' to the plane of the triangle ABC forms with the perpendicular line OO' extended upwardly and vertically from the support is defined as a slope angle. FIG. 2C is a cross-sectional diagram of the film cut by the plane P including the points O'DD'. The line segment EF is an intersection line of the triangle ABC and a plane P. The measuring area is preferably 250,000 μ² (0.25 mm²) or above on the support, and this area is divided into triangles on the support, and subjected to measurements for determination of slope angles.

Although slope-angle measurement has no particular restriction as to the measuring apparatus so long as it can perform the measurement, an example thereof is described below. Specifically, the case of using as the measuring apparatus an SXM520-AS 150 Model made by Micromap Corporation (USA) is explained below. When the power of an objective lens used is e.g. 10×, the slope-angle measuring unit is 0.8 μm² ad the measuring range id 500,000 μm² (0.5 mm²). When the objective lens having a greater power is used, the measuring unit and the measuring range become the smaller in keeping with the power increment. The data obtained by measurement is analyzed by software such as MAT-LAB, from which the distribution of slope angles can be calculated. From the slope-angle distribution thus calculated, the incidence of slope angles ranging from 0° to 0.5°, θ(0.5), is determined. Such measurements are carried out at five different spots, and an average of the thus obtained values on θ(0.5) is worked out.

In the present optical film, it is preferable that the antiglare layer has its arithmetic average roughness Ra within a range of 0.03 µm<Ra<0.4 µm. When light transmitting particles having the average particle size greater than the average thickness of the antiglare layer are used for the purpose of imparting antiglare properties, it is advantageous for the arithmetic average roughness Ra to lie within a range of 0.05 µm<Ra<0.30 µm, preferably 0.05 µm<Ra<0.25 µm, particularly preferably 0.05 µm<Ra<0.15 µm, from the viewpoints of imparting antiglare properties and preventing the film surface from glittering or whitening by reflections of extraneous light.

When the arithmetic average roughness Ra of an antiglare layer surface in the optical film is not 0.03 µm or below, sufficient antiglare capability can be achieved because of not too small asperities on the surface; while, when the Ra is not 0.4 µm or above, there do not arise problems that the resultant optical film degrades its interference capability by causing a glittering or surface whitening phenomenon upon reflections of extraneous light, and besides, by having an antireflective layer of nonuniform thickness according to the asperities.

The suitable average interval Sm of the asperities on the antiglare layer surface lies within a range of preferably 80 µm<Sm<700 µm, more preferably 150 µm<Sm<700 µm, especially preferably 200 µm<Sm<600 µm. It is advantageous for the Sm value to be set in the foregoing range because such setting allows an increase in proportion of flat portions at the layer surface and thereby an antireflective layer can be stacked evenly on the antiglare layer surface.

When the average interval Sm of the asperities is not 80 µm or below, the resultant antiglare layer has a structure having large flat portions of surface containing asperities. Therefore, when a thin-film layer is coated on such an antiglare layer, there are few cases where degradation in interference capability occurs because of nonuniform thickness of the thin-film layer coated, or a veiling phenomenon occurs in black-display mode of a display having such a thin-film layer at its topmost surface. When the average interval Sm of the asperities is not 700 µm or above, the resultant antiglare layer does not have a structure rich in flat portions at the surface, sufficient antiglare capability can be obtained.

In the invention, it is preferable that the arithmetic average roughness Ra of the antiglare layer lies within a range of 0.03 µm<Ra<0.4 µm, what's more the average interval Sm of asperities on the antiglare layer surface lies within a range of 80 µm<Sm<700 µm. By adjusting both Ra and Sm values to lie within their individual ranges specified above, the resultant antiglare layer can ensure high antiglare capability, prevention of a glittering phenomenon and high denseness of black, and can have the effect of achieving low reflectance because it can reduce fluctuations in thickness of an antireflective layer stacked thereon.

The suitable addition amount of light transmitting particles having an average particle size greater than the average thickness of the antiglare layer is from 0.01 to 1 mass % based on the total solid content in the antiglare layer from the viewpoint of thinning the density of asperities and increasing the proportion of flat portions on the surface, and thereby allowing an antireflective layer to stack evenly on the antiglare layer. The addition amount of such particles is preferably from 0.1 to 1 mass %, more preferably from 0.1 to 0.7 mass %, especially preferably from 0.1 to 0.45 mass %.

In contrast to antiglare layers currently in use, the antiglare layer for use in the invention can have antiglare capability by containing particles of an average size greater than the average thickness of the antiglare layer by 0.1 to 4.0 µm, though the content of the particles is in a very low range of 0.01 mass % to 1 mass %. Therefore, the antiglare layer in the invention has a structure rich in flat portions at the surface, and can ensure very high denseness of black. In addition, stacking of a plurality of thin-film layers on the antiglare layer can make it difficult for the total thickness of the stacked layers to become nonuniform because of asperities on the antiglare layer, which in turn allows achievement of low reflectance. Moreover, even though the antiglare layer is rich in flat portions, the antiglare capability thereof is not impaired because it is developed by the particles protruded at a height of at least 0.1 to 4.0 µm from the antiglare layer surface.

The number of light transmitting particles which are contained in the antiglare layer and have an average particle size greater than the average thickness of the antiglare layer is preferably from 10 to 1,500, more preferably from 10 to 400, further preferably from 10 to 250, particularly preferably from 10 to 150, on a per-unit-area ($mm^2$) basis. Such a number of light transmitting particles can be determined by observing 10 fields of view, which each measure 500 µm×500 µm, under an optical microscope, and counting the number of particles in each field of view, and further taking the average of the numbers counted.

In the present optical film, the antiglare layer is formed for the purpose of imparting antiglare capability by surface scattering to the film, preferably further undertaking to act as a hard coating for enhancing scratch resistance of the film.

It is therefore preferable that an antiglare layer for use in the invention contains a binder capable of imparting hard-coat properties to the layer.

(Light Transmitting Particles)

In a preferred embodiment of the invention, the antiglare layer contains at least one kind of light transmitting particles as specified above in order to obtain antiglare properties and, it is advantageous for the light transmitting particles to have an average particle size greater than the average thickness of the antiglare layer by 0.1 to 4.0 µm in point of contribution to antiglare properties. For further achieving compatibility of antiglare properties and stacking of an even antireflective layer by increasing the proportion of flat portions at the antiglare layer surface, it is appropriate that the average particle size be greater than the average thickness of the antiglare layer preferably by 0.1 to 3.0 µm, more preferably by 0.5 to 2.5 µm, especially preferably by 1.0 to 2.0 µm.

The average thickness of the antiglare layer can be determined by observing the optical film in sections under an electron microscope, measuring layer thicknesses at 30 points chosen at random and taking an average of these measured values.

It is preferred that one convex part of asperities on the antiglare layer is substantially formed of 5 or less light transmitting particles, especially one light transmitting particle. The term "substantially" as used herein means that 90% or more of the convex parts satisfy the requirement for the above preferred embodiment.

As the light transmitting particles, those satisfying the foregoing particle size requirement and ensuring the internal haze value defined below in the antiglare layer are preferably used. And selection of particles having good dispersibility is advantageous because it is preferable that one convex part of asperities is formed substantially of one light transmitting particle.

In the invention, light transmitting resin particles such as polymethyl methacrylate particles or particles of a copolymer of polymethyl methacrylate and polystyrene can be preferably used as the particles having good dispersibility. In point of dispersibility, the polymethyl methacrylate proportion in the copolymer particles is preferably from 40 to 100 mass %, more preferably from 50 to 100 mass %, especially preferably from 75 to 100 mass %.

In the case of using the foregoing light transmitting particles, a dispersant, such as an inorganic filler like silica, which has a size not causing visible light scattering, or an organic compound (which may be a monomer or a polymer), may be added for the purpose of imparting dispersion stability of particles in a binder or a coating composition and preventing the particles from precipitating. However, it is preferred that each convex part is formed substantially of a particle or particles of polymethyl methacrylate.

As those light transmitting fine particles, commercially available products of resin particles can be used, with examples including Chemisnow MX300, MX600, MX675, RX0855, MX800, MX1000, SX713L and MX1500H, which are products of Soken Chemical & Engineering Co., Ltd., or Techpolymer SSX108HXE, SSX108LXE, SSX-106TN, SSX-106FB and XX120S, which are products of Sekisui Plastics Co., Ltd.

In the case of adding an inorganic filler, the greater the amount of the filler added, the more effective the addition of filler for prevention of precipitation of light transmitting particles. However, it is appropriate that the inorganic filler be added in such an amount as not to affect adversely the transparency of the resultant coating. Therefore, it is preferred that the inorganic filler measuring 0.5 μm or below in particle size be added in such an amount as to cause no loss of transparency in the resultant coating, specifically in an amount of the order of 0.1 part by mass per 100 parts by mass of binder. On the other hand, an organic compound or the like for dispersant use is preferably added in an amount of 0.1 to 20 parts by mass per 100 parts by mass of light transmitting particles. The addition amount of the dispersant like an organic compound is preferably from 0.1 to 15 parts by mass, particularly preferably from 0.5 to 10 parts by mass. The range of addition amount as specified above is preferred because the addition in an amount of 0.1 part by mass or above can have an effect on dispersion stability and the addition in an amount of 20 parts by mass or below does not cause a problem like bleedout resulting from an increase in the component making no contribution to dispersion stability.

Additionally or alternatively, the light transmitting particles may be subjected to surface treatment for the purpose of obtaining dispersion stability and preventing precipitation in a binder or coating composition for formation of the antiglare layer. The kind of a surface treating agent used therefor is chosen appropriately according to the binder and the solvent used in combination. The suitable amount of the surface treating agent added is from 0.1 to 30 parts by mass, preferably from 1 to 25 parts by mass, particularly preferably from 3 to 20 parts by mass, per 100 parts by mass of light transmitting particles. Such an addition amount range is preferred because there occurs no shortage of the surface treatment quantity for dispersion stability so long as the amount of the surface treating agent added is 0.1 part by mass or above and a problem like bleedout resulting from an increase in the component making no contribution to dispersion stability does not occur so long as the amount of the surface treating agent added is 30 parts by mass or below.

From the viewpoint of controlling the haze value and dispersibility and ensuring uniformity in coating surface condition, the second light transmitting particles are preferably monodisperse particles with respect to the particle size distribution. In other words, they are preferably particles of uniform size. The CV value indicating the uniformity in particle sizes is preferably from 0 to 10%, more preferably from 0 to 8%, further preferably from 0 to 5%. In addition, when particles having sizes at least 20% greater than the average size are defined as coarse particles, it is appropriate that such coarse particles constitute at most 1%, preferably at most 0.1%, more preferably at most 0.01%, of all the particles by number. An example of a strong measure to prepare particles having such a size distribution is classification after preparation or synthesis reaction, and particles having the desired size distribution can be obtained by increasing the number of times the classification is carried out or the severity of the classification. For the classification, it is favorable to adopt a wind classification method, a centrifugal classification method, a precipitation classification method, a filtration classification method, an electrostatic classification method or the like. The average particle size of light transmitting particles is determined by observing the light transmitting particles under an optical microscope and taking the average of particles diameters of 100 particles observed.

(Secondary Light Transmitting Particles)

In order to achieve the required light-scattering capability, the light transmitting particles may be used in combination with secondary light transmitting particles differing from the light transmitting particles in their average particle size. And it is possible to obtain the antiglare capability from the light transmitting particles and other optical properties from the secondary light transmitting particles. When an antiglare antireflective film is stuck e.g. on a high-definition display having a pixel account of 133 ppi or above, there may occur the so-called "glittering phenomenon", a problem from a viewpoint of image display quality.

The term "glittering phenomenon" as used in the invention refers to a phenomenon that, regardless of the presence or absence of glaringness by the reflection of illumination with an electric light or the like in a display, which is a subject of discussion about antiglare capability, picture elements lose uniformity in brightness by being enlarged or reduced through the lens effect produced by asperities present on the antiglare antireflective film surface; as a result, R, G and B look glittering to human eye. This "glittering phenomenon" can be improved by combined use of light transmitting particles for imparting antiglare capability and other light transmitting particles smaller in particle size and different from a binder in refractive index.

It is preferable that the secondary light transmitting particles have an average particle size smaller than the average thickness of the antiglare layer. More specifically, it is advantageous for the secondary light transmitting particles to have an average particle size equivalent to 10% to 90%, preferably 20% to 80%, of the average thickness of the antiglare layer. This is because such secondary particles can impart internal scattering capability without contributing to unevenness of the layer surface and hardly cause reduction of flat portions at the layer surface.

As the secondary light transmitting particles, those having good dispersibility are suitable. The particles having good dispersibility are preferably light transmitting organic resin particles such as polymethyl methacrylate particles or particles of a copolymer of polymethyl methacrylate and polystyrene. In point of dispersibility, the polymethyl methacrylate proportion in the copolymer particles is preferably from 40 to 100 mass %, more preferably from 50 to 100 mass %, especially preferably from 75 to 100 mass %.

As the secondary light transmitting particles in the invention, core-shell type particles which contain, in their core, a material having a difference in refractive index from a binder and delivering light-scattering power and, in their shell, a material having a high affinity for a binder and excellent dispersibility can also be used to advantage.

Examples of a material capable of delivering light-scattering power include polymethyl methacrylate, crosslinked copolymer of acrylic and styrene, melamine resin, polycarbonate, polystyrene, crosslinked polystyrene, polyvinyl chloride, and benzoguanamine-melamineformaldehyde.

Examples of a material having excellent dispersibility include polymethyl methacrylate and the like.

It is appropriate that the secondary light transmitting particles have good dispersibility. When the secondary light transmitting particles have poor dispersibility, large aggregates are formed and impart a rough structure to the antiglare layer surface. In providing on such an antiglare layer an antireflective layer made up of two or more of high refractive index layers and low refractive index layers, there may be cases where the uniformity of the antireflective layer thickness is aggravated and formation of an optical film having low reflectance ends in failure. Even when the secondary light transmitting particles used are poor in dispersibility, those problems are avoided so long as the dispersibility is enhanced by the use of a dispersant or the like.

From the viewpoint of imparting internal scattering capability and improving the glittering phenomenon, the mixing proportion of the secondary light transmitting particles is preferably from 0.01 to 30 mass %, more preferably from 0.01 to 25 mass %, based on the total solid content.

(Binder)

A binder of the antiglare layer for use in the invention is formed by hardening at least one among thermosetting resins or ionizing radiation-curable compounds.

The binder used preferably in the antiglare layer is formed by crosslinking reaction and/or polymerization reaction of an ionizing radiation-curable compound. More specifically, it is preferable that the antiglare layer is formed by coating a support with a coating composition for antiglare layer formation, which contains as a binder-forming material an ionizing radiation-curable multifunctional monomer or oligomer, and then by subjecting the multifunctional monomer or oligomer to crosslinking reaction or polymerization reaction. As functional groups of the ionizing radiation-curable multifunctional monomer or oligomer, groups capable of undergoing polymerization under exposure to light (ultraviolet light), electron beam or radiation are suitable. Of these groups, photopolymerizable functional groups are preferred over the others. Examples of a photopolymerizable functional group include polymerizable unsaturated functional groups such as a (meth)acryloyl group, a vinyl group, a styryl group and an allyl group. Of these groups, a (meth)acryloyl group is preferred over the others.

As suitable examples of a binder-forming material, the compounds recited in the paragraph entitled "Compound Having Polymerizable Unsaturated Bond" in the following section <Low Refractive index layer> can be used.

To a binder-forming material, it is possible to add either a monomer having a high refractive index or inorganic particles causing no scattering of visible light, namely inorganic particles having an average size of 100 nm or below, such as particles of $ZrO_2$, $TiO_2$ or $SiO_2$, or both for the purpose of adjusting the refractive index of antiglare layer. Such inorganic particles have the effect of suppressing hardening shrinkage resulting from crosslinking reaction in addition to the effect of adjusting the refractive index. In the invention, a polymer produced by polymerizing compound(s) having polymerizable unsaturated bond(s), such as a multifunctional monomer or/and a monomer having a high refractive index, and inorganic particles dispersed in the polymer are collectively referred to as the binder after formation of the antiglare layer.

From the viewpoint of retaining the proportion of flat portions at the layer surface even when light transmitting particles for imparting internal scattering are used in combination, the binder content in the antiglare layer is preferably from 50 to 99 parts by mass, more preferably from 70 to 99 parts by mass, per 100 parts by mass of the total solid content in the antiglare layer.

The strength of the antiglare layer is preferably H or above, more preferably 2H or above, especially preferably 3H or above, as determined by a pencil hardness test.

From the viewpoint of achieving the compatibility between hardness and curling, the antiglare layer is preferably adjusted to have its average thickness in the 2.9- to 14.9-μm range, more preferably in the 3- to 10-μm range, especially preferably in the 4- to 8-μm range.

The average particle size of the light transmitting particles whose average particle size is greater than the thickness of the antiglare layer is preferably from 3 μm to 15 μm, more preferably from 5 μm to 10 μm, especially preferably from 6 μm to 8 μm.

The antiglare layer is preferably adjusted to have its refractive index at the wavelength of 550 nm in the range of 1.48 to 1.70, more preferably in the range of 1.48 to 1.60. All the refractive index data in the invention are values of refractive indexes measured at the wavelength of 550 nm <Low Refractive Index Layer>

The low refractive index layer for use in the invention can be provided as the outermost layer for the purpose of enhancing antireflection power. The refractive index of the low refractive index layer, though not particularly limited so long as it is smaller than the refractive index of the antiglare layer, is preferably from 1.25 to 1.48, more preferably from 1.30 to 1.40, particularly preferably from 1.30 to 1.37.

When antireflection is performed by providing a single-layer low refractive index layer on the antiglare layer for use in the invention, the greater a difference in refractive index between the antiglare layer and the low refractive index layer, the greater the effect of the surface shape of the antiglare layer on reflectance reduction. The difference in refractive index is preferably 0.05 or above, more preferably 0.10 or above, especially preferably 0.15 or above.

The thickness of the low refractive index layer is preferably from 30 nm to 200 nm, more preferably from 70 nm to 150 nm.

The haze of the low refractive index layer is preferably 3% or below, more preferably 2% or below, especially preferably 1% or below.

The strength of the low refractive index layer, as determined by the pencil hardness test under a load of 500 g, is preferably at least H, more preferably at least 2H, especially preferably at least 3H.

Additionally, for improvement in soil resistance of the optical film, it is advantageous for the contact angle of the film surface with respect to water to be 90 degrees or above, preferably 95 degrees or above, particularly preferably 100 degrees or above.

The low refractive index layer is preferably formed so as to contain a binder and fine particles. Each of ingredients contained in the low refractive index layer is described below.

[Binder]

As a binder-forming material contained in the low refractive index layer, a fluorine-containing copolymer produced by copolymerizing a fluorine-containing vinyl monomer and another copolymerizable component can be used suitably.

Examples of the fluorine-containing vinyl monomer include fluoroolefms (such as fluoroethylene, vinylidene fluoride, tetrafluoroethylene and hexafluoroethylene), partially or completely fluorinated alkyl ester derivatives of (meth)acrylic acid (such as Biscoat 6FM, a product of Osaka Organic Chemical Industry Ltd., and R-2020, a product of Daikin Industries, Ltd.), and completely or partially fluorinated vinyl ethers. Of these monomers, perfluoroolefins are preferable to the others, and hexafluoropropylene is especially preferred in terms of refractive index, solubility, transparency, availability and so on. When the proportion of such a fluorine-containing vinyl monomer in the composition for copolymerization is increased, though the refractive index can be lowered, the film strength is reduced. Therefore, it is preferable in the invention that the fluorine-containing vinyl monomer is introduced into a fluorine-containing copolymer in such a proportion that the fluorine content in the fluorine-containing copolymer falls within the 20- to 60-mass % range, preferably within the 25- to 55-mass % range, particularly preferably within the 30- to 50-mass % range.

As examples of another component which can be copolymerized with the fluorine-containing vinyl monomers, monomers belonging e.g. to the following groups (a), (b) and (c) are favorably used for imparting crosslinking reactivity to the resultant copolymers.

(a): monomers having in advance in their individual molecules self-crosslinkable functional groups, such as glycidyl (meth)acrylate and glycidyl vinyl ether.

(b): monomers each having a carboxyl group, a hydroxyl group, an amino group, a sulfo group or/and the like (e.g. (meth)acrylic acid, methylol (meth)acrylate, hydroxyalkyl (meth)acrylate, allyl acrylate, hydroxyethyl vinyl ether, hydroxybutyl vinyl ether, maleic acid and crotonic acid).

(c): monomers each having both a group capable of reacting with any of the functional groups contained in the monomers (a) and (b) and another crosslinkable functional group (e.g. a monomer which can be synthesized by subjecting e.g. a hydroxyl group to reaction with acrylic acid chloride).

The crosslinkable functional groups in the monomers (c) are preferably photopolymerizable groups. Examples of a photopolymerizable group include a (meth)acryloyl group, an alkenyl group, a cinnamoyl group, a cinnamylideneacetyl group, a benzalacetophenone group, a styrylpyridine group, an α-phenylmaleimide group, a phenylazide group, a sulfonylazide group, a carbonylazide group, a diazo group, an o-quinoneazide group, a furylacryloyl group, a coumarin group, a pyrone group, an anthracene group, a benzophenone group, a stilbene group, a dithiocarbamate group, a xanthate group, a 1,2,3-thiadiazole group, a cyclopropene group and an azadioxabicyclo group. In the monomers (c), these groups may be contained alone or in combination of two or more thereof. Among those groups, especially preferred groups are a (meth)acryloyl group and a cinnamoyl group, notably a (meth)acryloyl group.

Examples of a method for preparing a copolymer containing not only fluorine atoms but also photopolymerizable groups include the following methods, but not limited to them.

a. The method of esterifying a copolymer containing not only crosslinkable functional groups but also hydroxyl groups by reaction with (meth)acrylic acid chloride.

b. The method of urethanating a copolymer containing not only cosslinkable functional groups but also hydroxyl groups by reaction with an isocyanate group-containing (meth)acrylic acid ester.

c. The method of esterifying a copolymer containing not only crosslinkable functional groups but also epoxy groups by reaction with (meth)acrylic acid.

d. The method of esterifying a copolymer containing not only crosslinkable functional groups but also carboxyl groups by reaction with an epoxy group-containing (meth)acrylic acid ester.

The amount of the photopolymerizable groups introduced can be controlled arbitrarily, and it is also advantageous for carboxyl groups or hydroxyl groups to be preserved in a specified amount from the viewpoints of stability of coating surface conditions, degradation caused in surface conditions by presence of inorganic particles and enhancement of film strength.

In addition to the repeating units derived from the fluorine-containing vinyl monomer and the repeating units having (meth)acryloyl groups in their side chains, the fluorine-containing copolymer useful in the invention can further contain repeating units derived from other vinyl monomers as appropriate from various points of view, including adhesion to a support, Tg of the copolymer formed (which contributes to film strength), solvent solubility, transparency, slipping properties, dust resistance, soil resistance and so on. Various combinations of two or more monomers may be introduced according to the intended purposes, and the total proportion of such monomers introduced in the copolymer is preferably from 0 to 65 mole %, more preferably from 0 to 40 mole %, particularly preferably from 0 to 30 mole %.

The other copolymerizable vinyl monomers have no particular restrictions, and examples thereof can include olefins (such as ethylene, propylene, isoprene, vinyl chloride and vinylidene chloride), acrylic acid esters (such as methyl acrylate, ethyl acrylate, 2-ethylhexyl acrylate and 2-hydroxyethyl acrylate), methacrylic acid esters (such as methyl methacrylate, ethyl methacrylate, butyl methacrylate and 2-hydroxyethyl methacrylate), styrene derivatives (such as styrene, p-hydroxystyrene and p-methoxystyrene), vinyl ethers (such as methyl vinyl ether, ethyl vinyl ether and cyclohexyl vinyl ether, hydroxyethyl vinyl ether and hydroxybutyl vinyl ether), vinyl esters (such as vinyl acetate, vinyl propionate and vinyl succinate), unsaturated carboxylic acids (such as acrylic acid, methacrylic acid, crotonic acid, maleic acid and itaconic acid), acrylamides (such as N,N-dimethylacrylamide, N-tert-butylacrylamide and N-cyclohexylacrylamide), methacrylamides (such as N,N-dimethylmethacrylamide), and acrylonitrile.

The fluorine-containing copolymers especially useful in the invention are random copolymers of perfluoroolefins and vinyl ethers or vinyl esters. Of these copolymers, those having groups capable of causing crosslinking reaction by themselves (e.g. a group causing radical reaction, such as (meth) acryloyl groups, or a group causing ring-opening polymerization, such as an epoxy group or an oxetanyl group) are preferred over others. It is preferable that such polymerizing units containing groups capable of causing crosslinking reaction constitute 5 to 70 mole %, especially 30 to 60 mole %, of the total polymerizing units in the copolymer. Suitable examples of such copolymers include the copolymers disclosed in JP-A-2002-243907, JP-A-2002-372601, JP-A-

2003-26732, JP-A-2003-222702, JP-A-2003-294911, JP-A-2003-329804, JP-A-2004-4444 and JP-A-2004-45462.

Into such a fluorine-containing copolymer for use in the invention, a polysiloxane structure is preferably introduced for the purpose of imparting soil resistance. Although there is no particular restriction on the method of introducing a polysiloxane structure, it is advantageous to adopt the method of introducing polysiloxane as a block copolymerizing component by use of a siliconemacroazo initiator as disclosed in JP-A-6-93100, JP-A-11-189621, JP-A-11-228631 and JP-A-2000-313709 or the method of introducing polysiloxane as a graft copolymerizing component by use of a silicone macromonomer as disclosed in JP-A-2-251555 and JP-A-2-308806. Examples of an especially preferred compound include the polymers disclosed in Examples 1, 2 and 3 of JP-A-11-189621, and the copolymers A-2 and A-3 disclosed in JP-A-2-251555. It is preferred that such a silicone component constitute 0.5 to 10 mass %, especially 1 to 5 mass %, of the fluorine-containing copolymer.

The suitable mass-average molecular weight of a fluorine-containing copolymer used advantageously in the invention is 5,000 or above, preferably from 10,000 to 500,000, especially preferably from 15,000 to 200,000. For improving the coating surface conditions and scratch resistance, it is also possible to use a combination of fluorine-containing copolymers different in average molecular weight.

(Compound Having Polymerizable Unsaturated Bond)

For the binder-forming material, as disclosed in JP-A-10-25388 and JP-A-2000-17028, the fluorine-containing copolymer may be used in combination with a compound having a polymerizable unsaturated bond as appropriate. In addition, it is also advantageous for the fluorine-containing copolymer to be used in combination with a fluorine-containing multifunctional compound having a polymerizable unsaturated bond as disclosed in JP-A-2002-145952. Examples of a compound having a polymerizable unsaturated bond include compounds each having a polymerizable functional group, such as a (meth)acryloyl group, a vinyl group, a styryl group or an allyl group. Of these groups, a (meth)acryloyl group is preferred over the others. In particular, the following compounds having two or more (meth)acryloyl groups per molecule can be used to advantage. In the case where polymerizable unsaturated groups are contained in the polymer proper, these compounds are particularly preferred because they can have great combined-use effect on improvement in scratch resistance, or scratch resistance after chemical treatment.

Examples of a compound having a polymerizable unsaturated bond include:

(meth)acrylic acid diesters of alkylene glycol, such as neopentyl glycol acrylate, 1,6-hexanediol (meth)acrylate and propylene glycol di(meth)acrylate;

(meth)acrylic acid diesters of polyoxyalkylene glycol, such as triethylene glycol di(neth)acrylate, dipropylene glycol di(meth)acrylate, polyethylene glycol di(meth)acrylate and polypropylene glycol di(meth)acrylate;

(meth)acrylic acid diesters of polyhydric alcohol, such as pentaerythritol di(meth)acrylate; and (meth)acrylic acid diesters of ethylene oxide or propylene oxide adduct, such as 2,2-bis[4-(acryloxydiethoxy)phenyl]propane and 2,2-bis[4-(acryloxypolypropoxy)phenyl]propane.

In addition, epoxy (meth)acrylates, urethane (meth)acrylates and polyester (meth)acrylates are also used suitably as photopolymerizable multifunctional monomers.

Of those (meth)acrylates, esters prepared from polyhydric alcohols and (meth)acrylic acid are preferable to the others. Among such esters, multifunctional monomers having three or more (meth)acryloyl groups per molecule are more preferred. Examples of such multifunctional monomers include pentaerythritol tetra(meth)acrylate, pentaerythritol tri(meth)acrylate, trimethylolpropane tri(meth)acrylate, EO-modified trimethylolpropane tri(meth)acrylate, PO-modified trimethylolpropane tri(meth)acrylate, EO-modified phosphoric acid tri(meth)acrylate, trimethylolethane tri(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylatae, polyester polyacrylate and caprolactone-modified tris(acryloxyethyl) isocyanurate. The expressions of "(meth)acrylate", "(meth)acrylic acid" and "(meth)acryloyl" as used in the specification refer to acrylate or methacrylate, acrylic acid or methacrylic acid, and acryloyl or methacryloyl, respectively.

(Meth)acryloyl group-containing multifunctional acrylate compounds for practical use are esterification products of polyols and (meth)acrylic acid, with examples including the products of NIPPON KAYAKU Co., Ltd., such as KAYARAD DPHA, KAYARAD DPHA-2C, KAYARAD PET-30, KAYARAD-TMPTA, KAYARAD TPA-320, KAYARAD TPA-330, KAYARAD RP-1040, KAYARAD T-1420, KAYARAD D-310, KAYARAD DPCA-20, KAYARAD DPCA-30, KAYARAD DPCA-60 and KAYARAD GPO-303, and the products of OSAKA ORGANIC CHEMICAL INDUSTRY LTD., such as V#3PA, V#400, V#36095D, V#1000 and V#1080. In addition to these commercial products, trifunctional or higher urethane acrylate compounds including Siko series UV-1400B, UV-1700B, UV-6300B, UV-7550B, UV-7600B, UV-7605B, UV-7610B, UV-7620EA, UV-7630B, UV-7640B, UV-6630B, UV-7000B, UV-7510B, UV-7461TE, UV-3000B, UV-3200B, UV-3210EA, UV-3310EA, UV-3310B, UV-3500BA, UV-3520TL, UV-3700B, UV-6100B, UV-6640B, UV-2000B, UV-2010B, UV-2250EA and UV-2750B (products of Nippon Synthetic Chemical Industry Co., Ltd.), UL-503LN (a product of KYOEISHA CHEMICAL Co., Ltd.), UNIDIC 17-806, UNIDIC 17-813, UNIDIC V-4030 and UNIDIC V-4000BA (product of DIC Corporation), EB-1290K, EB-220, EB-5129, EB-1830 and EB-4858 (products of DAICEL UCB), Hi-Corp AU-2010 and Hi-Corp AU-2020 (products of TOKUSHIKI Co., Ltd.), Aronix M-1960 (a product of TOAGOSEI CO., LTD.), ARTRESIN UN-3320HA, UN-3320HC, UN-3320HS, UN-904 and HDP-4T (products of Negami Chemical Industrial Co., Ltd.), trifunctional or higher polyester compounds including Aronix M-8100, M-8030 and M-9050 (products of TOAGOSEI CO., LTD.) and KRM-8307 (a product of DAICEL-CYTEC COMPANY LTD.) and so on can also be used to advantage.

Further, resins having three or more (meth)acryloyl groups, such as relatively low-molecular-weight polyester, polyether, acrylic, epoxy, urethane, alkyd, spiro-acetal, polybutadiene and polythiolpolyene resins, and oligomers or prepolymers of multifunctional compounds, such as polyhydric alcohols, can be used.

Furthermore, the compounds represented by the following structural formulae can be used as difunctional (meth)acrylate compounds. However, the following compounds should not be construed as limiting the difunctional (meth)acrylates usable in the invention.

A-1 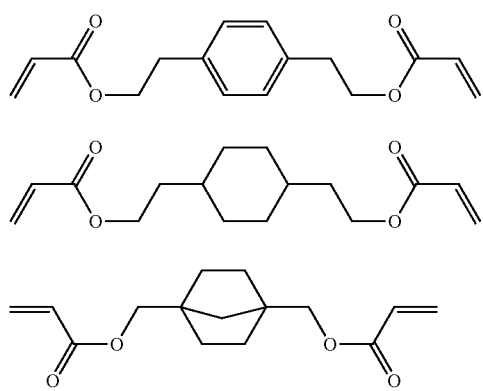
A-2 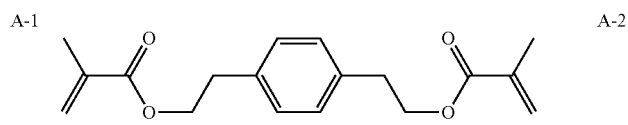
A-3
A-4 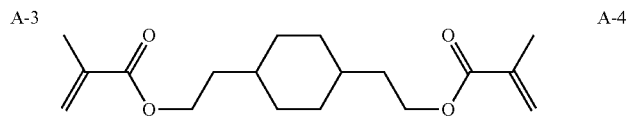
A-5 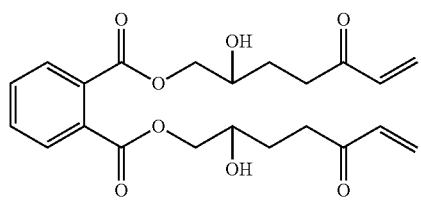
A-6 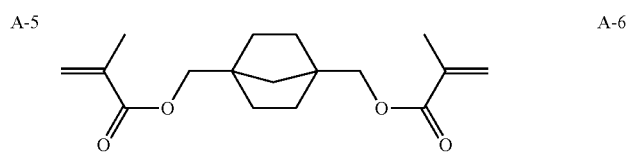
A-7 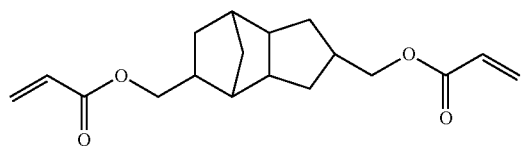
A-8 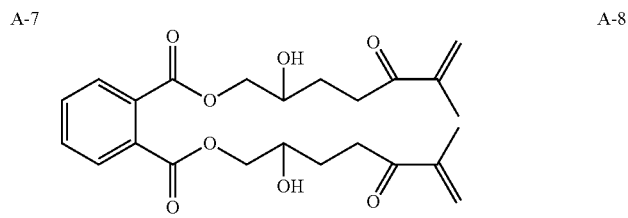
A-9 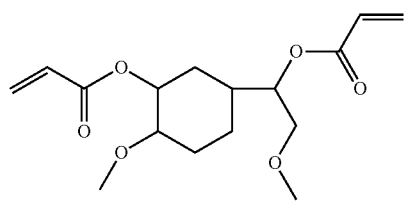
A-10 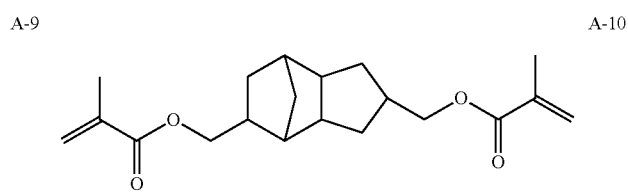
A-11 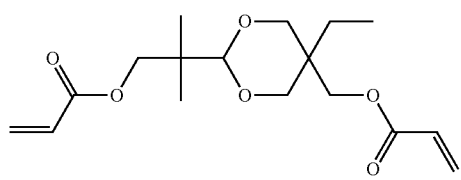
A-12 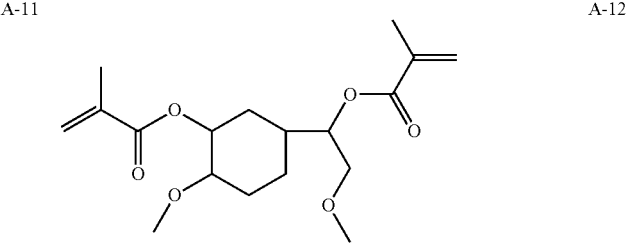
A-13 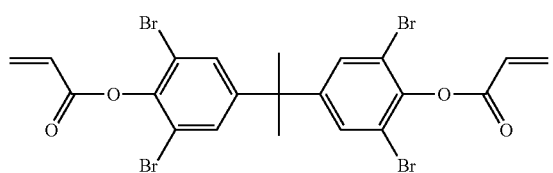
A-14 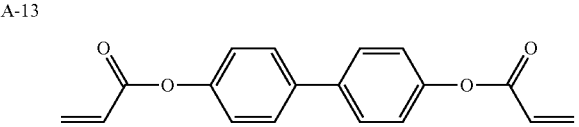
A-15 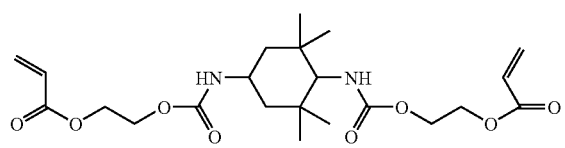
A-16 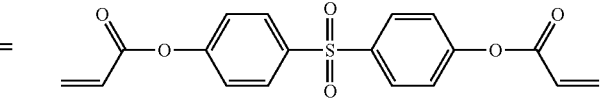
A-17
A-18 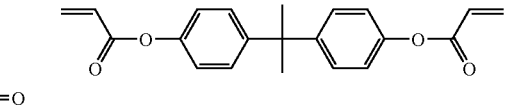

-continued

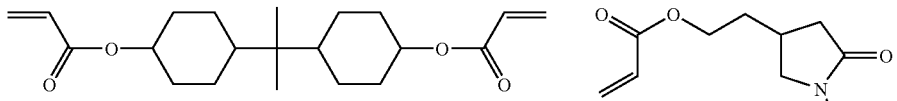

A-19

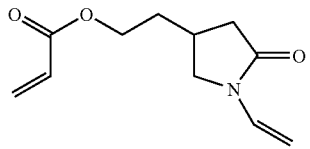

A-20

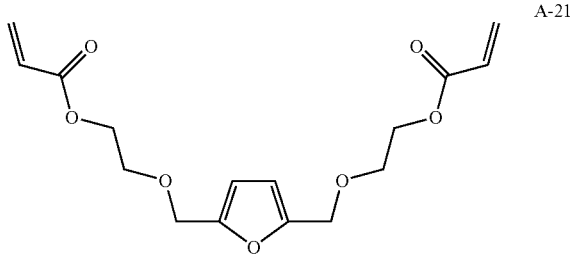

A-21

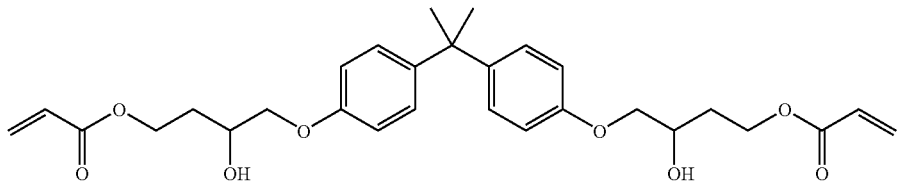

A-22

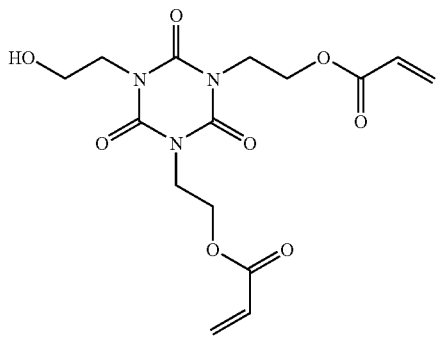

A-23

Moreover, the dendrimers disclosed e.g. in JP-A-2005-76005 and JP-A-2005-36105, and the norbornene ring-containing monomers as disclosed e.g. in JP-A-2005-60425 can also be used, and besides, the fluorine-containing multifunctional (meth)acrylates represented by the chemical formula (2) in JP-A-2002-105141 can also be used.

The multifunctional monomers as recited above may be used as combinations of two or more thereof. Polymerization of these monomers having ethylenic unsaturated groups can be performed by irradiation with ionizing radiation or by heating in the presence of a photo-radical initiator or a thermo-radical initiator.

In polymerization reaction of photopolymerizable multifunctional monomers, initiators for photopolymerization are preferably used. As initiators for photopolymerization, initiators for radical photopolymerization and those for cationic photopolymerization are suitable. Among them, the preferred in particular are initiators for radical photopolymerization.

(Fluorine-Containing Polymerizable Compound)

In the invention, fluorine-containing multifunctional monomers which are fluorine-containing compounds represented by the following formula (1) or (2), wherein at least three polymerizable groups are contained, the fluorine content is at least 35.0 mass % on a molecular weight basis and a calculated value of entire intercrosslink molecular weight when the polymerizable groups are polymerized is 300 or below, can also be used to advantage.

$$Rf-\{CH_2-OC(O)CH=CH_2\}_n \quad \text{Formula (1)}$$

$$Rf-\{OC(O)CH=CH_2\}_n \quad \text{Formula (2)}$$

In these formulae, Rf represents a linear or cyclic n-valent fluorocarbon group that contains at least carbon and fluorine atoms and may further contain oxygen or/and hydrogen atoms, and n represents an integer of 3 or above. It is preferred that Rf contain in a substantial sense only carbon and fluorine atoms, or only carbon, fluorine and oxygen atoms.

The calculated value of entire intercrosslink molecular weight refers to the total atomic weight of all the atomic groups sandwiched between (a) and (a), (b) and (b), or (a) and (b) when all the polymerizing groups in a fluorine-containing multifunctional monomer undergo polymerization to form a polymer, wherein (a) is a carbon atom having as substituents at least 3 atoms in total chosen from combinations of carbon, silicon and oxygen atoms and (b) is a silicon atom having as substituents at least 3 atoms in total chosen from combinations of carbon and oxygen atoms. When the calculated value of entire intercrosslink molecular weight reaches greater than 300, the hardness of the coating is lowered in some cases.

To be concrete, not only Compounds X-2 to X-4, X-6, X-8 to X-14 and X-21 to X-32 disclosed in JP-A-2006-28409, paragraph numbers [0023] to [0027], but also Compound X-33 illustrated below can also be used to advantage.

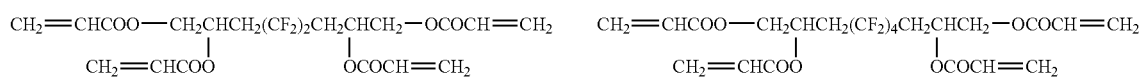
X-2
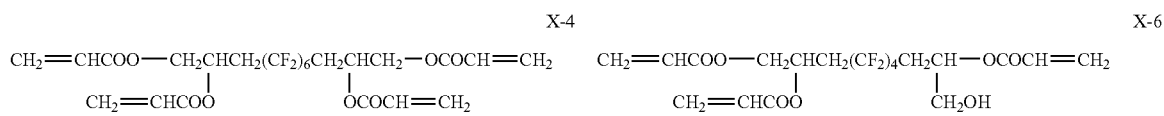
X-3
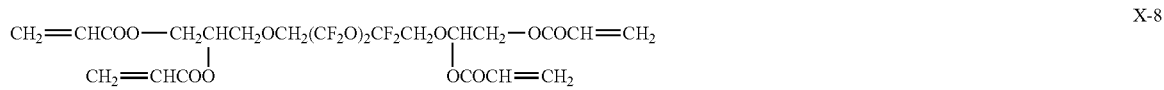
X-4
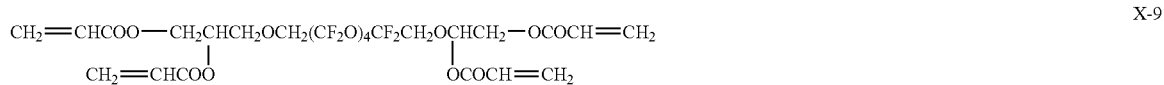
X-6
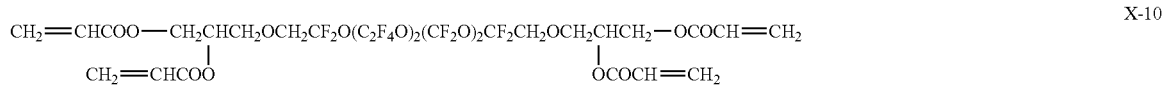
X-8
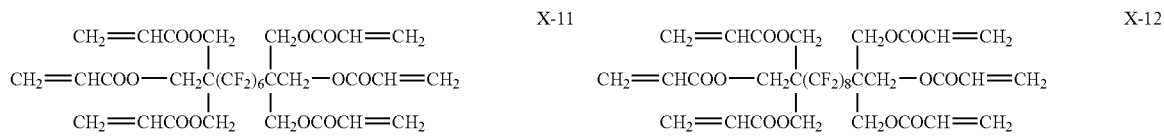
X-9
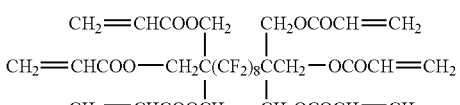
X-10
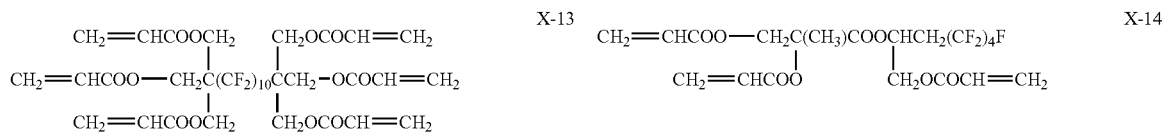
X-11
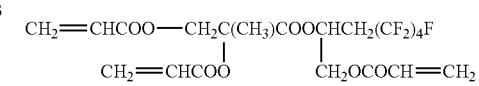
X-12
X-13
X-14
X-21

X-22
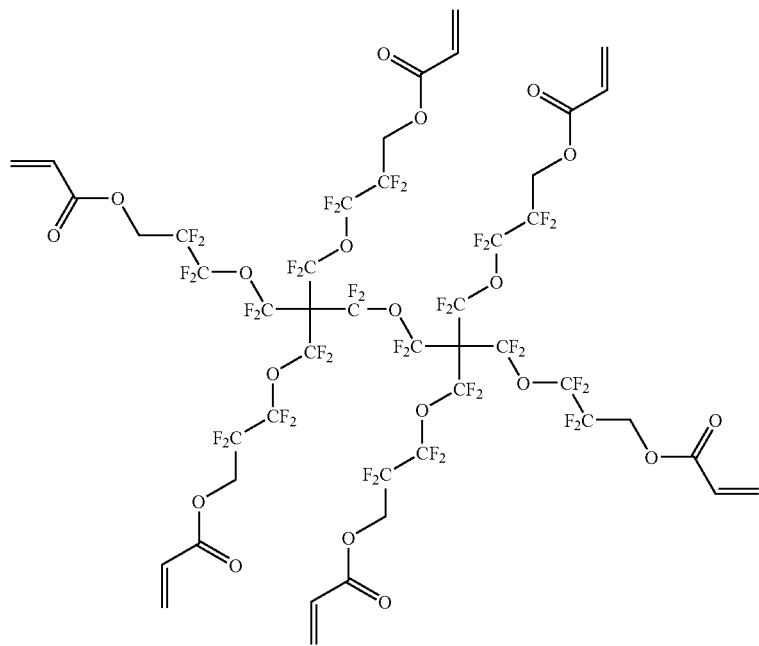
X-23
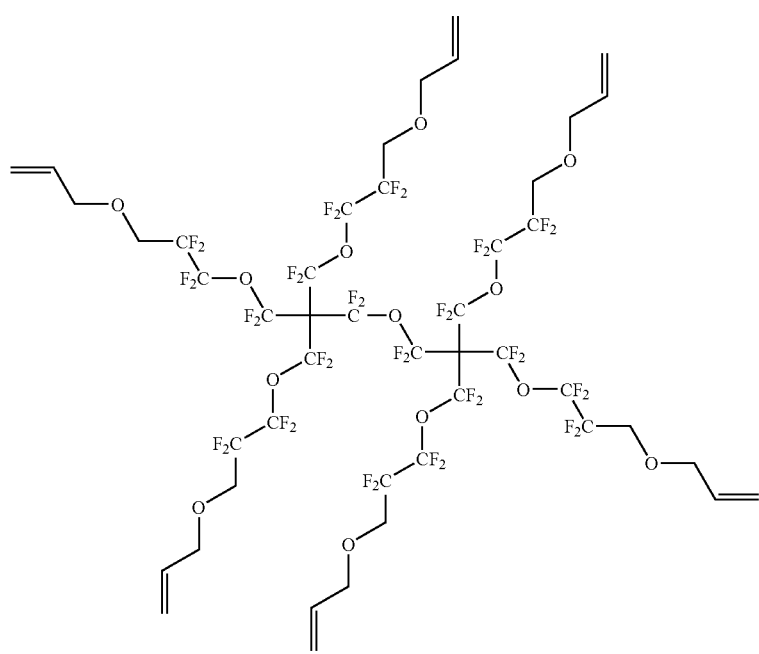

-continued
X-24
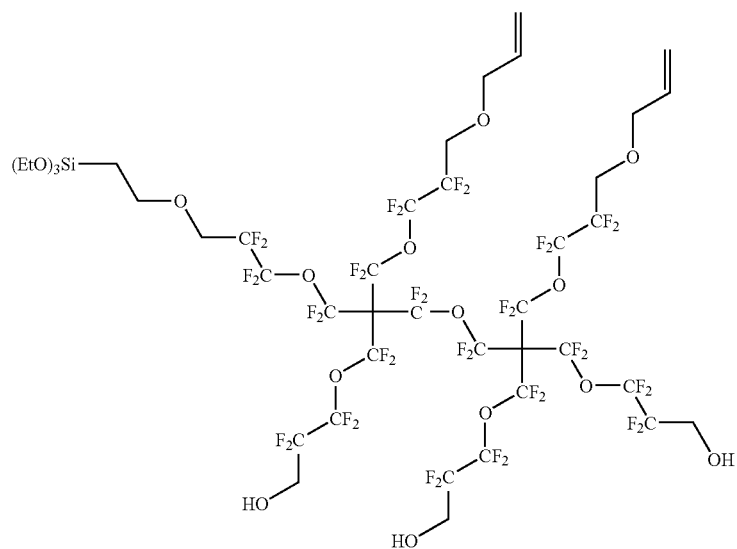
X-25
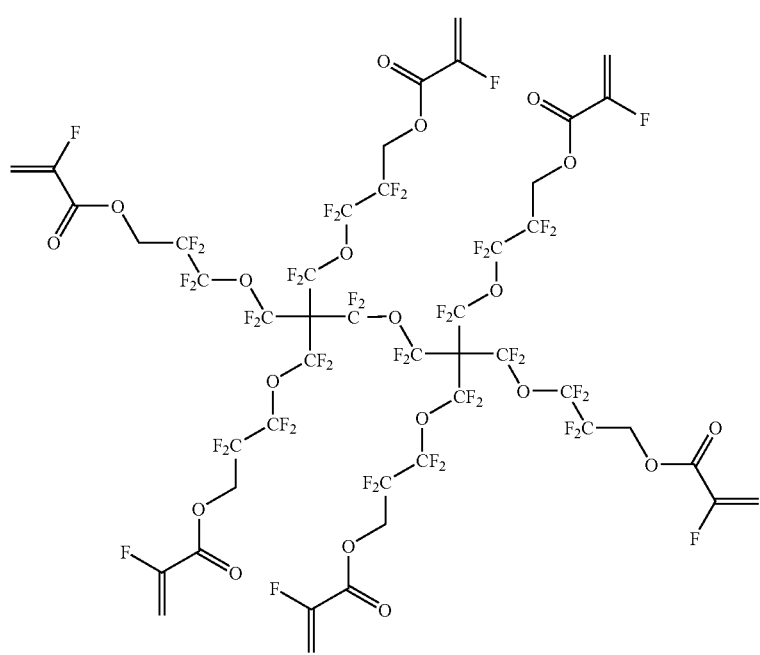

-continued
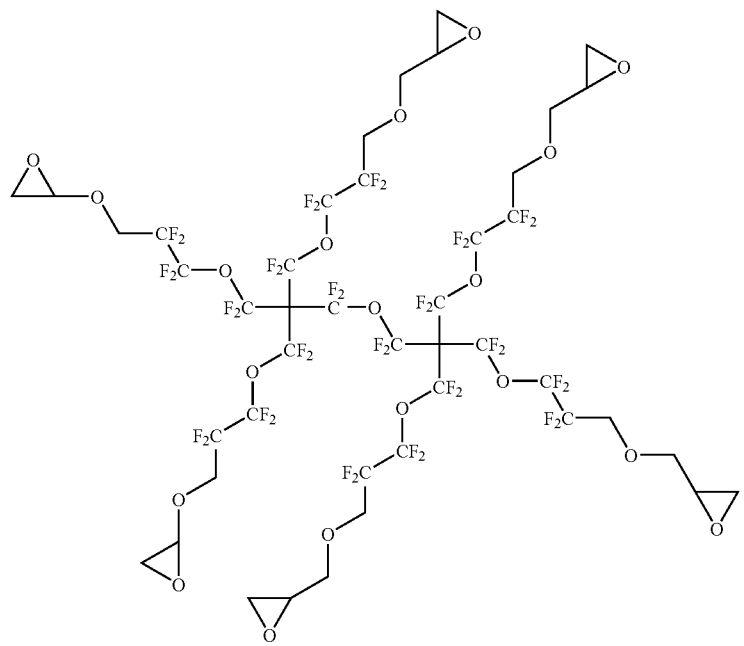
X-26
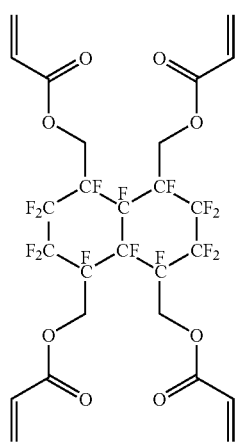
X-27
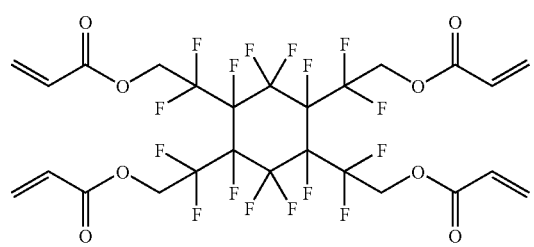
X-28

-continued
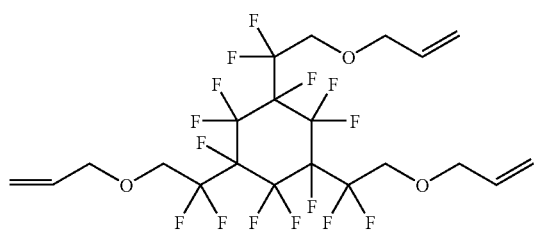
X-29
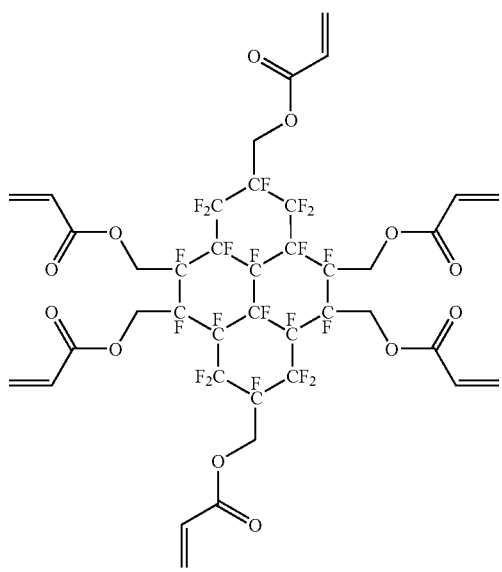
X-30
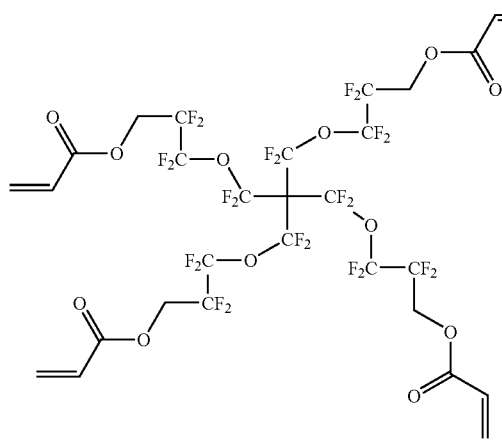
X-31
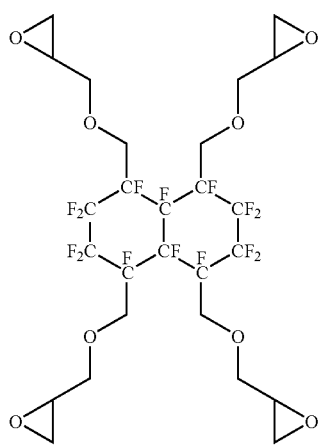
X-32
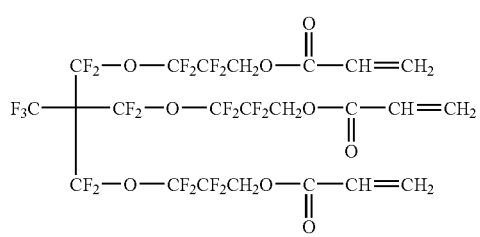
X-33
In addition, Compounds M-1 to M-16 illustrated below, which are disclosed in JP-A-2006-284761, paragraphs [0062] to [0065], can also be used to advantage.

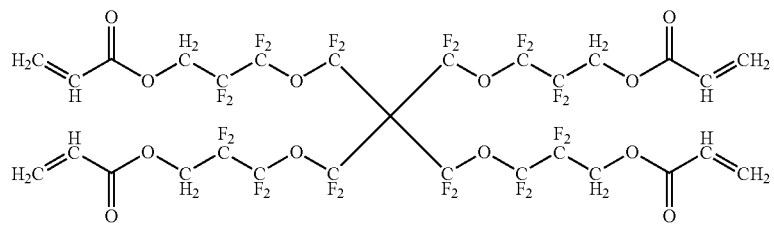
M-1
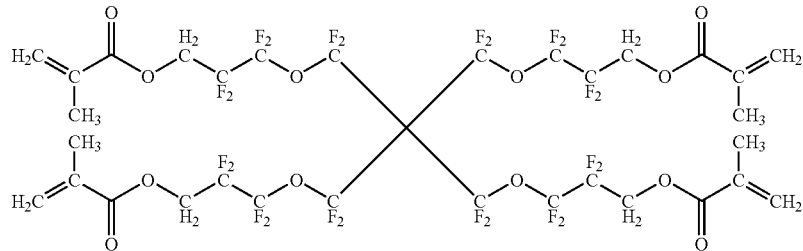
M-2
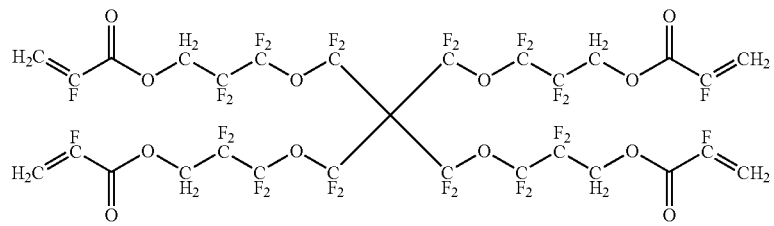
M-3
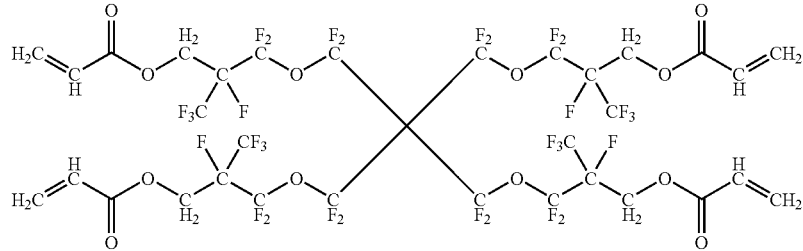
M-4
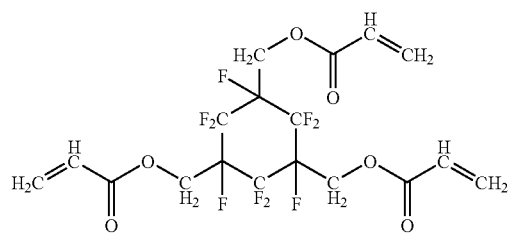
M-5
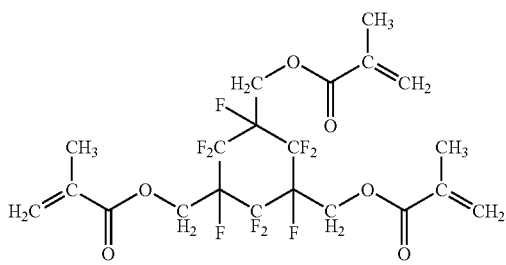
M-6
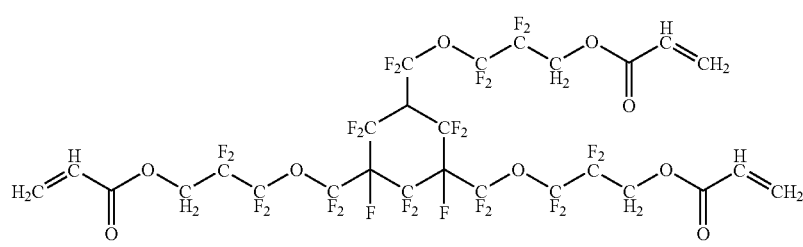
M-7

M-8
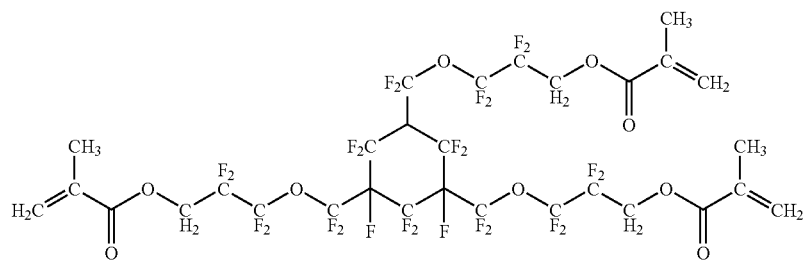
M-9
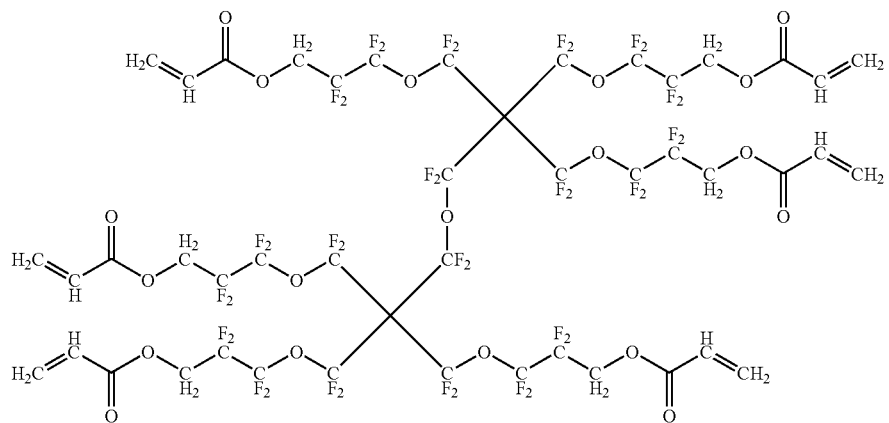
M-10
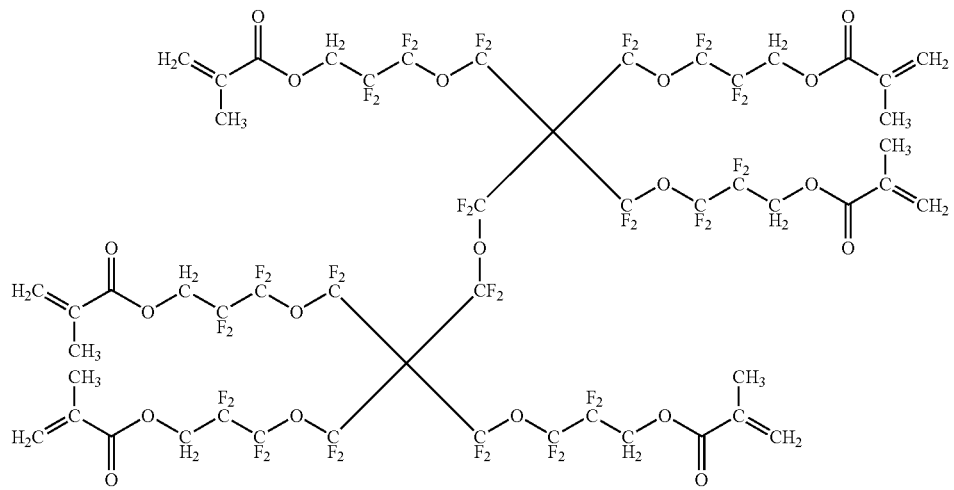
M-11
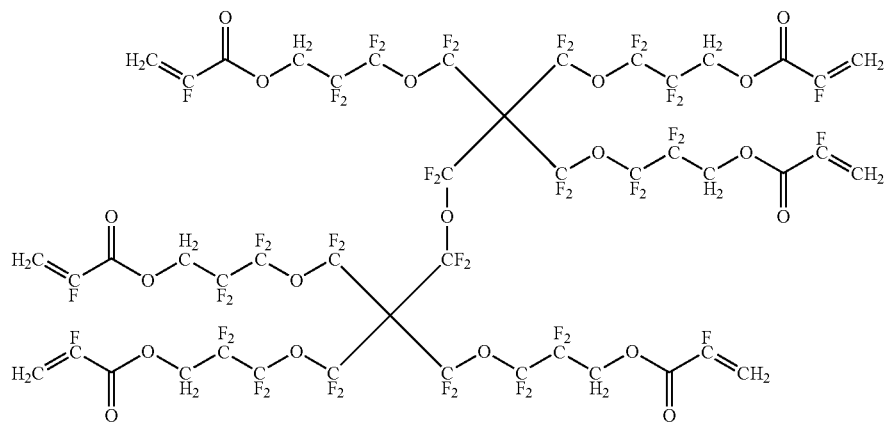

-continued
M-12
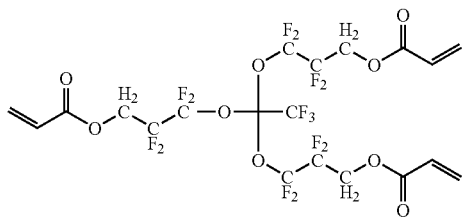
M-13
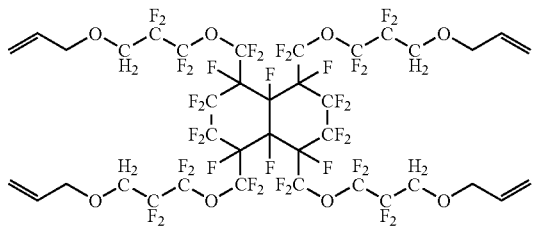
M-14
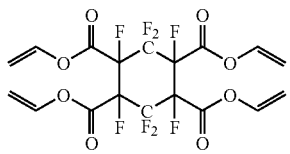
M-15
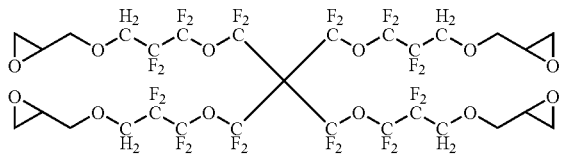
M-16
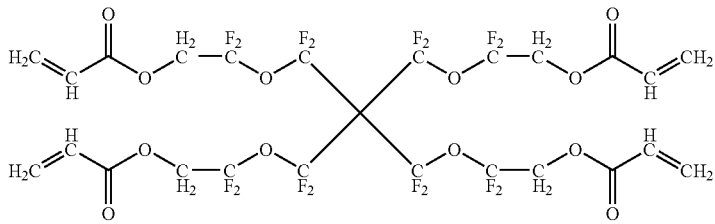
Further, Compounds MA1 to MA20 illustrate below can also be used to advantage.
MA1
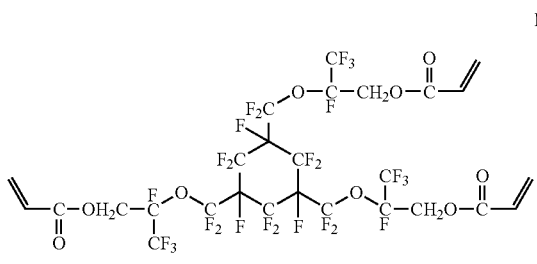
MA2
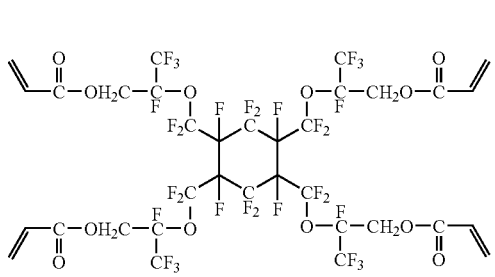
MA3
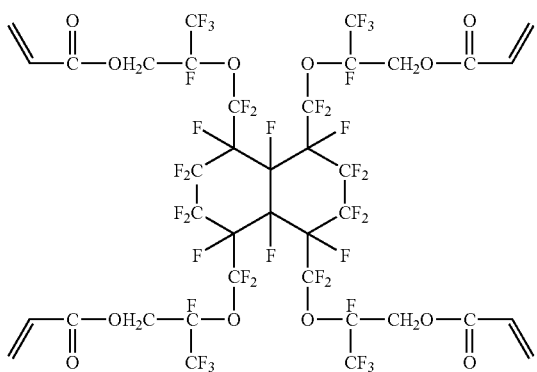
MA4
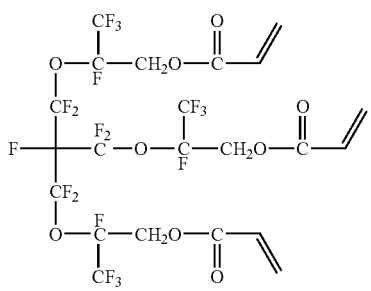

-continued
MA5
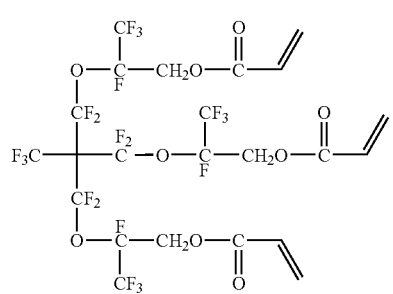
MA6
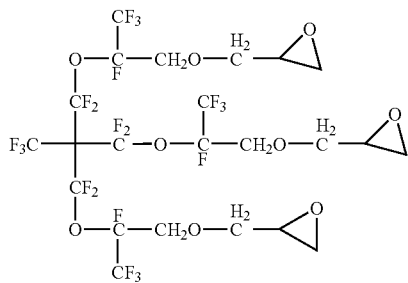
MA7
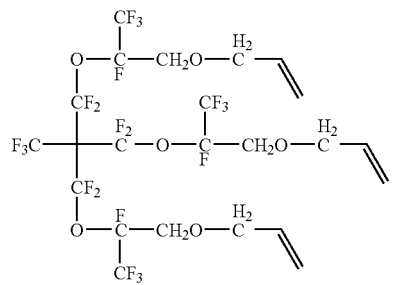
MA8
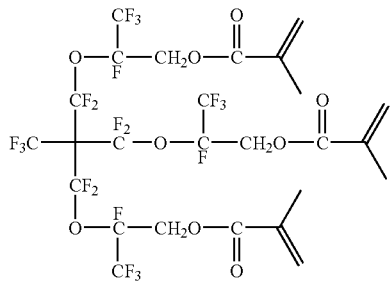
MA9
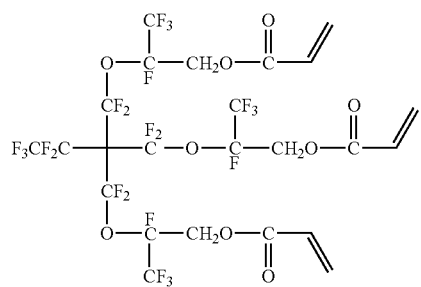
MA10
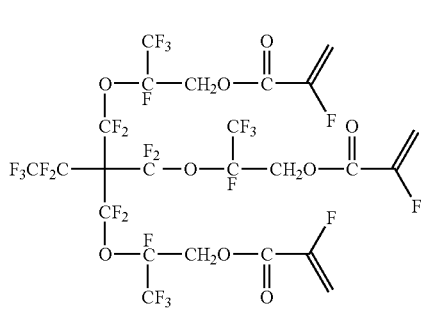
MA11
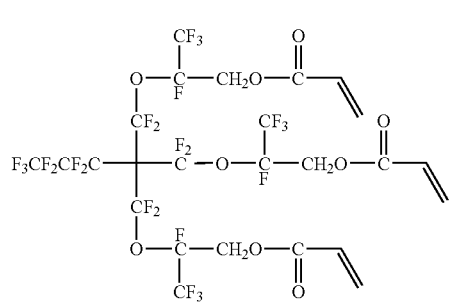
MA12
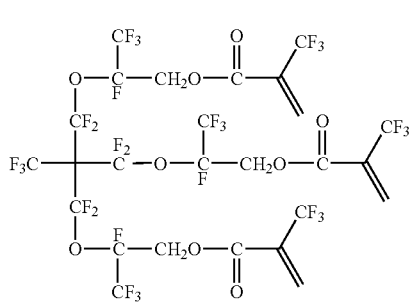
MA13
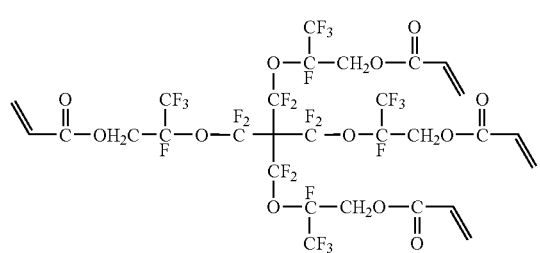
MA14
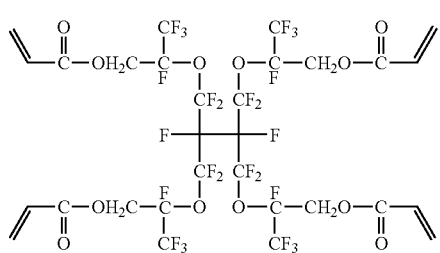

-continued
MA15
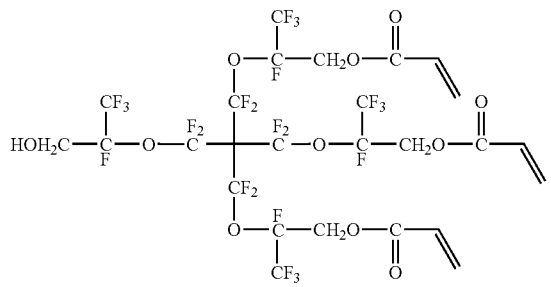
MA16
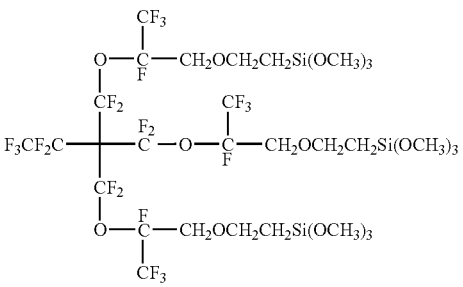
MA17
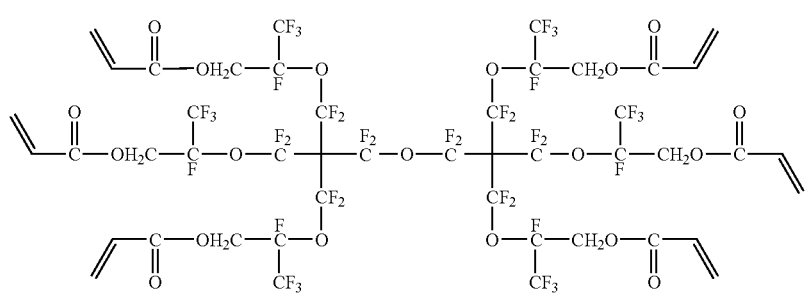
MA18
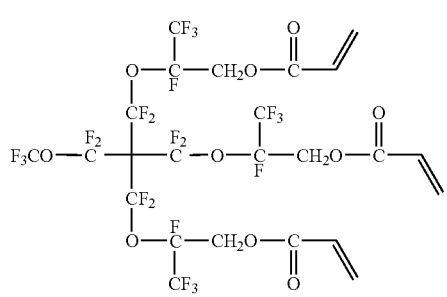
MA19
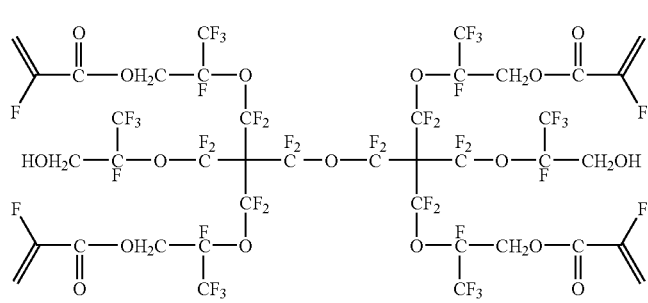
MA20
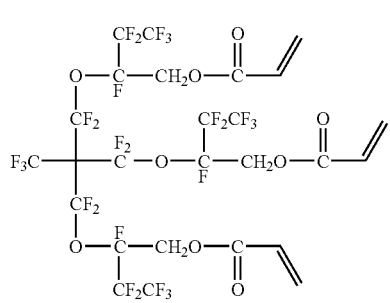

From the viewpoint of achieving the compatibility between scratch resistance and low refractive index, it is advantageous in particular to use X-22 or M-1, notably M-1.

In addition, the compounds illustrated below, which are disclosed in WO 2005/059601, paragraph numbers 0135 to 0149, can also be used to advantage.

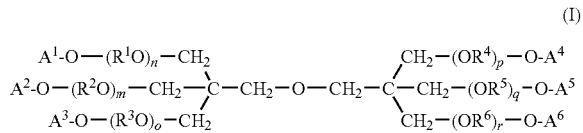

(I)

In the formula (I), each of $A^1$ to $A^6$ independently represents an acryloyl group, a methacryloyl group, an α-fluoroacryloyl group or a trifluoromethacryloyl group, each of n, m, o, p, q and r independently represents an integer of 0 to 2, and each of $R^1$ to $R^6$ independently represents an alkylene group having 1 to 3 carbon atoms or a fluoroalkylene group having 1 to 3 carbon atoms and at least one fluorine atom substituted for at least one hydrogen atom.

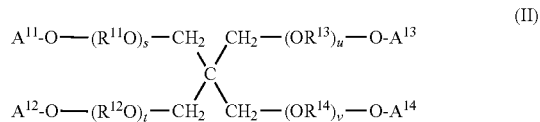

(II)

In the formula (II), each of $A^{11}$ to $A^{14}$ independently represents an acryloyl group, a methacryloyl group, an α-fluoroacryloyl group or a trifluoromethacryloyl group, each of s, t, u and v independently represents an integer of 0 to 2, and each of $R^{11}$ to $R^{14}$ independently represents an alkylene group having 1 to 3 carbon atoms or a fluoroalkylene group having 1 to 3 carbon atoms and at least one fluorine atom substituted for at least one hydrogen atom.

Further, the compounds disclosed in JP-A-2006-291077, paragraph numbers
to [0028], can also be used to advantage.
(Inorganic Fine Particles)

In the invention, various kinds of inorganic fine particles can be used in the low refractive index layer for the purposes of making refractive-index adjustment and improving physical characteristics such as hardness and scratch resistance, uniformity in thickness of a coating formed on the antiglare layer, cissing and optical characteristics such as reflectance and scattering power. As the inorganic fine particles, those having a low refractive index are preferable, and porous or hollow ones are especially preferred. Examples of such inorganic fine particles include fine particles of silica or hollow silica.

Figure 6A:
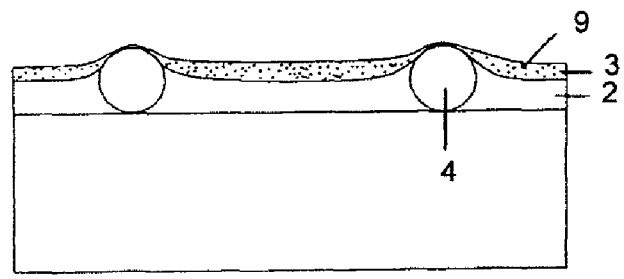
FIGS. 6A-6C illustrates inorganic fine particles in a low refraction index layer.
Figure 6B:
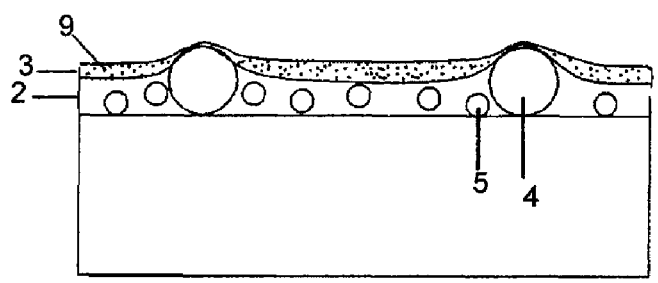
Figure 6C:
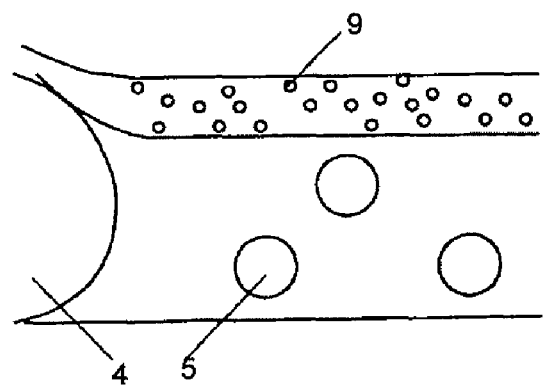

FIGS. 6A-6C illustrate the use of inorganic fine particles 9 in a low refraction index layer 3.

The amount of inorganic fine particles added to the low refractive index layer is preferably from 20 mass % to 70 mass %, more preferably from 30 mass % to 60 mass %, especially preferably from 40 mass % to 60 mass %, of the solid content in the low refractive index layer. When the amount of particles added is smaller than 20 mass %, there may occur cases where the scratch resistance obtained is insufficient and the coating formed on the antiglare layer tends to suffer cissing and nonuniform thickness. Two or more kinds of inorganic fine particles may be used in combination.

The porosity of porous or hollow fine particles is preferably from 10% to 80%, more preferably from 20% to 60%, especially preferably from 30% to 60%. From the viewpoints of refractive index reduction and durability retention, it is advantageous for the hollow fine particles to have their porosity in the range specified above.

When the porous or hollow particles are silica particles, the refractive index of the fine particles is preferably from 1.10 to 1.40, more preferably from 1.15 to 1.35, especially preferably from 1.15 to 1.30. The term "refractive index" used herein represents the refractive index of particles in their entirety, and does not mean the refractive index of the outer-shell silica alone.

The manufacturing method of porous or hollow silica is disclosed e.g. in JP-A-2001-233611 and JP-A-2002-79616. Particularly preferred particles are those having hollows in the interior of their shells, the pores of which are stopped up. The refractive index of these hollow silica particles can be calculated by the method described in JP-A-2002-79616.

The amount of porous or hollow silica coated is preferably from 1 mg/m² to 100 mg/m², more preferably from 5 mg/m² to 80 mg/m², further preferably from 10 mg/m² to 60 mg/m². Coating of silica in too small quantity causes insufficiency in effects of lowering the refractive index and enhancing scratch resistance, and coating in too large quantity results in a high incidence of fine asperities on the surface of the low refractive index layer and deterioration of outward appearance, such as denseness of black, and integrated reflectance.

The average particle size of porous or hollow silica is preferably from 30% to 100%, more preferably from 35% to 80%, further preferably from 40% to 65%, of thickness of the low refractive index layer. More specifically, when the thickness of the low refractive index layer is, say, 100 nm, the average particle size of hollow silica is preferably from 30 nm to 100 nm, more preferably from 35 nm to 80 nm, further preferably from 40 mu to 65 nm.

In the invention, fine particles having hollows in the interior thereof may have a size distribution, and the variation coefficient thereof is preferably from 60% to 5%, more preferably from 50% to 10%. Additionally, a mixture of two or more kinds of particles differing in average size may be used.

When the particle size of particulate silica is too small, the proportion of hollow portions is lessened, so reduction in refractive index is not expected; while, when the particle size is too large, fine asperities are formed on the surface of the low refractive index layer to result in deterioration of outward appearance, such as denseness of black, and integrated reflectance. The particulate silica may be either in a crystalline state or in an amorphous state, and it is preferably made up of monodisperse particles. Their best shape is a spherical shape, but they may be indefinite in shape.

And two or more kinds of hollow silica different in average particle size can be used in combination. Herein, the average particle size of hollow silica can be determined from electron micrographs.

The specific surface area of hollow silica usable in the invention is preferably from 20 m²/g to 300 m²/g, more preferably from 30 m²/g to 120 m²/g, especially preferably from 40 m²/g to 90 m²/g. The surface area can be determined by the BET method using nitrogen.

In the invention, the hollow silica may be used in combination with hollow-free silica. The suitable particle size of hollow-free silica is from 10 nm to 100 nm, preferably from 10 nm to 60 nm, especially preferably from 20 nm to 50 nm.
(Method for Surface Treatment of Inorganic Fine Particles)

Methods of treatment for surfaces of inorganic fine particles are described below, wherein porous or hollow inorganic fine particles are taken as an example of the inorganic fine particles. For the purpose of improving dispersibility in a coating composition for forming the low refractive index layer, it is appropriate that the surfaces of inorganic fine particles be treated with hydrolysis products of organosilane and/or partial condensates thereof. In the treatment, it is preferable that either an acid catalyst or a metal-chelate compound, or both are used. The organosilane used, though not particularly restricted as to its structure, is preferably an organosilane having a (meth)acryloyl group as its terminal group.

(Organosilane Compound)

As to at least one of the layers making up the present optical film, wherein included an antiglare layer, a low refractive index layer, a medium refractive index layer and a high refractive index layer, it is advantageous in point of scratch resistance that the coating composition for forming that layer contains at least one component of hydrolysis products of an organosilane compound and/or partial condensates thereof, or the so-called sol component (hereafter this term is adopted in some times).

For the purpose of achieving the compatibility between antireflection power and scratch resistance in antireflective film in particular, it is advantageous for the low refractive index layer to contain the sol component. In the process of drying and heating after application of the coating composition, this sol component undergoes condensation to form a hardened matter and constitutes part of binder in the low refractive index layer. When the hardened matter has polymerizable unsaturated bonds, the binder having a three-dimensional structure is formed by irradiation with actinic rays.

Organosilane compounds represented by the following formula 1 are favorably used for the foregoing purpose.

$$(R^1)_m-Si(X)_{4-m} \qquad \text{Formula 1}$$

In the formula 1, $R^1$ represents a substituted or unsubstituted alkyl group, or a substituted or unsubstituted aryl group. The alkyl group is preferably an alkyl group having 1 to 30 carbon atoms, more preferably that having 1 to 16 carbon atoms, particularly preferably that having 1 to 6 carbon atoms. Examples of such an alkyl group include methyl, ethyl, propyl, isopropyl, hexyl, decyl and hexadecyl groups. The aryl group is e.g. a phenyl group or a naphthyl group, preferably a phenyl group.

X represents a hydroxyl group or a hydrolysable group, with examples including an alkoxy group (preferably an alkoxy group having 1 to 5 carbon atoms, such as a methoxy or ethoxy group), a halogen atom (e.g. Cl, Br, I) and a group represented by $R^2COO$ (wherein $R^2$ is preferably a hydrogen atom or an alkyl group having 1 to 6 carbon atoms), such as $CH_3COO$ or $C_2H_5COO$. Of these groups, the alkoxy group, notably a methoxy group or an ethoxy group, is preferred over the others.

m represents an integer of 1 to 3, preferably 1 or 2.

When two or more Xs are present in the formula 1, each X may be the same as or different from every other X.

There is no particular restriction as to the substituents $R^1$ can have, and examples of such substituents include halogen atoms (e.g. fluorine, chlorine, bromine), a hydroxyl group, a mercapto group, a carboxyl group, an epoxy group, alkyl groups (e.g., methyl, ethyl, i-propyl, propyl, t-butyl), aryl groups (e.g. phenyl, naphthyl), aromatic heterocyclic groups (e.g. furyl, pyrazolyl, pyridyl), alkoxy groups (e.g. methoxy, ethoxy, i-propoxy, hexyloxy), aryloxy groups (e.g. phenoxy), alkylthio groups (e.g. methylthio, ethylthio), arylthio groups (e.g. phenylthio), alkenyl groups (e.g. vinyl, 1-propenyl), acyloxy groups (e.g. acetoxy, acryloylox, methacryloyloxy), alkoxycarbonyl groups (e.g. methoxycarbonyl, ethoxycarbonyl), aryloxycarbonyl groups (e.g. phenoxycarbonyl), carbamoyl groups (e.g. carbamoyl, N-methylcarbamoyl, N,N-dimethylcarbamoyl, N-methyl-N-octylcarbamoyl), and acylamino groups (e.g. acetylamino, benzoylamino, acrylamino, methacrylamino). These substituents may further be substituted.

$R^1$ is preferably a substituted alkyl group or a substituted aryl group.

As the organosilane compounds, organosilane compounds having vinyl polymerizable substituents, which are represented by the following formula 2 and can be synthesized using the compounds of the formula 1 as starting materials, are also suitable.

Formula 2:

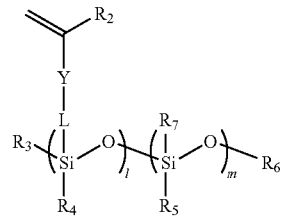

In the formula 2, $R_2$ represents a hydrogen atom, a methyl group, a methoxy group, an alkoxycarbonyl group, a cyano group, a fluorine atom or a chlorine atom. Examples of the alkoxycarbonyl group include a methoxycarbonyl group and an ethoxycarbonyl group. $R_2$ is preferably a hydrogen atom, a methyl group, a methoxy group, a methoxycarbonyl group, a fluorine atom or a chlorine atom, more preferably a hydrogen atom, a methyl group, a methoxycarbonyl group, a fluorine atom or a chlorine atom, particularly preferably a hydrogen atom or a methyl group.

Y represents a single bond, *—COO—**, *—CONH—** or *—O—**, and it is preferably a single bond, *—COO—** or *—CONH—**, more preferably a single bond or *—COO—**, particularly preferably *—COO—**. Herein, * indicates the site where each group is bound to =C($R_2$)—, and ** indicates the site where each group is bound to L.

L represents a divalent linkage group. Examples of such a linkage group include a substituted or unsubstituted alkylene group, a substituted or unsubstituted arylene group, a substituted or unsubstituted alkylene group having a linkage group (e.g. ether, ester or amide) in its insides, and a substituted or unsubstituted arylene group having a linkage group in its insides. Of these groups, a substituted or unsubstituted alkylene group, a substituted or unsubstituted arylene group and an alkylene group having a linkage group in its insides are preferred, an unsubstituted alkylene group, an unsubstituted arylene group and an alkylene group having an ether or ester linkage group in its insides are more preferred, and unsubstituted alkylene group and an alkylene group having an ether or ester linkage group in its insides are particularly preferred. Examples of substituents those groups can have include a halogen atom, a hydroxyl group, a mercapto group, a carboxyl group, an epoxy group, an alkyl group and an aryl group. These substituents may further be substituted.

l is a number satisfying the expression l=100-m, and m is a number of 0 to 50, preferably a number of 0 to 40, particularly preferably a number of 0 to 30.

Each of $R_3$ to $R_5$ is preferably a halogen atom, a hydroxyl group, an unsubstituted alkoxy group or an unsubstituted alkyl group, more preferably a chlorine atom, a hydroxyl group or an unsubstituted alkoxy group having 1 to 6 carbon atoms, further preferably a hydroxyl group or an alkoxy group having 1 to 3 carbon atoms, particularly preferably a hydroxyl group or a methoxy group.

$R_6$ represents a hydrogen atom or an alkyl group. The alkyl group is preferably a methyl group, an ethyl group or the like. $R_7$ is preferably a group defined as $R^1$ in the formula 1 or a hydroxyl group, more preferably a hydroxyl group or an unsubstituted alkyl group, further preferably a hydroxyl group or an alkyl group having 1 to 3 carbon atoms, particularly preferably a hydroxyl group or a methyl group.

The compounds represented by the formula 1 may be used as combinations of two or more thereof. In particular, the compounds represented by the formula 2 are preferably compounds which are each synthesized by using two varieties of compounds represented by the formula 1 as starting materials. Examples of compounds represented by the formula 1 and starting materials of the compounds represented by the formula 2 are illustrated below, but they should not be construed as being limited to the following examples.

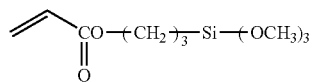
SI-1

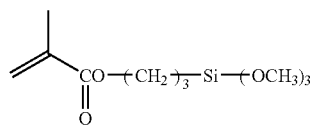
SI-2

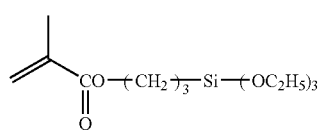
SI-3

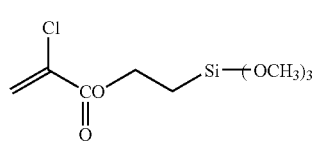
SI-4

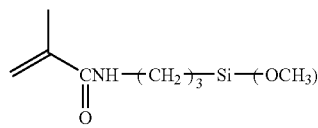
SI-5

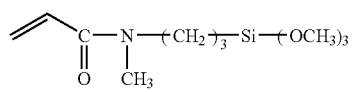
SI-6

SI-7

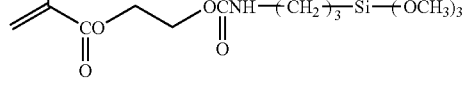
SI-8

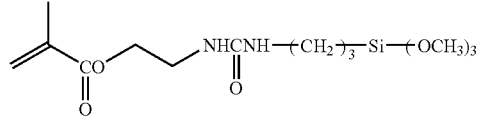
SI-9

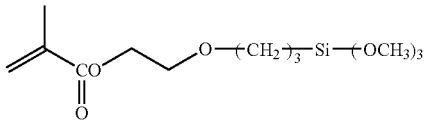
SI-10

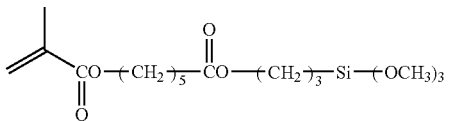
SI-11

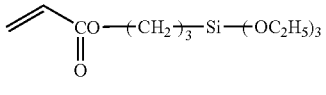
SI-12

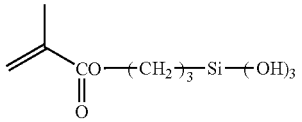
SI-13

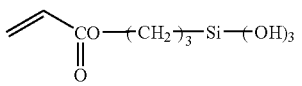
SI-14

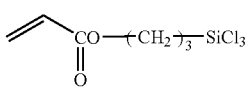
SI-15

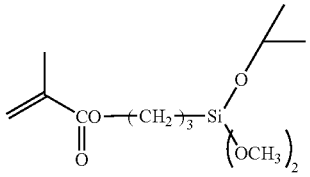
SI-16

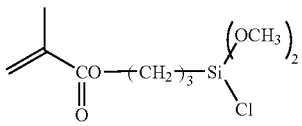
SI-17

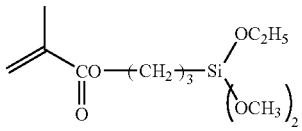
SI-18

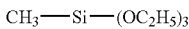
SI-19

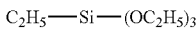
SI-20

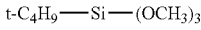
SI-21

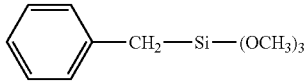
SI-22

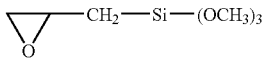
SI-23

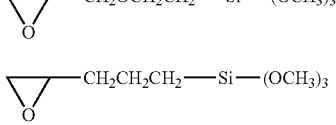
SI-24

SI-25

-continued

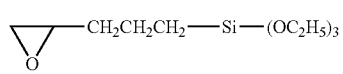

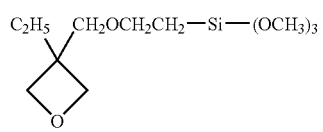

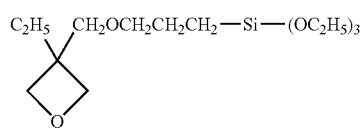

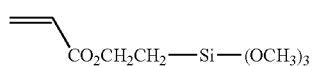

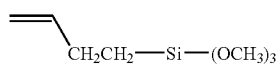

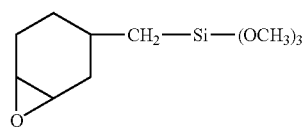

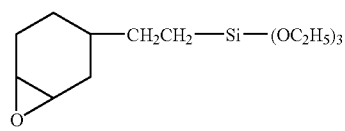

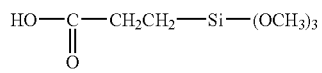

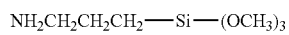

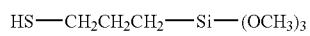

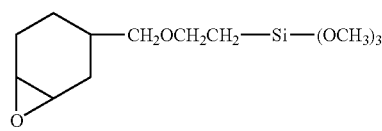

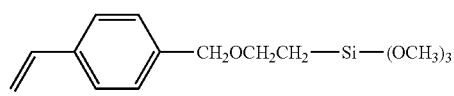

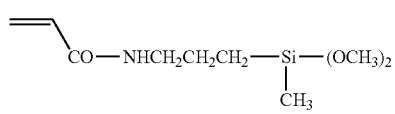

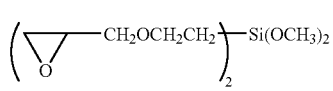

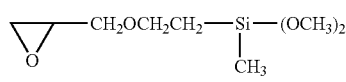

SI-26
SI-27
SI-28
SI-29
SI-30
SI-31
SI-32
SI-33
SI-34
SI-35
SI-36
SI-37
SI-38
SI-39
SI-40
SI-41
SI-42
SI-43

-continued

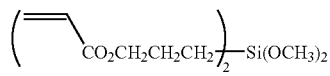

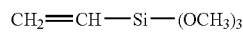

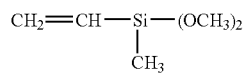

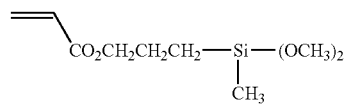

Methyltrimethoxysilane

SI-44
SI-45
SI-46
SI-47
SI-48

For obtaining the desired effect in the invention, it is appropriate that the vinyl polymerizable group-containing organosilane content in hydrolysis products of organosilanes and/or partial condensates thereof be equivalent to 30-100 mass %, preferably 50-100 mass %, more preferably 70-95 mass %, of the total amount of hydrolysis products of organosilanes and/or partial condensates thereof.

For stabilization of coating quality, it is appropriate that the volatility of at least either the hydrolysis products of organosilanes or partial condensates thereof be controlled. Specifically, the per-hour volatilization at 105° C. is limited to preferably 5 mass % or below, more preferably 3 mass % or below, particularly preferably 1 mass % or below.

The sol component used in the invention is prepared by subjecting organosilanes to hydrolysis and/or partial condensation.

Hydrolysis and condensation reactions of organosilanes are carried out by adding water in an amount of 0.05 to 2.0 moles, preferably 0.1 to 1.0 mole, per mole of hydrolysable groups (X), and stirring at 25-100° C. in the presence of a catalyst usable in the invention.

In at least either the hydrolysis products of the organosilanes or the partial condensates thereof, when the component lower than 300 in molecular weight is removed, the mass-average molecular weight of either hydrolysis products of the vinyl polymerizable group-containing organosilane or partial condensates thereof is preferably from 450 to 20,000, more preferably from 500 to 10,000, further preferably from 550 to 5,000, particularly preferably from 600 to 3,000.

Herein, the mass-average molecular weight and the molecular weight are molecular weights measured through differential refractometer detection with a GPC analyzer using columns TSKgel GMHxL, TSKgel G4000HxL and TSKgel G2000HxL (trade names, products of TOSOH CORPORATION) and a solvent THF and calculated in terms of polystyrene, and the content is an area % of peaks within the molecular weight range specified above, with taking the peak area of the components having molecular weight of 300 or higher as 100%.

The dispersion degree (mass-average molecular weight/number-average molecular weight) is preferably from 3.0 to 1.1, more preferably from 2.5 to 1.1, further preferably from 2.0 to 1.1, particularly preferably from 1.5 to 1.1.

Hydrolysis products of organosilane compounds used in the invention and partial condensates thereof are described in detail.

Hydrolysis reaction of organosilanes and subsequent condensation reaction are generally carried out in the presence of catalysts. Examples of catalysts usable therein include inorganic acids, such as hydrochloric acid, sulfuric acid and nitric acid; organic acids, such as oxalic acid, acetic acid, butyric acid, maleic acid, citric acid, formic acid, methanesulfonic acid and toluenesulfonic acid; inorganic bases, such as sodium hydroxide, potassium hydroxide and ammonia; organic bases, such as triethylamine and pyridine; metal alkoxides, such as triisopropoxyaluminum, tetrabutoxyzirconium, tetrabutyltitanate and dibutyltin dilaurate; metal-chelate compounds containing e.g. Zr, Ti and Al as their respective central metals; and fluorine-containing compounds, such as KF and $NH_4F$.

These catalysts may be used alone, or as combinations of two or more thereof.

The hydrolysis and condensation reactions of organosilanes can be performed in the absence or presence of a solvent, but it is advantageous to use an organic solvent for the purpose of mixing ingredients homogeneously. For example, alcohol, aromatic hydrocarbon, ether, ketone and ester are suitable as the organic solvent used for such a purpose.

Solvents capable of dissolving both organosilanes and catalysts are preferably used. In addition, it is appropriate from the process point of view to use an organic solvent as a coating liquid or part of a coating liquid. Further, it is preferable that, when mixed with other materials such as a fluorine-containing polymer, the organic solvent used does not impair their solubility or dispersibility.

The hydrolysis and condensation of organosilanes are performed by adding to the organosilanes 0.05 to 2 moles, preferably 0.1 to 1 mole, of water per mole of hydrolyzable groups and stirring them at a temperature of 25° C. to 100° C. in the presence or absence of the solvent as recited above, and that in the presence of a catalyst.

To a coating solution used in the invention, at least either a β-diketone compound or a β-ketoester compound is preferably added in addition to a composition containing the sol component and a metal-chelate compound.

It is appropriate that hydrolysis products of the organosilane compounds and their partial condensates have a low content in the antireflective layer formed of relatively thin film and a high content in the hard coating or antiglare layer formed of thick film. Their content, considering manifestation of effects and the refractive index, shape and surface condition of the film formed, is preferably from 0.1 to 50 mass %, more preferably from 0.5 to 30 mass %, especially preferably from 1 to 15 mass %, of the total solid content in the layer containing them (the layer to which they are added).

<High Refractive Index Layer and Medium Refractive Index Layer>

The present optical film has a high refractive index layer for the purpose of enhancing its antireflection capability. Further, the present optical film can further have a medium refractive index layer.

Hereinafter, the high refractive index layer and the medium refractive index layer are sometimes collectively called a high refractive index layer. Additionally, the adjectives "high", "medium" and "low" in the expressions of "high refractive index layer", "medium refractive index layer" and "low refractive index layer", respectively, describe a relative magnitude relation among refractive indexes of layers. As for the refractive-index relation with the transparent support, it is preferable that the relational expressions, transparent support>low refractive index layer and high refractive index layer>transparent support, are satisfied.

In the invention, the medium refractive index layer is a layer higher in refractive index than the antiglare layer and lower in refractive index than a high refractive index layer, and preferably provided between the antiglare layer and the high refractive index layer.

Thus, when the interference layer has a two-layer structure as in the makeup of antiglare layer/high refractive index layer/low refractive layer, the makeup may be expressed as antiglare layer/medium refractive index layer/low refractive index layer.

Further, the high refractive index layer, the medium refractive index layer and the low refractive index layer are sometimes collectively called an antireflective layer.

When the optical film is structured so that a high refractive index layer and a low refractive index layer are provided on the antiglare layer, the refractive index of the high refractive index layer can be chosen from a range of 1.53 to 2.30, and the suitable setting thereof is from 1.55 to 2.30, preferably from 1.55 to 2.00, more preferably from 1.55 to 1.70.

When the optical film is formed by providing on the support a medium refractive index layer, a high refractive index layer and a low refractive index layer in order of increasing distance from the support, the refractive index of the high refractive index layer is preferably from 1.60 to 2.30, more preferably from 1.65 to 2.20. And the refractive index of the medium refractive index layer is adjusted to take a value intermediate between the refractive index of the low refractive index layer and that of the high refractive index layer. The refractive index of the medium refractive index layer is preferably from 1.55 to 1.80, more preferably from 1.60 to 1.75, further preferably from 1.60 to 1.70.

Each of the high refractive index layer and the medium refractive index layer for use in the invention can preferably contain inorganic particles for the purposes of making an adjustment to its refractive index and improving its ability to be coated on the antiglare layer. In forming each of the high refractive index layer and the medium refractive index layer, it is preferable that the dispersion liquid prepared by dispersing inorganic particles into a dispersion medium is further admixed preferably with binder precursors (e.g. the ionizing radiation-curable multifunctional monomers or oligomers as recited hereinafter) required for matrix formation, an initiator for photopolymerization and so on, thereby preparing a coating composition for formation of each of high and medium refractive index layers, and the coating compositions thus prepared are coated on a transparent support and cured by crosslinking reaction or polymerization reaction of the ionizing radiation-curable compounds (such as multifunctional monomers and oligomers).

As the binder precursors usable in the high refractive index layer and the medium refractive index layer, the compounds as recited above (those having polymerizable unsaturated bonds) are suitable. These compounds may be used as combinations of two or more thereof.

To each of the high refractive index layer and the medium refractive index layer, the binder precursors are preferably added in a proportion of 5 to 80 mass % based on the total solid content in the coating composition for each layer.

The content of inorganic fine particles in each of the high refractive index layer and the low refractive index layer preferably constitutes 30 to 90 mass %, more preferably 40 to 80 mass %, particularly preferably 50 to 75 mass %, of the total solid content in each layer. A combination of two or more kinds of inorganic fine particles may be used in each layer.

In the high refractive index layer and the medium refractive index layer, binder precursors prepared by crosslinking or polymerization reaction of ionizing radiation-curable compounds containing aromatic rings, ionizing radiation-curable compounds containing halogen atoms other than fluorine atoms (e.g. Br, I, Cl), ionizing radiation-curable compounds containing S, N or/and P atoms, or the like can also be used to advantage.

(Inorganic Fine Particles)

For the purposes of making adjustments to refractive indexes, improving thickness uniformity and cissing in a coating formed on the antiglare layer, and enhancing physical properties, such as hardness, and optical properties, such as reflectance and scattering capability, various kinds of inorganic fine particles can be used in the invention. The amount of inorganic fine particles added to each of the high refractive index layer and the medium refractive index layer is preferably at least 30 mass %, more preferably at least 40 mass %, especially preferably at least 50 mass %, of the total solid content in each layer. The addition of particles in an amount smaller than 30 mass % is undesirable because cissing occurs on the antiglare layer and the resultant coating degrade uniformity of its thickness.

The inorganic fine particles are fine particles of oxide of at least one kind of metal chosen from silicon, zirconium, titanium, aluminum, indium, zinc, tin or antimony, with examples including $SiO_2$, $ZrO_2$, $TiO_2$, $Al_2O_3$, $In_2O_3$, $ZnO$, $SnO_2$, $Sb_2O_3$, ITO and ATO. In other words, it is preferable in the invention that the high refractive index layer and the medium refractive index layer contain fine particles of oxide of at least one metal chosen from Si, Al, Ti, Zr, Sb, Zn, Sn or In. In addition to these fine particles, other inorganic fine particles, such as $BaSO_4$, $CaCO_3$, talc or kaolin, can also be used.

When the high refractive index layer and the medium refractive index layer are formed, it is preferred that the coating composition prepared by dispersing inorganic fine particles having a high refractive index in combination with the binder precursors, and further an initiator and an organically-substituted silicon compound into a solvent be converted into a cured matter.

As the inorganic fine particles dispersed into the coating composition, $ZrO_2$ and $TiO_2$ are especially suitable in point of refractive index.

As the $TiO_2$ particles, inorganic particles whose major constituent is $TiO_2$ containing at least one element chosen from cobalt, aluminum or zirconium are especially suitable. The term "major constituent" used herein refers to the constituent having the highest content (mass %) of all the constituents of the particles.

It is appropriate in the invention that the particles containing $TiO_2$ as the major constituent have their refractive index in a range of 1.90 to 2.80, preferably 2.10 to 2.80, especially preferably 2.20 to 2.80.

The suitable crystal structure of particles containing $TiO_2$ as the major constituent is a structure having as its main component a rutile structure, a mixed rutile-anatase structure, an anatase structure or an amorphous structure, and it is especially preferred that the main component of the particle structure be a rutile structure. The term "main component" as used herein refers to the component having the highest content (mass %) of all the structural components of the particles.

By incorporating at least one element chosen from Co (cobalt), Al (aluminum) or Zr (zirconium) into particles whose major constituent is $TiO_2$, the photocatalytic activity of $TiO_2$ can be suppressed, and weather resistance of the present film can be improved.

Of those elements, Co (cobalt) is especially preferable to the others. And a combined use of two or more of those elements is also preferred.

The inorganic particles containing $TiO_2$ as the major constituent may have a core/shell structure by undergoing surface treatment as disclosed in JP-A-2001-166104.

It is preferable that the size of the inorganic fine particles used in the invention is minimized in a dispersion medium, and the suitable weight-average particle size is from 1 to 200 nm, preferably from 5 to 150 nm, more preferably 10 to 100 nm, particularly preferably from 10 to 80 nm. By fining the inorganic particles so as to have sizes not larger than 200 nm, film can be formed without loss of transparency. The sizes of inorganic fine particles can be determined by use of light-scattering methods or electron micrographs.

The specific surface area of the inorganic fine particles is preferably from 10 to 400 $m^2/g$, more preferably from 20 to 200 $m^2/g$, especially preferably from 30 to 150 $m^2/g$.

The inorganic fine particles for use in the invention are preferably dispersed into a dispersion medium and added to a coating solution for forming each constituent layer.

As a dispersion medium for inorganic fine particles, liquid having its boiling point in a range of 60° C. to 170° C. is preferably used. Examples of such a dispersion medium include water, alcohol (e.g. methanol, ethanol, isopropanol, butanol, benzyl alcohol), ketone (e.g. acetone, methyl ethyl ketone, methyl isobutyl ketone, cyclohexanone), ester (e.g. methyl acetate, ethyl acetate, propyl acetate, butyl acetate, methyl formate, ethyl formate, propyl formate, butyl formate), aliphatic hydrocarbon (e.g. hexane, cyclohexane), halogenated hydrocarbon (e.g. methylene chloride, chloroform, carbon tetrachloride), aromatic hydrocarbon (e.g. benzene, toluene, xylene), amide (e.g. dimethylformamide, dimethylacetamide, n-methylpyrrolidone), ether (e.g. diethyl ether, dioxane, tetrahydrofuran), and etheralcohol (e.g. 1-methoxy-2-propanol). Of these dispersion media, toluene, xylene, methyl ethyl ketone, methyl isobutyl ketone, cyclohexanone and butanol are preferable to the others.

Among them, especially preferred dispersion media are methyl ethyl ketone, methyl isobutyl ketone and cyclohexanone.

The inorganic fine particles are dispersed by means of a dispersing machine. Examples of the dispersing machine include a sand grinder mill (e.g. a pin-attached bead mill), a high speed impeller mill, a pebble mill, an attrition mill and a colloid mill. Of these dispersing machines, a sand grinder mill and a high speed impeller mill are preferred over the others. In addition, a preliminary dispersion treatment may be carried out. Examples of a dispersing machine used in the preliminary dispersion treatment include a ball mill, a three-rod roll mill, a kneader and an extruder.

(Conductive Particles)

In order to impart conductivity to the present optical film, various kinds of conductive particles can be used.

The conductive particles are preferably formed from a metal oxide or nitride. Examples of a metal oxide or nitride include tin oxide, indium oxide, zinc oxide and titanium nitride. Among them, tin oxide and indium oxide are preferred over the others. The conductive inorganic particles contain such a metal oxide or nitride as their major constituent, and can further contain other elements. The term "major constituent" as used herein refers to the constituent having the highest content (mass %) of all the constituents of the particles. Examples of other elements include Ti, Zr, Sn, Sb, Cu, Fe, Mn, Pb, Cd, As, Cr, Hg, Zn, Al, Mg, Si, P, S, B, Nb, In, V and halogen atoms. For the purpose of enhancing conductivity of tin oxide and indium oxide, addition of Sb, Sn, P, B, Nb, In, V or a halogen atom is favorable. In particular, Sb-containing tin oxide (ATO) and Sn-containing indium oxide (ITO) are preferred. The suitable proportion of Sb in ATO is from 3 to 20 mass %, and that of Sn in ITO is from 5 to 20 mass %.

The conductive inorganic particles may be subjected to surface treatment. The surface treatment is performed using an inorganic compound or an organic compound. The inorganic compound used suitably for the surface treatment is alumina or silica, and silica treatment in particular is favorable. Examples of an organic compound used for the surface treatment include polyol, alkanolamine, stearic acid, a silane coupling agent and a titanate coupling agent. Of these compounds, a silane coupling agent is especially preferred. Two or more types of surface treatment may be carried out in combination.

The conductive inorganic particles are preferably in the shape of a rice grain, a sphere, a cube or a spindle, or indefinite in shape. Additionally, a combination of two or more kinds of conductive particles may be used in a specific layer or in film form.

In forming an antistatic layer, the conductive inorganic particles can be used in a state of being dispersed.

In the invention, at least one of the thin-film layers that make up an antireflective film can be designed to function as a conductive layer. More specifically, conductivity is imparted to at least one of the thin-film layers including the low refractive index layer, the medium refractive index layer and the high refractive index layer, which allows the layer to function also as a conductive layer. This step is highly beneficial in point of process simplification. Herein, it is appropriate to select materials used for a conductive layer so that the thickness and refractive index of the conductive layer satisfy the requirements for the medium refractive index layer or the high refractive index layer. From the viewpoint of preventing electrostatic buildup at the film surface, it is most suitable to impart conductivity to the low refractive index layer because the low refractive index layer is the surface layer or the surface neighborhood layer of the antireflective film. In many cases, however, conductive particles and compounds are materials having high refractive indexes, so they cause a problem that the intended low refractive index is difficult to achieve. Since conductive particles and compounds are materials high in refractive index, it is easy to impart conductivity to the medium refractive index layer and the high refractive index layer.

The thickness of the high refractive index layer and that of the medium refractive index layer can be chosen as appropriate according to the intended uses. When the optical film is made by forming on the antiglare layer the high refractive index layer and the low refractive index layer in order of mention, the thickness of the high refractive index layer is preferably from 30 to 200 nm, more preferably from 50 to 170 nm, particularly preferably from 60 to 150 nm.

When the optical film is made by coating a support with three thin-film layers, namely the medium refractive index layer, the high refractive index layer and the low refractive index layer which are arranged in order of increasing distance from the support, the thickness of the medium refractive index layer is preferably from 30 to 150 nm, more preferably from 40 to 100 nm, especially preferably from 40 to 70 nm, while the thickness of the high refractive index layer is preferably from 30 to 200 nm, more preferably from 50 to 150 nm, especially from 90 to 140 nm.

When low reflectance is intended to be achieved by taking advantage of optical interference in a laminate of thin-film layers different in refractive index, it is appropriate to laminate two or more thin-film layers each having thickness of the order of 200 nm or below. These thin-film layers have very thin thickness of 200 nm or below and differ from layers referred to as e.g. an overcoat layer and a surface-adjusting layer which are provided for controlling unevenness of the antiglare layer. With uneven surface shapes of antiglare layers currently in use, thin-film layers formed on such uneven layers by coating come to have nonuniform thickness caused by the unevenness, resulting in insufficient reflectance drop. Therefore, the uneven surface shape of the antiglare layer according to the invention becomes very important.

As to the haze values of the high refractive index layer and the medium refractive index layer, the lower the better in the case where the layers are free of particles for giving them an antiglare function. Specifically, the haze value is preferably 5% or below, more preferably 3% or below, particularly preferably 1% or below.

The high refractive index layer and the medium refractive index layer are preferably built on the antiglare layer directly or via another layer.

[Leveling Agent]

Various kinds of leveling agents are preferably used in at least one of the layers according to the invention. By using them in the high refractive index layer or the medium refractive index layer, the resultant layer can have improvements in nonuniform thickness and cissing of coatings ascribable to unevenness of the antiglare layer surface. Accordingly, it is preferable that the high refractive index layer contains a leveling agent, and it is also preferable that the medium refractive index layer contains a leveling agent. By further using a leveling agent in the antiglare layer, it becomes possible to improve the surface condition (to prevent unevenness).

As the leveling agent, a fluorine-containing leveling agent or a silicon-containing leveling agent is suitable, and the combined use of these agents is particularly suitable because of increase in effects of improving nonuniform thickness and cissing. In addition, it is preferable that the leveling agent is an oligomer or polymer rather than a low molecular compound.

Upon addition of a leveling agent, the leveling agent moves quickly to the surface of liquid film coated and is localized thereto. Even after the film is dried, the leveling agent remains on the film surface as it is. So, the film surface energies of the high refractive index, medium refractive index and antiglare layers are lowered by the addition of a leveling agent. From the viewpoint of preventing not only the high refractive index layer and the medium refractive index layer from suffering nonuniform thickness and cissing but also the antiglare layer from becoming uneven, it is preferred that the surface energy of the film be low.

The surface energy ($\gamma s^v$: unit of mJ/m$^2$) of the antiglare layer can be experimentally determined using purified water H$_2$O and methylene iodide CH$_2$I$_2$ on the antiglare layer by reference to D. K. Owens, *J. Appl. Polym. Sci.*, vol. 13, p. 1741 (1969). Herein, the contact angles of pure water and methylene iodide are symbolized as $\theta_{H2O}$ and $\theta_{CH2I2}$ respectively, and $\gamma s^d$ and $\gamma s^h$ are determined from the following simultaneous equations (1) and (2), and further the value represented by sum of those values $\gamma s^v$ ($=\gamma s^d \pm \gamma s^h$) is defined as the energy value (mJ/m$^2$ unit converted from mN/m unit) converted from the surface tension of the antiglare layer. It is necessary for a sample to undergo moisture control for a given time or more under specified temperature-humidity conditions before measurements. In the moisture control, it is appropriate that the temperature be in a range of 20° C. to 27° C., the humidity be in a range of 50 to 65 RH %, and the moisture control time be 2 hours or more.

$$1 + \cos\theta_{H2O} = 2\sqrt{\gamma s^d}\left(\frac{\sqrt{\gamma_{H2O}^d}}{\gamma_{H2O}^v}\right) + 2\sqrt{\gamma s^h}\left(\frac{\sqrt{\gamma_{H2O}^h}}{\gamma_{H2O}^v}\right) \quad (1)$$

$$1+\cos\theta_{CH2I2}=2\sqrt{\gamma s^d}\left(\frac{\sqrt{\gamma_{CH2I2}^d}}{\gamma_{CH2I2}^v}\right)+2\sqrt{\gamma s^h}\left(\frac{\sqrt{\gamma_{CH2I2}^h}}{\gamma_{CH2I2}^v}\right) \quad (2)$$

Herein, $\gamma_{H2O}{}^d=21.8°$, $\gamma_{H2O}{}^h=51.0°$, $\gamma_{H2O}{}^v=72.8°$, $\gamma_{CH2I2}{}^d=49.5°$, $\gamma_{CH2I2}{}^h=1.3°$, and $\gamma_{CH2I2}{}^v=50.8°$.

The suitable surface energies of the high refractive index layer, the medium refractive index layer and the antiglare layer is 45 mJ/m² or below, preferably in a range of 20 to 45 mJ/m², more preferably in a range of 20 to 40 mJ/m². By reducing the surface energy of each layer to 45 mJ/m² or below, the effects of making the film thickness on the antiglare layer uniform and improving the cissing on the antiglare layer can be obtained. However, when an upper layer like the low refractive index layer is further provided on a layer to which a leveling agent is added, it is advantageous for the leveling agent to have a property of being eluted from the layer to which it is added and moving to the upper layer, and it is preferred that the layer to which the leveling agent is added can have rather high surface energy of 35 to 70 mJ/m² after it is dipped and washed in the solvent of a coating solution for the upper layer thereof (e.g. methyl ethyl ketone, methyl isobutyl ketone, toluene or cyclohexanone).

Fluorine-containing leveling agents suitable as those used for the foregoing purposes are illustrated below. On the other hand, silicon-containing leveling agents are illustrated later.
(Fluorine-Containing Leveling Agent)

The fluorine-containing leveling agents are preferably polymers having fluorinated aliphatic groups, and useful ones as such polymers are polymers made up of repeating units (polymerizing units) corresponding to the following monomers (i), acrylic or methacrylic resins containing repeating units (polymerizing units) corresponding to the following monomers (i) and repeating units (polymerizing units) corresponding to the following monomers (ii), and copolymers of these monomers and vinyl monomers copolymerizable therewith. Compounds usable as these monomers are the compounds as described in *Polymer Handbook*, 2$^{nd}$ ed., chap. 2. pp. 1-483, J. Brandrup, Wiley Interscience (1975), and examples thereof include compounds each having one addition-polymerizable unsaturated bond, such as acrylic acid, methacrylic acid, acrylates, methacrylates, acrylamides, methacrylamides, allyl compounds, vinyl ethers and vinyl esters.

(i) Fluorinated aliphatic group-containing monomers represented by the following formula (4-1):

Formula (4-1)

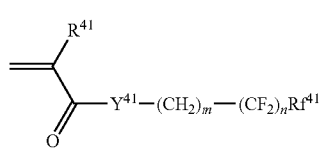

In the formula (4-1), $R^{41}$ is a hydrogen atom, a halogen atom or a methyl group, preferably a hydrogen atom or a methyl group. $Y^{41}$ is an oxygen atom, a sulfur atom or) —N($R^{42}$)—, preferably an oxygen atom or —N($R^{42}$)—, more preferably an oxygen atom. $R^{42}$ is a hydrogen atom or an alkyl group which contains 1 to 8 carbon atoms and may have a substituent, preferably a hydrogen atom or an alkyl group containing 1 to 4 carbon atoms, more preferably a hydrogen atom or a methyl group. $R_f^{41}$ is —$CF_3$ or —$CF_2H$.

m in the formula (4-1) represents an integer of 1 to 6, preferably 1 to 3, more preferably 1. n in the formula (4-1) represents an integer of 1 to 11, preferably 1 to 9, more preferably 1 to 6. $R_f^{41}$ is preferably —$CF_2H$.

In each fluorinated aliphatic group-containing (co)polymer, two or more kinds of polymerizing units derived from the fluorinated aliphatic group-containing monomers represented by the formula (4-1) may be contained as its constituents.

(ii) Monomers represented by the following formula (4-2) and copolymerizable with the monomers (i):

Formula (4-2)

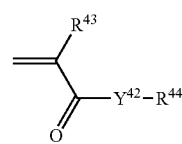

In the formula (4-2), $R^{43}$ is a hydrogen atom, a halogen atom or a methyl group, preferably a hydrogen atom or a methyl group. $Y^{42}$ is an oxygen atom, a sulfur atom or —N($R^{45}$)—, preferably an oxygen atom or —N($R^{45}$)—, more preferably an oxygen atom. $R^{45}$ is a hydrogen atom or an alkyl group containing 1 to 8 carbon atoms, preferably a hydrogen atom or an alkyl group containing 1 to 4 carbon atoms, more preferably a hydrogen atom or a methyl group. $R^{44}$ is a straight-chain, branched or cyclic alkyl group which contains 1 to 60 carbon atoms and may have a substituent, or an aromatic group which may have a substituent (e.g. a phenyl group or a naphthyl group). The alkyl group herein may contain a poly(alkyleneoxy) group. Of these alkyl groups, straight-chain, branched and cyclic alkyl groups containing 1 to 20 carbon atoms are preferred over the others, and straight-chain and branched alkyl groups containing 1 to 10 carbon atoms are exceedingly preferred. The amount of the fluorinated aliphatic group-containing monomers of the formula (4-1) used in preparation of a preferred (co)polymer containing fluorinated aliphatic groups is at least 10 mass %, preferably at least 50 mass %, more preferably from 70 to 100 mass %, further preferably from 80 to 100 mass %, based on the total amount of monomers constituting the (co)polymer.

Examples of the specific structural formulae of preferred polymer and copolymer containing fluorinated aliphatic groups include, but not limited to, those illustrated below. Additionally, the numerical subscript added to each monomer unit indicates a mole fraction of the monomer unit. And Mw represents a mass-average molecular weight.

TABLE 1

$$-(CH_2-\underset{\underset{CO_2-CH_2-(CF_2)_n-H}{|}}{\overset{R}{C}})_{100}-$$

| | R | n | Mw |
|---|---|---|---|
| FP-1 | H | 4 | 8,000 |
| FP-2 | H | 4 | 16,000 |
| FP-3 | H | 4 | 33,000 |
| FP-4 | $CH_3$ | 4 | 12,000 |
| FP-5 | $CH_3$ | 4 | 28,000 |
| FP-6 | H | 6 | 8,000 |
| FP-7 | H | 6 | 14,000 |
| FP-8 | H | 6 | 29,000 |
| FP-9 | $CH_3$ | 6 | 10,000 |
| FP-10 | $CH_3$ | 6 | 21,000 |

TABLE 1-continued $$-(CH_2-\underset{\underset{CO_2-CH_2-(CF_2)_n-H}{|}}{\overset{\overset{R}{|}}{C}})_{100}-$$

| | R | n | Mw |
|---|---|---|---|
| FP-11 | H | 8 | 4,000 |
| FP-12 | H | 8 | 16,000 |
| FP-13 | H | 8 | 31,000 |
| FP-14 | $CH_3$ | 8 | 3,000 |
| FP-15 | $CH_3$ | 8 | 10,000 |
| FP-16 | $CH_3$ | 8 | 27,000 |
| FP-17 | H | 10 | 5,000 |
| FP-18 | H | 10 | 11,000 |
| FP-19 | $CH_3$ | 10 | 4,500 |
| FP-20 | $CH_3$ | 10 | 12,000 |
| FP-21 | H | 12 | 5,000 |
| FP-22 | H | 12 | 10,000 |
| FP-23 | $CH_3$ | 12 | 5,500 |
| FP-24 | $CH_3$ | 12 | 12,000 |

TABLE 2

$$-(CH_2-\underset{\underset{CO_2-(CH_2)_p-(CF_2)_q-H}{|}}{\overset{\overset{R^1}{|}}{C}})_x-(CH_2-\underset{\underset{CO_2-(CH_2)_r-(CF_2)_s-H}{|}}{\overset{\overset{R^2}{|}}{C}})_{100-x}-$$

| | x | $R^1$ | p | q | $R^2$ | r | s | Mw |
|---|---|---|---|---|---|---|---|---|
| FP-25 | 50 | H | 1 | 4 | $CH_3$ | 1 | 4 | 10,000 |
| FP-26 | 40 | H | 1 | 4 | H | 1 | 6 | 14,000 |
| FP-27 | 60 | H | 1 | 4 | $CH_3$ | 1 | 6 | 21,000 |
| FP-28 | 10 | H | 1 | 4 | H | 1 | 8 | 11,000 |
| FP-29 | 40 | H | 1 | 4 | H | 1 | 8 | 16,000 |
| FP-30 | 20 | H | 1 | 4 | $CH_3$ | 1 | 8 | 8,000 |
| FP-31 | 10 | $CH_3$ | 1 | 4 | $CH_3$ | 1 | 8 | 7,000 |
| FP-32 | 50 | H | 1 | 6 | $CH_3$ | 1 | 6 | 12,000 |
| FP-33 | 50 | H | 1 | 6 | $CH_3$ | 1 | 6 | 22,000 |
| FP-34 | 30 | H | 1 | 6 | $CH_3$ | 1 | 6 | 5,000 |
| FP-35 | 40 | $CH_3$ | 1 | 6 | H | 3 | 6 | 3,000 |
| FP-36 | 10 | H | 1 | 6 | H | 1 | 8 | 7,000 |
| FP-37 | 30 | H | 1 | 6 | H | 1 | 8 | 17,000 |
| FP-38 | 50 | H | 1 | 6 | H | 1 | 8 | 16,000 |
| FP-39 | 50 | $CH_3$ | 1 | 6 | H | 3 | 8 | 19,000 |
| FP-40 | 50 | H | 1 | 8 | $CH_3$ | 1 | 8 | 5,000 |
| FP-41 | 80 | H | 1 | 8 | $CH_3$ | 1 | 8 | 10,000 |
| FP-42 | 50 | $CH_3$ | 1 | 8 | H | 3 | 8 | 14,000 |
| FP-43 | 90 | H | 1 | 8 | $CH_3$ | 3 | 8 | 9,000 |
| FP-44 | 70 | H | 1 | 8 | H | 1 | 10 | 7,000 |
| FP-45 | 90 | H | 1 | 8 | H | 3 | 10 | 12,000 |
| FP-46 | 50 | H | 1 | 8 | H | 1 | 12 | 10,000 |
| FP-47 | 70 | H | 1 | 8 | $CH_3$ | 3 | 12 | 8,000 |

TABLE 3

$$-(CH_2-\underset{\underset{CO_2-CH_2-(CF_2)_n-H}{|}}{\overset{\overset{R^1}{|}}{C}})_x-(CH_2-\underset{\underset{CO_2-R^3}{|}}{\overset{\overset{R^2}{|}}{C}})_{100-x}-$$

| | x | $R^1$ | n | $R^2$ | $R^3$ | Mw |
|---|---|---|---|---|---|---|
| FP-48 | 90 | H | 6 | H | $C_2H_5$ | 9,000 |
| FP-49 | 80 | H | 6 | H | $C_2H_5$ | 24,000 |
| FP-50 | 60 | H | 6 | H | $C_2H_5$ | 36,000 |
| FP-51 | 90 | H | 6 | H | $C_4H_9(n)$ | 15,000 |
| FP-52 | 80 | H | 6 | H | $C_4H_9(n)$ | 17,000 |
| FP-53 | 60 | H | 6 | H | $C_4H_9(n)$ | 10,000 |
| FP-54 | 90 | H | 6 | H | $C_4H_9(iso)$ | 16,000 |
| FP-55 | 80 | H | 6 | H | $C_4H_9(iso)$ | 18,000 |
| FP-56 | 60 | H | 6 | H | $C_4H_9(iso)$ | 21,000 |
| FP-57 | 90 | H | 6 | H | $C_4H_9(t)$ | 14,000 |
| FP-58 | 80 | H | 6 | H | $C_4H_9(t)$ | 12,000 |
| FP-59 | 60 | H | 6 | H | $C_4H_9(t)$ | 13,000 |
| FP-60 | 90 | H | 6 | H | $C_6H_{13}(n)$ | 10,000 |
| FP-61 | 80 | H | 6 | H | $C_6H_{13}(n)$ | 8,000 |
| FP-62 | 60 | H | 6 | H | $C_6H_{13}(n)$ | 12,000 |
| FP-63 | 80 | H | 4 | H | $C_2H_5$ | 25,000 |
| FP-64 | 80 | H | 4 | H | $C_4H_9(n)$ | 32,000 |
| FP-65 | 80 | H | 4 | H | $C_4H_9(iso)$ | 28,000 |
| FP-66 | 80 | H | 4 | H | $C_4H_9(t)$ | 25,000 |
| FP-67 | 80 | H | 4 | H | $C_6H_{13}(n)$ | 20,000 |
| FP-68 | 80 | H | 8 | H | $C_2H_5$ | 5,000 |
| FP-69 | 80 | H | 8 | H | $C_4H_9(n)$ | 6,000 |
| FP-70 | 80 | H | 8 | H | $C_4H_9(iso)$ | 5,000 |
| FP-71 | 80 | H | 8 | H | $C_4H_9(t)$ | 7,000 |
| FP-72 | 80 | H | 8 | H | $C_6H_{13}(n)$ | 5,000 |
| FP-78 | 80 | H | 4 | $CH_3$ | $C_2H_5$ | 12,000 |
| FP-79 | 80 | H | 4 | $CH_3$ | $C_4H_9(n)$ | 14,000 |
| FP-80 | 80 | H | 4 | $CH_3$ | $C_4H_9(iso)$ | 20,000 |
| FP-81 | 80 | H | 4 | $CH_3$ | $C_4H_9(t)$ | 22,000 |
| FP-82 | 80 | H | 4 | $CH_3$ | $C_6H_{13}(n)$ | 18,000 |
| FP-83 | 80 | $CH_3$ | 4 | $CH_3$ | $C_2H_5$ | 6,000 |
| FP-84 | 80 | $CH_3$ | 4 | $CH_3$ | $C_4H_9(n)$ | 8,000 |
| FP-85 | 80 | $CH_3$ | 4 | $CH_3$ | $C_4H_9(iso)$ | 7,000 |
| FP-86 | 80 | $CH_3$ | 4 | $CH_3$ | $C_4H_9(t)$ | 12,000 |
| FP-87 | 80 | $CH_3$ | 4 | $CH_3$ | $C_6H_{13}(n)$ | 5,000 |

The proportion of the polymerizing units derived from a fluorinated aliphatic group-containing monomer in a (co) polymer containing fluorinated aliphatic groups is preferably greater than 10 mass %, more preferably from 50 to 100 mass %, and especially preferably from 75 to 100 mass % when a premium is placed on the viewpoint of preventing unevenness of the antiglare layer, or from 50 to 75 mass % when the low refractive index layer is coated on the antiglare layer (as expressed on the basis of the total polymerizing units that constitute the (co)polymer containing fluorinated aliphatic groups).

(Silicon-Containing Leveling Agent)

Next, silicon-containing leveling agents are described.

Suitable examples of a silicon-containing leveling agent include silicone compounds which each contain a plurality of dimethylsilyloxy groups as repeating units and having substituents at the end(s) of their main chains and/or on their side chains. In the compound chain containing dimethylsilyloxy groups as repeating units, structural units other than the dimethylsilyloxy groups may be included. Each of the substituents may be the same as or different from every other substituent, and it is preferable that two or more substituents are present in each compound. Suitable examples of such a substituent include a polyether group, an alkyl group, an aryl group, an aryloxy group, an acryloyl group, a methacryloyl group, a vinyl group, an aryl group, a cinnamoyl group, an epoxy group, an oxetanyl group, a hydroxyl group, a fluoroalkyl group, a polyoxyalkylene group, a carboxyl group and an amino group.

Such silicone compounds have no particular limits to their molecular weight, but their molecular weight is preferably 100,000 or below, more preferably 50,000 or below, particularly preferably from 1,000 to 30,000, most preferably from 1,000 to 20,000.

The silicon atom content in such a silicone compound, though not particularly limited, is preferably at least 18.0 mass %, more preferably from 25.0 to 37.8 mass %, particularly preferably from 30.0 to 37.0 mass %.

Suitable examples of such a silicone compound include, but not limited to, X-22-174DX, X-22-2426, X-22-164B, X22-164C, X-22-170DX, X-22-176D and X-22-1821 (all of which are trade names and products of Shin-Etsu Chemical Co., Ltd.); FM-0725, FM-7725, FM-4421, FM-5521, FM-6621 and FM-1121 (all of which are trade names and products of CHISSO CORPORATION); DMS-U22, RMS-033, RMS-083, UMS-182, DMS-H21, DMS-H31, HMS-301, FMS121, FMS123, FMS131, FMS141 and FMS221 (all of which are trade names and products of Gelest, Inc.); SH200, DC11PA, SH28PA, ST80PA, ST86PA, ST97PA, SH550, SH710, L7604, FZ-2105, FZ2123, FZ2162, FZ-2191, FZ2203, FZ-2207, FZ-3704, FZ-3736, FZ-3501, FZ-3789, L-77, L-720, L-7001, L-7002, L-7604, Y-7006, SS-2801, SS-2802, SS-2803, SS-2804 and SS-2805 (all of which are trade names and products of Dow Corning Toray); and TSF400, TSF401, TSF410, TSF433, TSF4450 and TSF4460 (all of which are trade names and products of Momentive Performance Materials, Inc.).

When used in the hard-coat layer and the antiglare layer, the fluorine-containing leveling agent and the silicon-containing leveling agent are added in an amount of preferably 0.001 to 1.0 mass %, more preferably 0.01 to 0.2 mass %, based on the coating solution for each layer. On the other hand, when used in the medium refractive index layer, the high refractive index layer and the low refractive index layer, those leveling agents are added in an amount of preferably 0.1 to 5.0 mass %, more preferably 0.1 to 3.0 mass %, based on the coating solution for each layer.

(Dispersing Agent)

For dispersing the particles used in the invention, various kinds of dispersants can be employed.

It is advantageous for the dispersants to further contain crosslinkable or polymerizable functional groups. Examples of a crosslinkable or polymerizable functional group include ethylenic unsaturated groups capable of undergoing radical-induced addition and polymerization reactions (e.g. a (meth)acryloyl group, an allyl group, a styryl group, a vinyloxy group), cationic polymerizable groups (e.g. an epoxy group, an oxetanyl group, a vinyloxy group), and polycondensation reactive groups (e.g. a hydrolysable silyl group, an N-methylol group). Of these groups, functional groups having ethylenic unsaturated groups are preferred over the others.

The dispersants used for dispersion of inorganic particles, especially for dispersion of inorganic particles containing $TiO_2$ as their major constituent, are preferably dispersants having anionic groups, more preferably dispersants having anionic groups and crosslinkable or polymerizable functional groups, particularly preferably dispersants having crosslinkable or polymerizable functional groups in their side chains in addition to anionic groups.

Examples of an effective anionic group include groups having acidic protons, such as a carboxyl group, a sulfonic acid group (sulfo group), a phosphoric acid group (phosphono group), a sulfonamide group, and the salts thereof. Of these groups, a carboxyl group, a sulfo group, a phosphono group and the salts thereof are preferable to the others, and carboxyl and phosphono groups in particular are preferred over the others. The number of anionic groups contained in a dispersant, which may be different in kind, is preferably an average of 2 or more per molecule, more preferably an average of 5 or more per molecule, particularly preferably an average of 10 or more per molecule. Additionally, two or more different kinds of anionic groups may be present in one molecule of dispersant.

The content of anionic group-containing repeating units in a dispersant having anionic groups in its side chains is in a range of $10^{-4}$ to 100 mole %, preferably 1 to 50 mole %, particularly preferably 5 to 20 mole %, of the total repeating units.

In addition to anionic groups, the dispersants preferably contain crosslinkable or polymerizable functional groups. Examples of a crosslinkable or polymerizable functional group include ethylenic unsaturated groups capable of undergoing radical-induced addition and polymerization reactions (e.g. a (meth)acryloyl group, an allyl group, a styryl group, a vinyloxy group), cationic polymerizable groups (e.g. an epoxy group, an oxetanyl group, a vinyloxy group), and polycondensation reactive groups (e.g. a hydrolysable silyl group, an N-methylol group). Of these groups, functional groups having ethylenic unsaturated groups are preferred over the others.

The number of crosslinkable or polymerizable functional groups contained in a dispersant is preferably an average of 2 or more per molecule, more preferably an average of 5 or more per molecule, particularly preferably an average of 10 or more per molecule. Additionally, two or more different kinds of functional groups may be present in one molecule of dispersant.

As examples of repeating units that have ethylenic unsaturated groups in their respective side chains and are contained in a dispersant preferably used in the invention, a poly-1,2-butadiene structure, a poly-1,2-isoprene structure, and (meth)acrylate- or (meth)acrylamide-repeated units, to each of which a specific residue (the group R of —COOR or —CONHR) is attached, can be utilized. Examples of the specific residue (group R) include —$(CH_2)_n$—$CR_{21}$=$CH_{22}R^{23}$, —$(CH_2O)_n$—$CH_2CR^{21}$=$CR^{22}R^{23}$, —$(CH_2CH_2O)_n$—$CH_2CR^{21}$=$CR^{22}R^{23}$, —$(CH_2)_n$—NH—CO—O—$CH_2CR^{21}$=$CR^{22}R^{23}$, —$(CH_2)_n$—O—CO—$CR^{21}$=$CR^{22}R^{23}$ and —$(CH_2CH_2O)_2$—X (wherein each of $R^{21}$ to $R^{23}$ is a hydrogen atom, a halogen atom, an alkyl group having 1 to 20 carbon atoms, an aryl group, an alkoxy group or an aryloxy group, or $R^{21}$ may combine with $R^{22}$ or $R^{23}$ to form a ring; n is an integer of 1 to 10; and X is a dicyclopentadienyl residue). Examples of the R of ester residue include —$CH_2CH$=$CH_2$ (comparable to allyl (meth)acrylate in the polymer disclosed in JP-A-64-17047), —$CH_2CH_2O$—$CH_2CH$=$CH_2$, —$CH_2CH_2OCOCH$=$CH_2$, —$CH_2CH_2OCOC(CH_3)$=$CH_2$, —$CH_2C(CH_3)$=$CH_2$, —$CH_2CH$=$CH$—$C_6H_5$, —$CH_2CH_2OCOCH$=$CH$—$C_6H_5$, —$CH_2CH_2$—$NHCOO$—$CH_2CH$=$CH_2$ and —$CH_2CH_2O$—X (wherein X is a dicyclopentadienyl residue). Examples of the R of amide residue include —$CH_2CH$=$CH_2$, —$CH_2CH_2$—Y (wherein Y is a 1-cyclohexenyl residue), —$CH_2CH_2$—OCO—CH=$CH_2$ and —$CH_2CH_2$—OCO—$C(CH_3)$=$CH_2$.

In a dispersant having the ethylenic unsaturated groups, free radicals (polymerization initiating radicals or growing radicals in the polymerization process of a polymerizable compound) are added to the unsaturated bonding groups to cause addition polymerization between molecules directly or via a polymerized chain of the polymerizable compound, thereby forming crosslinks between molecules and curing the dispersant. Alternatively, atoms (e.g. hydrogen atoms on carbon atoms adjacent to unsaturated bonding groups) in a molecule are pulled out, and the polymer radicals thus formed are bound together to form crosslinks between molecules and cure the dispersant.

The weight-average molecular weight (Mw) of a dispersant in which anionic groups are contained, and besides, crosslinkable or polymerizable functional groups are contained in side chains, though not particularly limited, is preferably 1,000 or above, more preferably from 2,000 to 1000,000, further preferably from 5,000 to 200,000, particularly preferably from 10,000 to 100,000.

The crosslinkable or polymerizable functional group-containing units may constitute all repeating units except anionic group-containing repeating units, but they constitute preferably 5 to 50 mole %, particularly preferably 5 to 30 mole %, of all crosslinking or repeating units.

The dispersant may be a copolymer of a monomer having a crosslinkable or polymerizable group and an anionic group and another appropriate monomer. There is no particular restriction as to the copolymerizing component, and the copolymerizing component is chosen from various viewpoints including dispersion stability, compatibility with other monomer components, and strength of film formed. Suitable examples of the copolymerizing component include methyl (meth)acrylate, n-butyl (meth)acrylate, t-butyl (meth)acrylate, cyclohexyl (meth)acrylate and styrene.

The form of dispersants, though not particularly restricted, is preferably a block copolymer form or a random copolymer form, especially a random copolymer form in terms of cost and ease of synthesis.

The amount of dispersants used for inorganic particles is preferably in a range of 1 to 50 mass %, more preferably in a range of 5 to 30 mass %, especially preferably in a range of 5 to 20 mass %, on a solid content basis. The dispersants may be used as combinations of two or more thereof.

Examples of dispersants suitably used in the invention are illustrated below, but dispersants usable in the invention should not be construed as being limited to the following ones. Additionally, the dispersants illustrated below are random copolymers unless otherwise noted.

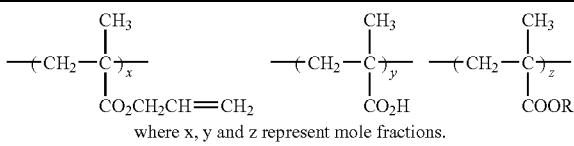

where x, y and z represent mole fractions.

| | x | y | z | R | Mw |
|---|---|---|---|---|---|
| P-(1) | 80 | 20 | 0 | — | 40,000 |
| P-(2) | 80 | 20 | 0 | — | 110,000 |
| P-(3) | 80 | 20 | 0 | — | 10,000 |
| P-(4) | 90 | 10 | 0 | — | 40,000 |
| P-(5) | 50 | 50 | 0 | — | 40,000 |
| P-(6) | 30 | 20 | 50 | $CH_2CH_2CH_3$ | 30,000 |
| P-(7) | 20 | 30 | 50 | $CH_2CH_2CH_2CH_3$ | 50,000 |
| P-(8) | 70 | 20 | 10 | $CH(CH_3)_3$ | 60,000 |
| P-(9) | 70 | 20 | 10 | —$CH_2CHCH_2CH_2CH_2CH_3$ with $CH_2CH_3$ branch | 150,000 |
| P-(10) | 40 | 30 | 30 | —$CH_2$—phenyl | 15,000 |

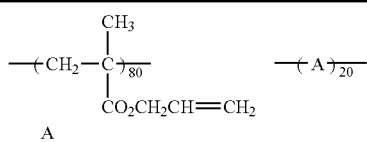

| | A | Mw |
|---|---|---|
| P-(11) | —$CH_2$—$CH$— with COOH | 20,000 |
| P-(12) | —$CH_2$—$CH$— with $CO_2CH_2CH_2COOH$ | 30,000 |
| P-(13) | —$CH_2$—$CH$— with phenyl-$SO_3Na$ | 100,000 |
| P-(14) | —$CH_2$—$C(CH_3)$— with $CO_2CH_2CH_2SO_3H$ | 20,000 |

| | | Mw |
|---|---|---|
| P-(15) | —CH₂—C(CH₃)(CO₂CH₂CH₂OP(O)(OH)₂)— | 50,000 |
| P-(16) | —CH₂—CH(CO₂CH₂CH₂O—(CH₂)₅—OP(O)(OH)₂)— | 15,000 |

—(A)₈₀— —(CH₂—C(CH₃)(COOH))₂₀—

| | A | Mw |
|---|---|---|
| P-(17) | —CH₂—C(CH₃)(COOCH₂CH₂OCH=CH—Ph)— | 20,000 |
| P-(18) | —CH₂—CH(COOCH₂CH₂OC(O)CH₂CH=CH₂)— | 25,000 |
| P-(19) | —CH₂—C(CH₃)(COO—CH₂—C₆H₄—CH=CH₂)— | 18,000 |
| P-(20) | —CH₂—CH(C₆H₄—OC(O)CH₂CH=CH₂)— | 20,000 |
| P-(21) | —CH₂—CH(CONHCH₂CH₂OC(O)CH=CH₂)— | 35,000 |

—(CH₂—C(CH₃)(COOR¹))ₓ— —(CH₂—C(CH₃)(COOH))ᵧ— —(CH₂—C(CH₃)(COOR²))_z—

| | R¹ | R² | x | y | z | Mw |
|---|---|---|---|---|---|---|
| P-(22) | CH₂CH₂OC(O)CH=CH₂ | C₄H₉(n) | 10 | 10 | 80 | 25,000 |
| P-(23) | CH₂CH₂OC(O)CH=CH₂ | C₄H₉(t) | 10 | 10 | 80 | 25,000 |
| P-(24) | CH₂CH₂OC(O)C(CH₃)=CH₂ | C₄H₉(n) | 10 | 10 | 80 | 500,000 |

-continued
| | | | | | | |
|---|---|---|---|---|---|---|
| P-(25) | 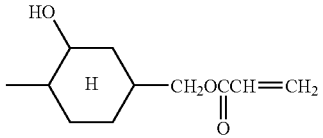 | C$_4$H$_9$(n) | 10 | 10 | 80 | 23,000 |
| P-(26) | | C$_4$H$_9$(n) | 80 | 10 | 10 | 30,000 |
| P-(27) | 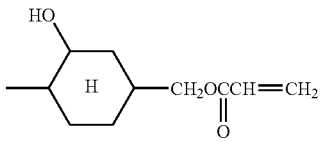 | C$_4$H$_9$(n) | 50 | 20 | 30 | 30,000 |
| P-(28) | 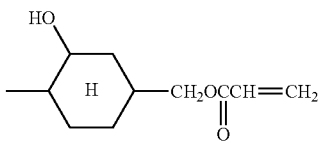 | C$_4$H$_9$(t) | 10 | 10 | 80 | 20,000 |
| P-(29) | 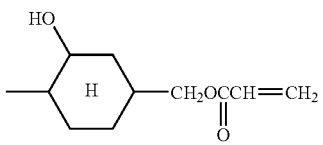 | CH$_2$CH$_2$OH | 50 | 10 | 40 | 20,000 |
| P-(30) | 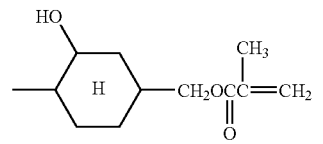 | C$_4$H$_9$(n) | 10 | 10 | 80 | 25,000 |
| P-(31) | 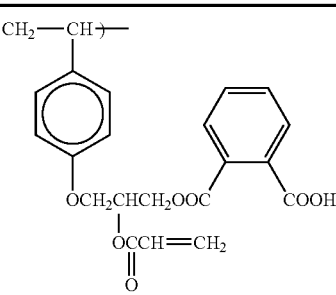 | | | | | Mw = 60,000 |
| P-(32) | 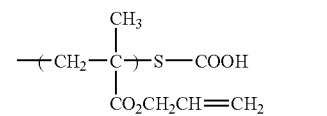 | | | | | Mw = 10,000 |
| P-(33) | 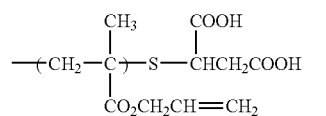 | | | | | Mw = 20,000 |
| P-(34) | 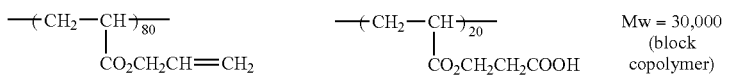 | | | | | Mw = 30,000 (block copolymer) |

-continued

P-(35)

$$-(CH_2-\underset{\underset{CO_2CH_2CH_2OCCH=CH_2}{|}}{\overset{\overset{CH_3}{|}}{C}})_{80}- \qquad -(CH_2CH)_{20}- \underset{|}{\overset{COOH}{|}}$$
$$\qquad\qquad\qquad\qquad \overset{\|}{O}$$

Mw = 15,000 (block copolymer)

P-(36)

$$-(CH_2-\underset{\underset{CO_2CH_2-\triangle}{|}}{\overset{\overset{CH_3}{|}}{C}})_{80}- \qquad -(CH_2-\underset{\underset{CO_2H}{|}}{\overset{\overset{CH_3}{|}}{C}})_{20}-$$

Mw = 8,000

P-(37)

$$-(CH_2-\underset{\underset{CO_2CH_2CH_2CH_2Si(OCH_2CH_3)_3}{|}}{\overset{\overset{CH_3}{|}}{C}})_{80}- \qquad -(CH_2-\underset{\underset{COOH}{|}}{\overset{\overset{CH_3}{|}}{C}})_{20}-$$

Mw = 5,000

P-(38)

$$-(CH-CH_2-O)_{80}- \qquad -(CH-CH-O)_{20}-$$
$$\;\;|\qquad\qquad\qquad\qquad\;\;\;\;\;|$$
$$CH_2-O-(CH_2)_3-OCCH=CH_2 \quad CH_2O-(CH_2)_3-Si(OCH_2CH_3)_3$$
$$\qquad\qquad\qquad\;\;\overset{\|}{O}$$

Mw = 10,000

(Support)

Examples of a material usable for the support in the invention include polyester-type polymers such as polyethylene terephthalate and polyethylene naphthalate, cellulose-type polymers such as diacetyl cellulose and triacetyl cellulose, acrylic polymers such as polymethyl methacrylate, styrene polymers such as polystyrene and AS resin, and polycarbonate-type polymers. Further, polyethylene, polypropylene, polyolefins having cyclic or norbornene structures, polyolefin-type polymers such as a copolymer of ethylene and propylene, sulfone-type polymers, polyether sulfone-type polymers, polyether ketone-type polymers, polyphenylenesulfide-type polymers, vinyl alcohol polymers, vinylidene chloride polymers, vinyl butyral polymers, acrylate polymers, polyoxymethylene polymer and epoxy polymers are also usable as the support materials.

The support thickness, though not particularly limited, is preferably from 20 to 150 μm, more preferably from 40 to 80 μm.

Definitions of physical characteristic values and measurement methods adopted in the invention are described below in detail.

(Integrated Reflectance)

The back of an optical film, or the film's side opposite to the low refractive index layer, is roughened with sand paper, and treated with black ink to avoid back reflection. In this state, the optical film surface is mounted on the integrating sphere of a spectrophotometer V-550 (made by JASCO Corporation) and examined for integrated reflectance in the wavelength region of 380 to 780 nm. And the arithmetic mean of reflectance values in the wavelength region of 450 to 650 nm is calculated.

(Evaluation of Surface Shape)

The surface shape of an optical film is evaluated from an arithmetic average roughness (Ra) of the uneven film surface and an average interval (Sm) of asperities on the film surface determined by using a SURFCORDER Model SE-3F made by Kosaka Laboratory Ltd. on the basis of JIS B-0601 (1994). In the Sm measurements, the measurement length is set at 8 mm and the cut-off value at 0.8 mm.

(Evaluation of Number of Light Transmitting Particles per Unit Area in Antiglare Layer)

The number of light transmitting particles having an average size greater than the thickness of an antiglare layer is determined by observing 10 fields of view, which each measure 500 μm×500 μm, under an optical microscope, counting the number of particles in each field of view, and taking the average of the numbers counted.

(Curl)

Curl measurement of a hard-coat film formed is made in accordance with the template method for curl measurement, which is defined as Method A among "Photographic Film Curl Measuring Methods" in JIS-K7619-1988.

The conditions under which the measurement is carried out are 25° C., a relative humidity of 60% and a humidity conditioning time of 10 hours. When the value of curl given by the following mathematical expression is −15 or below, or +15 or above, the measured film is rated as C; when the value is in the range between −15 and −10, or in a range between +10 and +15, the measured film is rated as B; and when the value is in a range of −10 to +10, the measured film is rated as A. The rates A and B are regarded as acceptable. The curl measuring direction in a sample film is a travelling direction of the film's support in the case of performing coating operations in web form.

Mathematical Expression: Curl=1/R, where R is a radius of curvature (m).

Figure 4:
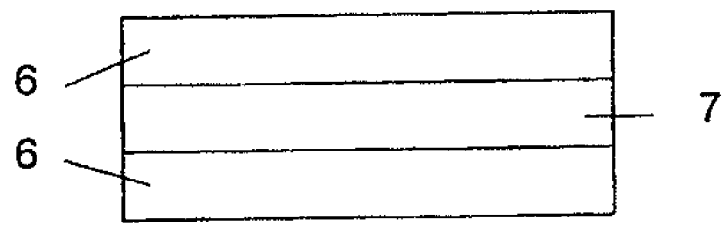
FIG. 4 illustrates a polarization film provided between protective films.

The polarizing plate according to the invention is a polarizing plate having a polarizing film and protective films provided on both sides of the polarizing film, wherein at least either of the protective films is the optical film according to the invention. FIG. 4 illustrates a polarizing film 7 provided between optical films 6.

The present optical film or polarizing plate, though not particularly restricted as to the uses thereof, can be suitably used as antireflective film. The antireflective film can be employed for prevention of a contrast drop caused by reflections of ambient light and background reflection in image displays of various types, such as a liquid crystal display (LCD), a plasma display panel (PDP), an electroluminescent display (ELD), a cathode ray tube (CRT) display, a field emission display (FED) and a surface electric filed display (SED).

Figure 5:
FIG. 5 illustrates an optical film on a display.

The image display apparatus (preferably liquid crystal display) according to the invention has the present optical film or polarizing plate. FIG. 5 illustrates a display 8 with an optical film 6. It is particularly advantageous for the present optical film or polarizing plate to be placed at the display surface (on the viewing side of the display screen).

The invention is illustrated in greater detail by reference to the following examples, but should not be construed as being limited to these examples. Additionally, all parts and percentages (%) in the following are by mass unless otherwise indicated.

EXAMPLE 1

(Preparation of Sol "a")

In a 1,000-ml reaction vessel equipped with a thermometer, a nitrogen introduction tube and a dropping funnel, 187 g (0.80 mol) of acryloyloxypropyltrimethoxysilane, 27.2 g (0.20 mol) of methyltrimethoxysilane, 320 g (10 mol) of methanol and 0.06 g (0.001 mol) of KF were placed, and thereto 15.1 g (0.86 mol) of water was gradually added dropwise at room temperature under stirring. After conclusion of the dropwise addition, the resultant reaction mixture was stirred for 3 hours at room temperature, and then heated with stirring under methanol reflux for 2 hours. Thereafter, the low-boiling component in the reaction system was distilled away under a reduced pressure, and further filtration was carried out. Thus, 120 g of sol "a" was obtained. As a result of GPC measurement of the thus obtained product, it was found that the mass-average molecular weight of the product was 1,500 and the proportion of components ranging in molecular weight from 1,000 to 20,000 in all the components higher in molecular weight than oligomeric components was 30%.

In addition, $^1$H-NMR measurement of the product revealed that the product obtained had the structure illustrated below.

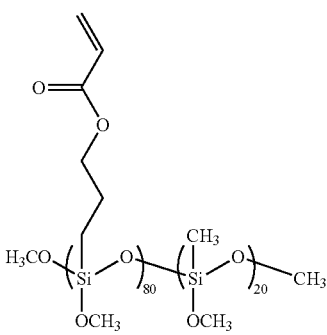

Herein, the ratio 80:20 is by mole.

Further, the condensation rate α determined from $^{29}$Si-NMR measurement was 0.56. This analysis result indicates that the major portion of the sol "a" obtained had a straight-chain structure.

Furthermore, it was ascertained by gas chromatography analysis that the residual ratio of acryloyloxypropyltrimethoxysilane used as the starting material was 5% or below.

(1) Preparation of Coating Solution for Antiglare Layer
Composition of Coating Solution 1 for Antiglare layer

| | |
|---|---|
| PET-30 | 40.0 parts by mass |
| DPHA | 10.0 parts by mass |
| IRGACURE 184 | 2.0 parts by mass |
| SX-350 (30%) | 2.0 parts by mass |
| Crosslinked acryl-styrene particles (30%) | 13.0 parts by mass |
| SP-13 | 0.06 part by mass |
| Sol "a" | 11.0 parts by mass |
| Toluene | 38.5 parts by mass |

Composition of Coating Solution 2 for Antiglare layer

| | |
|---|---|
| PET-30 | 38.7 parts by mass |
| Viscoat#360 | 9.7 parts by mass |
| MX-800 | 0.1 part by mass |
| IRGACURE 184 | 1.5 parts by mass |
| Methyl isobutyl ketone | 30.0 parts by mass |
| Methyl ethyl ketone | 20.0 parts by mass |
| SP-13 | 0.02 part by mass |

Composition of Coating Solution 3 for Antiglare Layer

| | |
|---|---|
| PET-30 | 38.7 parts by mass |
| Viscoat#360 | 9.7 parts by mass |
| MX-800 | 0.0025 part by mass |
| IRGACURE 184 | 1.5 parts by mass |
| Methyl isobutyl ketone | 30.0 parts by mass |
| Methyl ethyl ketone | 20.0 parts by mass |
| SP-13 | 0.02 part by mass |

Composition of Coating Solution 4 for Antiglare Layer

| | |
|---|---|
| PET-30 | 38.3 parts by mass |
| Viscoat#360 | 9.6 parts by mass |
| MX-800 | 0.6 part by mass |
| IRGACURE 184 | 1.5 parts by mass |
| Methyl isobutyl ketone | 30.0 parts by mass |
| Methyl ethyl ketone | 20.0 parts by mass |
| SP-13 | 0.02 part by mass |

Composition of Coating Solution 5 for Antiglare Layer

| | |
|---|---|
| PET-30 | 38.6 parts by mass |
| Viscoat#360 | 9.6 parts by mass |
| MX-2000 | 0.3 part by mass |
| IRGACURE 184 | 1.5 parts by mass |
| Methyl isobutyl ketone | 30.0 parts by mass |
| Methyl ethyl ketone | 20.0 parts by mass |
| SP-13 | 0.02 part by mass |

Composition of Coating Solution 6 for Antiglare Layer

| | |
|---|---|
| PET-30 | 38.7 parts by mass |
| Viscoat#360 | 9.7 parts by mass |
| MX-150H | 0.025 part by mass |
| IRGACURE 184 | 1.5 parts by mass |
| Methyl isobutyl ketone | 30.0 parts by mass |
| Methyl ethyl ketone | 20.0 parts by mass |
| SP-13 | 0.02 part by mass |

Composition of Coating Solution 7 for Antiglare Layer

| | |
|---|---|
| PET-30 | 38.7 parts by mass |
| Viscoat#360 | 9.7 parts by mass |
| MX-600 | 0.09 part by mass |
| IRGACURE 184 | 1.5 parts by mass |
| Methyl isobutyl ketone | 30.0 parts by mass |
| Methyl ethyl ketone | 20.0 parts by mass |
| SP-13 | 0.02 part by mass |

Composition of Coating Solution 8 for Antiglare Layer

| | |
|---|---|
| PET-30 | 38.7 parts by mass |
| Viscoat#360 | 9.7 parts by mass |
| SBX-8 | 0.1 part by mass |
| IRGACURE 184 | 1.5 parts by mass |
| Methyl isobutyl ketone | 30.0 parts by mass |
| Methyl ethyl ketone | 20.0 parts by mass |
| SP-13 | 0.02 part by mass |

The particles were used in the form of a 10 mass % methyl ethyl ketone solution. Coating solutions were each prepared by performing dispersion operation for 20 minutes at 10,000 rpm by means of a POLYTRON dispersing machine, and passed through a polypropylene filter having a pore size of 30 μm. Thus, the coating solutions 1 to 8 for forming antiglare layers were prepared.

The compounds used in each coating solution are shown below.

DPHA: Mixture of dipentaerythritol pentaacrylate and dipentaerythritol hexaacrylate (produced by NIPPON KAYAKU Co., Ltd.)

PET-30: Mixture of pentaerythritol triacrylate and pentaerythritol tetraacrylate (produced by NIPPON KAYAKU Co., Ltd.)

IRGACURE 184: Polymerization initiator (produced by Ciba Specialty Chemicals Inc.)

SX-350: Crosslinked polystyrene particles having an average size of 3.5 μm (refractive index: 1.60, a product of Soken Chemical & Engineering Co., Ltd.)

Crosslinked acryl-styrene particles: Average size: 3.5 μm (refractive index: 1.55, a product of Soken Chemical & Engineering Co., Ltd.)

MX-600: Polymethyl metacrylate particles (average size: 6.0 μm, a product of Soken Chemical & Engineering Co., Ltd.)

MX-800: Polymethyl metacrylate particles (average size: 8.0 μm, a product of Soken Chemical & Engineering Co., Ltd.)

MX-2000: Polymethyl metacrylate particles (average size: 20.0 μm, a product of Soken Chemical & Engineering Co., Ltd.)

MX-150H: Polymethyl metacrylate particles (average size: 1.5 μm, a product of Soken Chemical & Engineering Co., Ltd.)

SBX-8: Polystyrene particles (average size: 8.0 μm, a product of SEKISUI PLASTICS CO., LTD.)

Viscoat #360: Trimethylolpropane EO-added triacrylate (a product of OSAKA ORGANIC CHEMICAL INDUSTRY LTD.)

SP-13: Fluorine-containing surface modifier

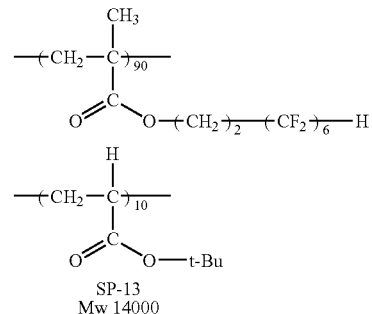

SP-13
Mw 14000

(Coating of Antiglare Layer 101)

While a roll of triacetyl cellulose film (TAC-TD80U, a product of FUJIFILM Corporation) was being wound off, the coating solution 1 for antiglare layer was coated on the film by direct extrusion with a coater having a slot die. Herein, the coating operation was performed at a transport speed of 30 m/min, and the layer coated was dried at 30° C. for 15 seconds and then at 90° C. for 20 seconds, and further cured by irradiated with ultraviolet light from a 160 W/cm air-cooled metal halide lamp (made by Eyegraphics Co., Ltd.) in an exposure dose of 90 mJ/cm$^2$ under the atmosphere purged with nitrogen, thereby forming a layer having an antiglare property and an average thickness of 6.0 μm. By winding the thus formed layer into a roll, an antiglare layer 101 was made.

(Making of Antiglare Layer 102)

An antiglare layer 102 was made in the same manner as the antiglare layer 101 was made, except that the amount of the particles added in the antiglare layer coating solution 1 was reduced to the half.

(Making of Antiglare Layers 103 to 105)

Antiglare layers 103 to 105 were made in the same manner as the antiglare layer 101 was made, except that the antiglare layer coating solutions 2 to 4 were used, respectively, in place of the antiglare layer coating solution 1 and the coating amounts thereof were adjusted to attain an average coating thickness of 6.8 μm.

(Making of Antiglare Layers 106 to 108)

Antiglare layers 106 to 108 were made in the same manner as the antiglare layer 103 was made, except that the coating amounts of the antiglare layer coating solution 2 were adjusted to attain average coating thicknesses of 3.5 μm, 7.95 μm and 6.0 μm, respectively.

(Making of Antiglare Layers 109 to 112)

Antiglare layers 109 to 112 were made in the same manner as the antiglare layer 101 was made, except that the antiglare layer coating solution 1 and the coating amount thereof was changed so as to attain an average coating thickness of 18.0 μm by use of the antiglare layer coating solution 5, an average coating thickness of 1.0 μm by use of the antiglare layer coating solution 6, an average coating thickness of 4.7 μm by use of the antiglare layer coating solution 7 and an average coating thickness of 6.8 μm by use of the antiglare layer coating solution 8, respectively.

(Making of Antiglare Layers 113 and 114)

Coating solutions 9 and 10 for antiglare layer were prepared in the same manner as the coating solution 2 for antiglare layer was prepared, except that the contents of MX-800 were changed to 0.9% by mass and 0.69% by mass, respectively.

Antiglare layers 113 and 114 were made in the same manner as the antiglare layer 103 was made, except that the antiglare layer coating solution 2 and the coating amount thereof was changed so as to attain an average coating thickness of 5.5 μm by use of the antiglare layer coating solution 9, and an average coating thickness of 7.2 μm by use of the antiglare layer coating solution 10, respectively.

TABLE 4

| Sample No. | Light transmitting Particle Size (μm) | Antiglare Layer No. | Proportion of Light transmitting Particles to Total Solid in Antiglare Layer (mass %) | Thickness (μm) |
|---|---|---|---|---|
| 1 | 3.5 | 101 | 6.8 | 6.0 |
| 2 | 3.5 | 102 | 3.4 | 6.0 |
| 3 | 8.0 | 103 | 0.2 | 6.8 |
| 4 | 8.0 | 104 | 0.005 | 6.8 |
| 5 | 8.0 | 105 | 1.2 | 6.8 |
| 6 | 8.0 | 106 | 0.2 | 3.5 |
| 7 | 8.0 | 107 | 0.2 | 7.95 |
| 8 | 8.0 | 108 | 0.2 | 6.0 |
| 9 | 20.0 | 109 | 0.6 | 18.0 |
| 10 | 1.5 | 110 | 0.05 | 1.0 |
| 11 | 6.0 | 111 | 0.18 | 4.7 |
| 26 | 8.0 | 112 | 0.2 | 6.8 |
| 27 | 8.0 | 113 | 0.9 | 5.5 |
| 28 | 8.0 | 114 | 0.69 | 7.2 |

(Evaluation of Optical Film)

Evaluations of various characteristics were performed on the optical films by the following methods. Results obtained are shown in Table 5.

(Integrated Reflectance)

The reflectance (integrated reflectance) measurement was made on each optical film in accordance with the method described hereinbefore, and the mean of reflectance values in the wavelength region of 450 to 650 nm was calculated, by which antireflective property was evaluated.

(Evaluation of Surface Shape)

The arithmetic average roughness (Ra) and the average interval of asperities (Sm) were evaluated by the methods described hereinbefore. In the Sm measurement, the measurement length was set at 8 mm and the cut-off value at 0.8 mm.

(Slope Angle θ)

Slope angles θ were determined by the method described hereinbefore, from which the incidence of slope angles ranging from 0° to 0.5° was calculated.

(Evaluation of Number of Light transmitting Particles per Unit Area in Antiglare Layer)

The number of light transmitting particles having an average size greater than the average thickness of the antiglare layer was evaluated in accordance with the method described hereinbefore.

<Reflection>

After the back of an antiglare film was filled with black color by use of a black felt-tip pen, light of a fluorescent lamp was made to bounce off the surface of the antiglare film and the state of fluorescent lamp's reflection in the antiglare film was rated.

A: Reflection is sufficiently suppressed and light is scattered to a sufficient extent, so there is nothing to worry about.

B: Fluorescent lamp's reflection is barely perceived by careful watching, but there is no need to worry about.

C: Fluorescent lamp's reflection is somewhat perceived, but there is no need to worry about.

D: Fluorescent lamp's reflection is clearly perceived and glare thereof causes worry.

Ranks equal to and higher than C are regarded as acceptable.

(Denseness of Black in Black-Display Mode <Display Performance>)

The surface film provided on the visible side of a liquid crystal display using IPS-format liquid crystal cells (32" TV: W32-L7000, manufactured by Hitachi, Ltd.) was peeled away. And in place of the film peeled away, each of the optical film samples, with its coating surface toward the visible side, was stuck to the resultant display via an adhesive applied to the back. In a room lit at 300 lux, the thus modified liquid crystal display was put into the black-display mode, and rated on a 1-to-10 scale (10 being best) by visual observation. The evaluation criteria are as follows.

10 stands for a state that the display screen has no feeling of being veiled by extraneous light at all, its brightness in the black-display mode is low and the contrast is very satisfactorily high in the well-lit room. On the other hand, 4 or below stands for a state that the display screen has a strong feeling of being veiled by extraneous light, the black-display mode thereof is not at an acceptable level (NG) and the contrast is low in the well-lit room.

(Glitter Evaluation)

Each of the optical films made in this example is mounted on the liquid-crystal TV set, and the extent of glitter (brightness variations traceable to the lens effect produced by asperities on the optical film surface) is visually checked and rated in accordance with the following criteria.

A: No glitter is observed at all.

B: Faint glitter can be visually recognized by very careful observation.

C: Slight glitter can be visually recognized, but there is no need to worry about.

D: Annoying glitter is observed.

TABLE 5

| Sample No. | Ra (μm) | Sm (μm) | θ[0.5] (%) | Number of light transmitting particles (per mm²) | Integrated reflectance (%) | denseness black | Reflection | Glitter | Curl | Note |
|---|---|---|---|---|---|---|---|---|---|---|
| 1 | 0.21 | 60 | 9 | 18,200 | 4.25 | 2 | B | B | A | Comparative Example |
| 2 | 0.17 | 65 | 21 | 9,000 | 4.25 | 3 | B | B | A | Comparative Example |
| 3 | 0.11 | 500 | 87 | 66 | 4.25 | 7 | B | B | A | Example |
| 4 | 0.02 | 800 | 99 | 2 | 4.25 | 7 | D | A | A | Comparative Example |
| 5 | 0.26 | 140 | 35 | 410 | 4.25 | 4 | B | C | A | Comparative Example |

TABLE 5-continued

| Sample No. | Ra (μm) | Sm (μm) | θ[0.5] (%) | Number of light transmitting particles (per mm$^2$) | Integrated reflectance (%) | denseness black | Reflection | Glitter | Curl | Note |
|---|---|---|---|---|---|---|---|---|---|---|
| 6 | 0.41 | 400 | 59 | 32 | 4.25 | 5 | B | D | A | Comparative Example |
| 7 | 0.04 | 710 | 98 | 70 | 4.25 | 7 | D | A | A | Comparative Example |
| 8 | 0.14 | 440 | 82 | 63 | 4.25 | 7 | B | B | A | Example |
| 9 | 0.28 | 400 | 88 | 15 | 4.25 | 6 | B | C | B | Example |
| 10 | 0.06 | 110 | 75 | 830 | 4.25 | 5 | C | B | A | Example |
| 11 | 0.10 | 530 | 89 | 60 | 4.25 | 7 | B | B | A | Example |
| 26 | 0.16 | 520 | 78 | 66 | 4.25 | 5 | B | B | A | Example |
| 27 | 0.32 | 190 | 38 | 300 | 4.25 | 3 | B | C | A | Comparative Example |
| 28 | 0.20 | 220 | 62 | 300 | 4.25 | 5 | B | B | A | Example |

The foregoing results demonstrate that optical films which can ensure high denseness of black and prevent ambient-light reflection and glitter from occurring are obtained by adjusting the light transmitting particles used therein to have an average size greater than an average thickness of each individual antiglare layer by 0.1 to 4.0 μm and be added in an amount of 0.01 to 1 mass % based on the total solid content in the antiglare layer, what's more by adjusting the region of 0°<θ<0.5° (θ(0.5)), wherein θ is a slope angle of each asperity as measured on the antiglare layer, to constitute 40% to 98% of the antiglare layer surface.

EXAMPLE 2

(Preparation of Coating Solution A for Medium Refractive Index Layer)

To 10.0 parts by mass of a particulate $ZrO_2$-containing chemical agent for formation of a hard coating (DeSolite Z7404 [refractive index: 1.72, solid concentration: 60 mass %, fine-grained zirconium oxide content: 70 mass % (on solid basis), average size of fine-grain zirconium oxide: about 20 nm, solvent composition: MIBK/MEK=9/1], produced by JSR Corporation), 3.0 parts by mass of a dipentaerythritol pentaacrylate-dipentaerythritol hexaacrylate mixture (DPHA), 0.1 part by mass of a photopolymerization initiator (IRGACURE 184, produced by Ciba Specialty Chemicals Inc.), 0.1 part by mass of SP-13 and 86.9 parts by mass of methyl isobutyl ketone were added, and stirred. After thorough stirring, the resultant mixture was filtered through a polypropylene filter having a pore size of 0.4 μm, thereby preparing a coating solution A for a medium refractive index layer.

(Preparation of Coating Solution A for High Refractive Index Layer)

To 15.0 parts by mass of a particulate $ZrO_2$-containing chemical agent for formation of a hard coating (DeSolite Z7404 [refractive index: 1.72, solid concentration: 60 mass %, fine-grained zirconium oxide content: 70 mass % (on solid basis), average size of fine-grain zirconium oxide: about 20 nm, solvent composition: MIBK/MEK=9/1], produced by JSR Corporation), 0.1 part by mass of SP-13 and 85.0 parts by mass of methyl isobutyl ketone were added, and stirred. The resultant mixture was filtered through a polypropylene filter having a pore size of 0.4 μm, thereby preparing a coating solution A for a High refractive index layer.

(Preparation of Coating Solution A for Low Refractive Index Layer)
<Preparation of Dispersion Liquid containing Hollow Silica Particles>

To 500 parts by mass of hollow particulate silica sol (isopropyl alcohol silica sol CS60-IPA, produced by JGC C&C, an average particle size: 60 nm, shell thickness: 10 nm, silica concentration: 20%, refractive index of silica particles: 1.31), 20 parts by mass of acryloyloxypropyltrimethoxysilane and 1.5 parts by mass of diisopropoxyaluminum ethyl acetate were added, and mixed together. Thereto, 9 parts by mass of ion exchange water was further added. The resulting mixture underwent reaction at 60° C. for 8 hours, then cooled down to room temperature, and further admixed with 1.8 parts by mass of acetyl acetone, thereby preparing a dispersion liquid. Thereafter, the dispersion liquid was subjected to solvent substitution by distillation under reduced pressure of 30 Torr as cyclohexanone was added thereto so as to keep the silica content almost constant, and finally concentration adjustment was carried out, thereby preparing a dispersion liquid having a solid concentration of 18.2%. The residual IPA content in the dispersion liquid obtained was found to be at most 0.5% when analysis was performed by gas chromatography.

By using the thus obtained dispersion liquid of hollow silica particles, a coating solution A having the following composition was prepared for formation of a low refractive index layer.

Composition of Coating Solution A for Low Refractive Index Layer

| DPHA | 1.0 part by mass |
| P-1 | 1.6 parts by mass |
| Dispersion liquid of hollow silica particles (18.2%) | 26.4 parts by mass |
| RMS-033 | 0.4 part by mass |
| IRGACURE 907 | 0.3 part by mass |
| M-1 | 1.9 parts by mass |
| MEK | 168.4 parts by mass |

P-1: Fluorine-containing copolymer P-3 disclosed in JP-A-2004-45462 (weight-average molecular weight: about 50,000)
DPHA: Mixture of dipentaerythritol pentaacrylate and dipentaerythritol hexaacrylate (produced by NIPPON KAYAKU Co., Ltd.)
IRGACURE 907: Polymerization initiator (produced by Nihon Ciba-Geigy K.K.)
M-1: Fluorine-containing multifunctional acrylate illustrated hereinbefore
RMS-033: Methacryloxy-modified silicone (produced by Gelest, Inc.)

The coating solution for a medium refractive index layer, the coating solution for a high refractive index layer and the coating solution for a low refractive index layer were coated so as to have the makeup shown in Table 6 by extruding them directly onto each individual antiglare layer by means of a coater with slot dies. As to the amount of the coating solution used for formation of each layer, the amount required for the coating solution to attain the intended thickness on PET film was adopted as it was in coating the coating solution on each individual antiglare layer also. Such thickness on PET film is taken as practical thickness on each individual antiglare layer and shown in Table 6. The thickness on PET film was worked out by measurement with a Reflective Film Thickness Monitor FE-3000 (made by OTSUKA ELECTRONICS CO., LTD.). Additionally, refractive index measurement with an Abbe refractometer (made by ATAGO CO., LTD.) was performed on each layer formed in a thickness of about 4 μm by coating each coating solution on a glass plate.

Each of the medium refractive index layers was dried under the condition of 90° C-30 seconds, and cured by UV irradiation under the condition of using a 180 W/cm air-cooled metal halide lamp (made by Eye Graphics Co., Ltd.) in illumination of 400 mW/cm² and an exposure amount of 60 mJ/cm² while performing purge with nitrogen so that the atmosphere had an oxygen concentration reduced to 1.0 vol % or below.

The high refractive index layer was dried under the condition of 90° C-30 seconds, and cured by UV irradiation under the condition of using a 240 W/cm air-cooled metal halide lamp (made by Eye Graphics Co., Ltd.) in illumination of 400 mW/cm² and an exposure amount of 240 mJ/cm² while performing purge with nitrogen so that the atmosphere had an oxygen concentration reduced to 1.0 vol % or below.

Each of the low refractive index layers was dried under the condition of 60° C-60 seconds, and cured by UV irradiation under the condition of using a 240 W/cm air-cooled metal halide lamp (made by Eye Graphics Co., Ltd.) in illumination of 600 mW/cm² and an exposure amount of 600 mJ/cm² while performing purge with nitrogen so that the atmosphere had an oxygen concentration reduced to 0.1 vol % or below.

TABLE 6

| Sample No. | Size of Light transmitting Particles (μm) | Antiglare Layer No. | Proportion of Light transmitting Particles to Total Solid in Antiglare Layer (mass %) | Thickness (μm) | Medium refractive index layer ||| High refractive index layer ||| Low refractive index layer |||
|---|---|---|---|---|---|---|---|---|---|---|---|---|---|
| | | | | | Coating Solution | Refractive Index | Thickness (nm) | Coating Solution | Refractive Index | Thickness (nm) | Coating Solution | Refractive Index | Thickness (nm) |
| 12 | 3.5 | 101 | 6.8 | 6.0 | — | — | — | — | — | — | A | 1.36 | 90 |
| 13 | 8.0 | 103 | 0.2 | 6.8 | — | — | — | — | — | — | A | 1.36 | 90 |
| 14 | 8.0 | 104 | 0.005 | 6.8 | — | — | — | — | — | — | A | 1.36 | 90 |
| 15 | 8.0 | 105 | 1.2 | 6.8 | — | — | — | — | — | — | A | 1.36 | 90 |
| 16 | 8.0 | 106 | 0.2 | 3.5 | — | — | — | — | — | — | A | 1.36 | 90 |
| 17 | 8.0 | 107 | 0.2 | 7.95 | — | — | — | — | — | — | A | 1.36 | 90 |
| 18 | 6.0 | 111 | 0.18 | 4.7 | — | — | — | — | — | — | A | 1.36 | 90 |
| 19 | 8.0 | 112 | 0.2 | 6.8 | — | — | — | — | — | — | A | 1.36 | 90 |
| 20 | 8.0 | 103 | 0.2 | 6.8 | A | 1.62 | 60 | — | — | — | A | 1.36 | 90 |
| 21 | 8.0 | 103 | 0.2 | 6.8 | A | 1.62 | 60 | A | 1.72 | 115 | A | 1.36 | 90 |
| 22 | 8.0 | 113 | 0.9 | 5.5 | — | — | — | — | — | — | A | 1.36 | 90 |
| 23 | 8.0 | 114 | 0.69 | 7.2 | — | — | — | — | — | — | A | 1.36 | 90 |

(Evaluations Performed on Optical Film)

Evaluations of various properties were made on each of the optical films in accordance with the same methods as in Example 1. Results obtained are shown in Table 7.

At this time, the evaluation of denseness of black in black-display mode (display performance) was carried out by visual observation under conditions that the liquid-crystal display was put into the black-display mode in a room lit at 1,000 lux. And the display performance was rated on a 1-to-10 scale (10 being best). The evaluation criteria are as follows: 10 stands for a state that the display screen has no feeling of being veiled by extraneous light at all, its brightness in the black-display mode is low and the contrast is very satisfactorily high in the well-lit room. On the other hand, 3 or below stands for a state that the display screen has a strong feeling of being veiled by extraneous light, the black-display mode thereof is not at an acceptable level (NG) and the contrast is low in the well-lit room.

TABLE 7

| Sample No. | Ra (μm) | Sm (μm) | θ[0.5] (%) | Number of light transmitting particles (per mm²) | Integrated reflectance (%) | Denseness of black | Reflection | Glitter | Curl | Note |
|---|---|---|---|---|---|---|---|---|---|---|
| 12 | 0.21 | 60 | 9 | 18,200 | 1.90 | 1 | B | B | A | Comparative Example |
| 13 | 0.11 | 500 | 87 | 66 | 1.38 | 6 | B | B | A | Example |
| 14 | 0.02 | 800 | 99 | 2 | 1.35 | 6 | D | A | A | Comparative Example |

TABLE 7-continued

| Sample No. | Ra (μm) | Sm (μm) | θ[0.5] (%) | Number of light transmitting particles (per mm²) | Integrated reflectance (%) | Denseness of black | Reflection | Glitter | Curl | Note |
|---|---|---|---|---|---|---|---|---|---|---|
| 15 | 0.26 | 140 | 35 | 410 | 1.65 | 3 | B | C | A | Comparative Example |
| 16 | 0.41 | 400 | 59 | 32 | 1.49 | 4 | B | D | A | Comparative Example |
| 17 | 0.04 | 710 | 98 | 70 | 1.35 | 6 | D | A | A | Comparative Example |
| 18 | 0.10 | 530 | 89 | 60 | 1.36 | 6 | B | B | A | Example |
| 19 | 0.16 | 520 | 78 | 66 | 1.43 | 5 | B | B | A | Example |
| 20 | 0.11 | 500 | 87 | 66 | 0.86 | 8 | B | B | A | Example |
| 21 | 0.11 | 500 | 87 | 66 | 0.55 | 10 | A | B | A | Example |
| 22 | 0.32 | 190 | 38 | 300 | 1.64 | 3 | B | C | A | Comparative Example |
| 23 | 0.20 | 220 | 62 | 300 | 1.45 | 5 | B | B | A | Example |

As can be seen from the results shown above, the antiglare layers distinguished by being rich in flat regions while having asperities contributed to very high denseness of black. Further, the data shown above demonstrate that, when optical inference layers were coated on such characteristic antiglare layers, it was feasible to form them in uniform state because each antiglare layer had a surface structure rich in flat regions since asperities thereon were formed by sparsely-distributed light transmitting particles greater in size than the thickness of the antiglare layer by 0.1 to 4.0 μm; as a result, optical films having sufficient drop in reflectance and offering not only the property of preventing reflection but also high denseness of black were obtained.

EXAMPLE 3

A coating solution B having the following composition was prepared for forming a low refractive index layer.
Composition of Coating Solution B for Low Refractive Index Layer

| | |
|---|---|
| DPHA | 1.0 part by mass |
| MEK-ST-L | 26.4 parts by mass |
| RMS-033 | 0.4 part by mass |
| IRGACURE 907 | 0.3 part by mass |
| M-1 | 1.9 parts by mass |
| MEK | 170.0 parts by mass |

MEK-ST-L: Colloidal silica having an average particle size of about 50 nm, produced by NISSAN CHEMICAL INDUSTRIES, LTD.

Samples 24 and 25 shown in Table 8 were made in the same manner as in Example 2, except that each low refractive index layer was formed by coating of the foregoing composition.

(Evaluations Performed on Optical Film)

Evaluations of various properties were made on the optical films in accordance with the same methods as in Example 1. Results obtained are shown in Table 9. At this time, the evaluation of denseness of black in black-display mode (display performance) was carried out by visual observation under conditions that the liquid-crystal display was put into the black-display mode in a room lit at 600 lux. And the display performance was rated on a 1-to-10 scale (10 being best). The evaluation criteria are as follows: 10 stands for a state that the display screen has no feeling of being veiled by extraneous light at all, its brightness in the black-display mode is low and the contrast is very satisfactorily high in the well-lit room. On the other hand, 3 or below stands for a state that the display screen has a strong feeling of being veiled by extraneous light, the black-display mode thereof is not at an acceptable level (NG) and the contrast is low in the well-lit room.

TABLE 8

| Sample No. | Size of Light transmitting particles (μm) | Antiglare Layer No. | Proportion of Light transmitting Particles to Total Solid in Antiglare Layer (mass %) | Thickness (μm) | Refractive Index of Antiglare layer | Low Refractive Index Layer | | |
|---|---|---|---|---|---|---|---|---|
| | | | | | | Coating solution | Refractive Index | Thickness (nm) |
| 12 | 3.5 | 101 | 6.8 | 6.0 | 1.52 | A | 1.36 | 90 |
| 13 | 8.0 | 103 | 0.2 | 6.8 | 1.52 | A | 1.36 | 90 |
| 24 | 3.5 | 101 | 6.8 | 6.0 | 1.52 | B | 1.48 | 90 |
| 25 | 8.0 | 103 | 0.2 | 6.8 | 1.52 | B | 1.48 | 90 |

TABLE 9

| Sample No. | Ra (μm) | Sm (μm) | θ[0.5] (%) | Number of Light transmitting Particles (per mm²) | Integrated Reflectance (%) | Denseness of black | Reflection | Glitter | Curl | Note |
|---|---|---|---|---|---|---|---|---|---|---|
| 12 | 0.21 | 60 | 9 | 18,200 | 1.90 | 6 | B | B | A | Comparative Example |
| 13 | 0.11 | 500 | 87 | 66 | 1.38 | 10 | B | B | A | Example |
| 24 | 0.21 | 60 | 9 | 18,200 | 3.65 | 2 | B | B | A | Comparative Example |
| 25 | 0.11 | 500 | 87 | 66 | 3.40 | 4 | B | B | A | Example |

It can be seen from the results shown above that, when variations in thickness of the antireflective layer was reduced by use of the antiglare layer according to the invention, it was advantageous to make a refractive-index difference of 0.05 or above between the low refractive index layer and the antiglare layer because it contributed a greater drop in reflectance and substantial improvement in denseness of black.

EXAMPLE 4

A coating solution was prepared by removing the dispersion liquid of hollow silica from the coating solution A for low refractive index layer formation. This coating solution was coated on the antiglare layers 101 and 103, respectively, under the same conditions as the low refractive index layer was coated in Example 1. However, each of the coating layers formed was observed suffering cissing and unevenness and being inferior in surface condition.

In the optical films according to the invention, ambient-light reflection is reduced and high denseness of black is ensured. Moreover, compatibility between very low reflectance and antiglare properties can be achieved because of lesser thickness fluctuations of the antireflective layer with positions on the optical film provided with the antireflective layer.

More specifically, by incorporating at least one kind of light transmitting particles into the antiglare layer in the invention and adjusting the light transmitting particles to have their proportion to the total solid content in the antiglare layer and their average particle size in respectively specified ranges, and further adjusting the area (θ(0.5)) in which the slope angles θ of asperities on the antiglare layer surface lie within a range of 0°<θ<0.5° to take a value within a specified range, the invention can provide optical films with reduced ambient-light reflection and high denseness of black.

The entire disclosure of each and every foreign patent application from which the benefit of foreign priority has been claimed in the present application is incorporated herein by reference, as if fully set forth.

What is claimed is:

1. An optical film, comprising:
   a support; and
   at least one antiglare layer having a surface that has asperities,
   wherein the at least one antiglare layer contains at least one kind of light transmitting particles including first light transmitting particles in an amount of 0.01 to 1% by mass based on a total solid content in the antiglare layer,
   the first light transmitting particles have an average particle size that is 0.1 to 4.0μm greater than an average thickness of the antiglare layer, and
   a region θ(0.5) in which slope angles θ of the asperities of the surface of the antiglare layer lie within a range of 0°<θ<0.5° constitutes 40% to 98% of the surface of the antiglare layer.

2. The optical film according to claim 1,
   wherein the number of the first light transmitting particles per unit area of mm² of the antiglare layer is 10 to 1,500.

3. The optical film according to claim 1,
   wherein the average particle size of the first light transmitting particles is from 3μm to 15μm.

4. The optical film according to claim 1,
   wherein an arithmetical average roughness Ra of the surface of the antiglare layer lies within a range of 0.03μm<Ra<0.4μm, and
   an average interval Sm of the asperities lies within a range of 80μm<Sm<700μm.

5. The optical film according to claim 1,
   wherein the first light transmitting particles are resin particles, and the resin particles have a polymethyl methacrylate content of from 40% by mass to 100% by mass.

6. The optical film according to claim 1,
   wherein the antiglare layer further contains second light transmitting particles which include polymethyl methacrylate and have an average particle size smaller than the average thickness of the antiglare layer.

7. The optical film according to claim 1, further comprising:
   at least one low refractive index layer lower in refractive index than the antiglare layer directly on the antiglare layer or via another layer.

8. The optical film according to claim 7,
   wherein the low refractive index layer contains inorganic fine particles in an amount of 20 to 70% by mass based on a total solid content in the low refractive index layer.

9. The optical film according to claim 7,
   wherein a difference in refractive index between the antiglare layer and the low refractive index layer is 0.05 or greater.

10. A polarizing plate, comprising:
    protective films; and
    a polarizing film provided between the protective films,
    wherein at least one of the protective films is the optical film according to claim 1.

11. An image display apparatus, comprising:
    a display having the optical film according to claim 1.

* * * * *